United States Patent
Sasaki et al.

(10) Patent No.: US 8,163,186 B2
(45) Date of Patent: Apr. 24, 2012

(54) METHOD OF MANUFACTURING MAGNETIC HEAD, AND MAGNETIC HEAD SUB-STRUCTURE

(75) Inventors: Yoshitaka Sasaki, Milpitas, CA (US);
Hiroyuki Itoh, Milpitas, CA (US);
Shigeki Tanemura, Milpitas, CA (US);
Hironori Araki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 989 days.

(21) Appl. No.: 12/155,734

(22) Filed: Jun. 9, 2008

(65) Prior Publication Data
US 2008/0277376 A1    Nov. 13, 2008

Related U.S. Application Data

(62) Division of application No. 11/022,820, filed on Dec. 28, 2004, now Pat. No. 7,433,151.

(51) Int. Cl.
*G11B 5/127* (2006.01)

(52) U.S. Cl. ............... 216/22; 216/52; 216/84; 29/603.1

(58) Field of Classification Search ............... None
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 4,839,197 A * | 6/1989 | Henderson | 427/116 |
| 5,802,700 A | 9/1998 | Chen et al. | |
| 5,911,455 A | 6/1999 | Draaisma et al. | |
| 6,026,559 A | 2/2000 | Ishiwata | |
| 6,076,252 A * | 6/2000 | Sasaki | 29/603.1 |
| 6,193,584 B1 | 2/2001 | Rudy et al. | |
| 6,504,675 B1 | 1/2003 | Shukh et al. | |
| 6,515,824 B1 | 2/2003 | Sato | |
| 6,557,241 B1 * | 5/2003 | Sasaki | 29/603.12 |
| 6,631,054 B2 | 10/2003 | Miyazaki et al. | |
| 6,710,973 B2 | 3/2004 | Okada et al. | |
| 6,742,241 B1 | 6/2004 | Sasaki | |
| 6,785,098 B2 | 8/2004 | Hsiao et al. | |
| 6,906,893 B2 | 6/2005 | Hsiao et al. | |

(Continued)

FOREIGN PATENT DOCUMENTS

JP    A-54-058426    5/1979
(Continued)

OTHER PUBLICATIONS

Notice of Reasons for Rejection for Application No. 2005-198565, mailed Feb. 3, 2011 w/English-language translation.
(Continued)

*Primary Examiner* — Anita Alanko
(74) *Attorney, Agent, or Firm* — Oliff & Berridge, PLC

(57) ABSTRACT

A method of manufacturing magnetic heads comprises the step of: fabricating a magnetic head substructure by forming a plurality of components of the magnetic heads on a single substrate, wherein a plurality of rows of pre-head portions that will be the respective magnetic heads later are aligned in the substructure; and fabricating the magnetic heads by separating the pre-head portions from one another through cutting the substructure. In the step of fabricating the substructure, a plurality of indicators are formed, each of the indicators serving as a reference for indicating the location of a region ABS in which the medium facing surfaces of the magnetic heads are to be formed.

15 Claims, 38 Drawing Sheets

U.S. PATENT DOCUMENTS

| | | |
|---|---|---|
| 6,937,436 B2 | 8/2005 | Sasaki |
| 7,031,110 B2 | 4/2006 | Yamanaka |
| 7,070,698 B2 | 7/2006 | Le |
| 7,133,255 B2 | 11/2006 | Lille et al. |
| 7,206,172 B2 | 4/2007 | Ding et al. |
| 7,336,442 B2 * | 2/2008 | Sasaki et al. ............. 360/125.02 |
| 2002/0135951 A1 | 9/2002 | Kasahara et al. |
| 2003/0058583 A1 | 3/2003 | Lam et al. |
| 2003/0151850 A1 | 8/2003 | Nakamura et al. |
| 2005/0188530 A1 | 9/2005 | Sasaki et al. |

FOREIGN PATENT DOCUMENTS

| | | |
|---|---|---|
| JP | A-58-177517 | 10/1983 |
| JP | A-61-287024 | 12/1986 |
| JP | A-63-140414 | 6/1988 |
| JP | U-63-84712 | 6/1988 |
| JP | 01169713 A * | 7/1989 |
| JP | A-01-169713 | 7/1989 |
| JP | 06314415 A * | 11/1994 |
| JP | A-06-314415 | 11/1994 |
| JP | 08287413 A * | 11/1996 |
| JP | A-08-287413 | 11/1996 |
| JP | A-9-54912 | 2/1997 |
| JP | A-10-105922 | 4/1998 |
| JP | 2000306216 A * | 11/2000 |
| JP | A-2000-306216 | 11/2000 |
| JP | A-2001-236605 | 8/2001 |
| JP | A-2002-92821 | 3/2002 |
| JP | A 2003-203311 | 7/2003 |
| JP | A 2003-242607 | 8/2003 |

OTHER PUBLICATIONS

Office Action issued in Japanese Patent Application No. 2008-198565 mailed on Aug. 26, 2010 (w/English Translation).

* cited by examiner

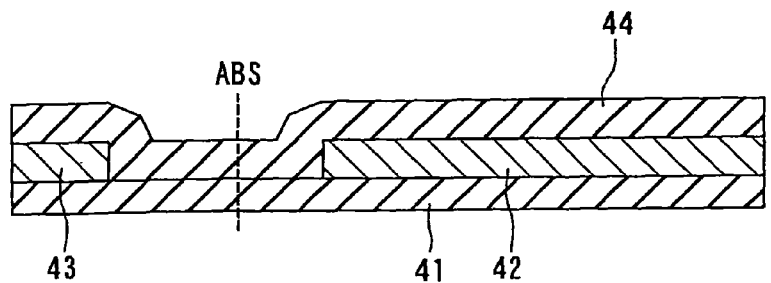 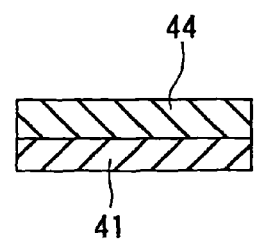
FIG. 35A  FIG. 35B
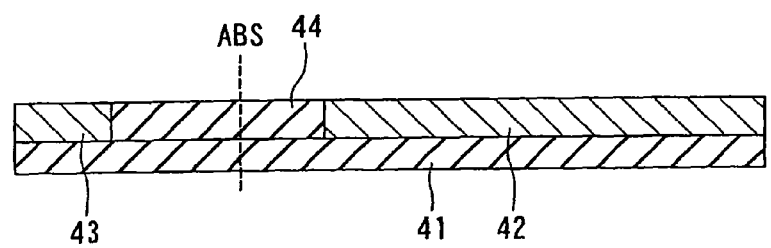 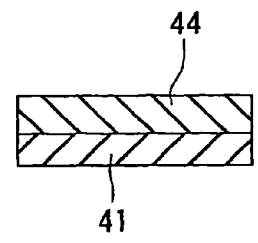
FIG. 36A  FIG. 36B
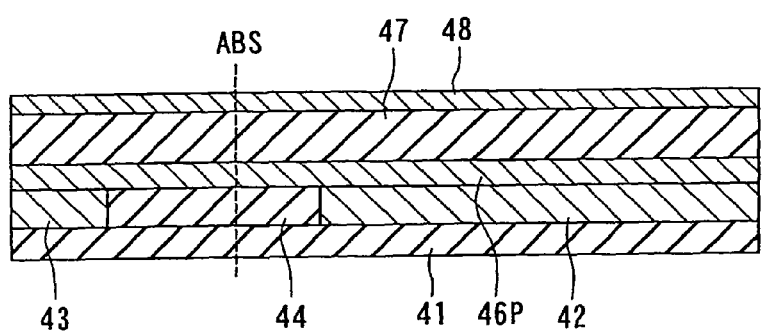 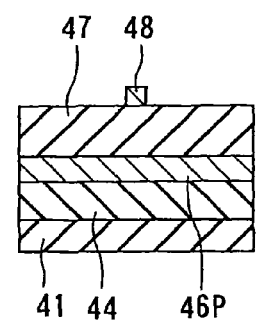
FIG. 37A  FIG. 37B

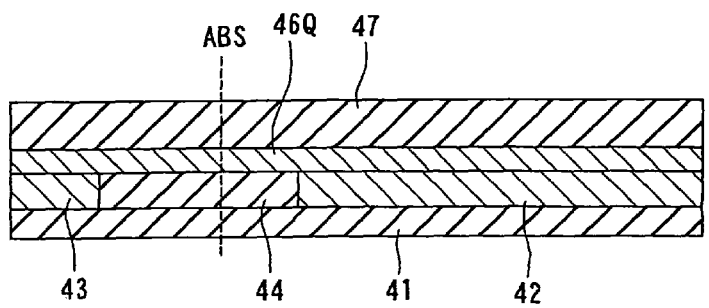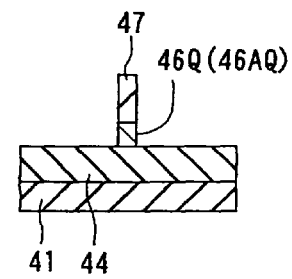
FIG. 38A  FIG. 38B
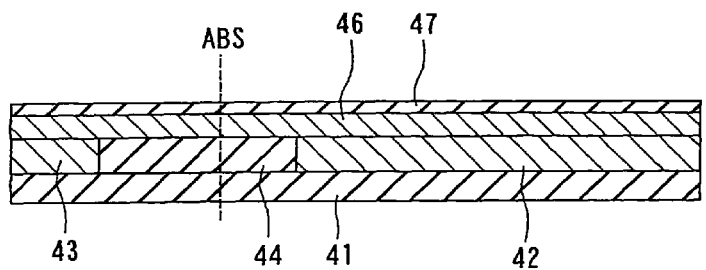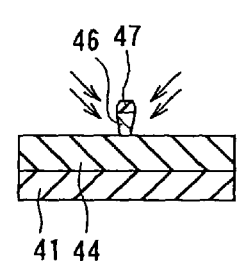
FIG. 39A  FIG. 39B
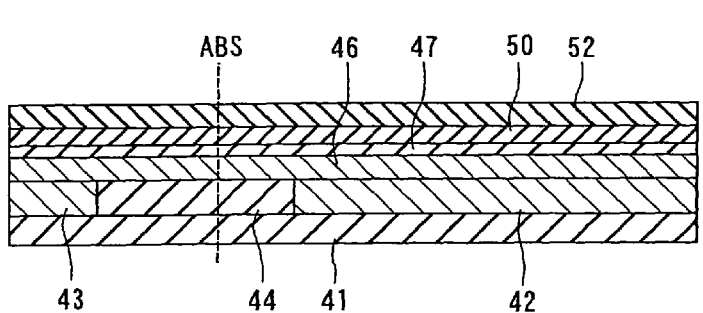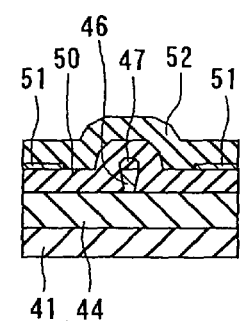
FIG. 40A  FIG. 40B

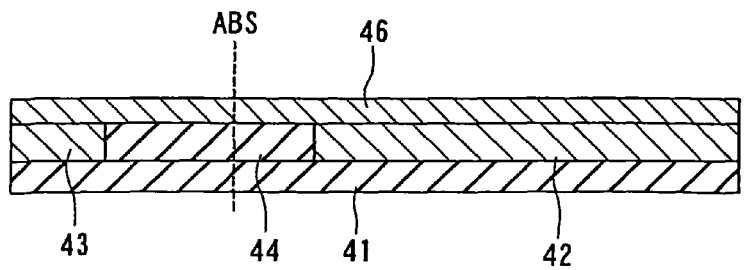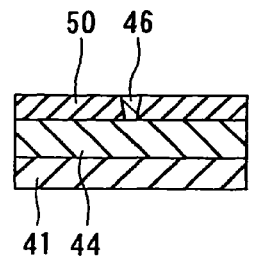
FIG. 41A  FIG. 41B
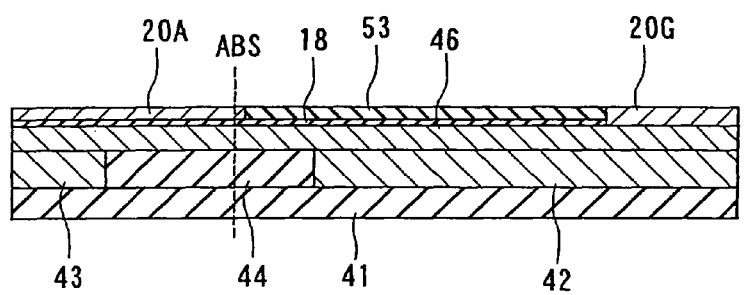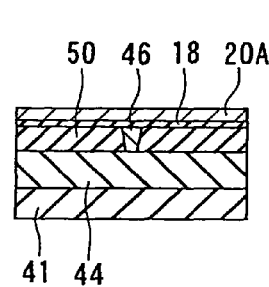
FIG. 42A  FIG. 42B
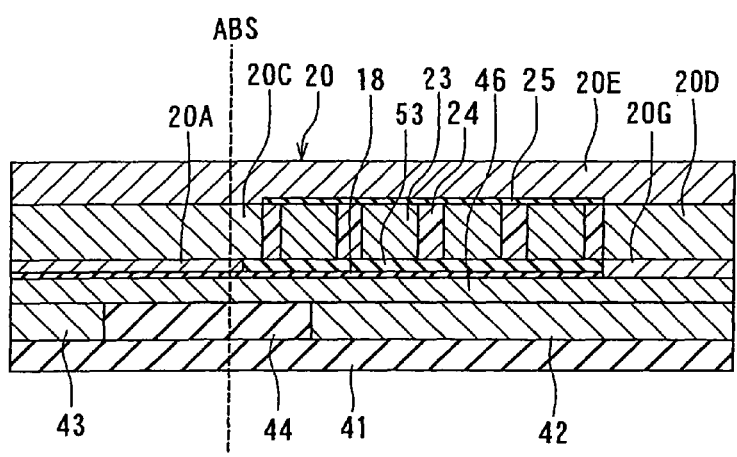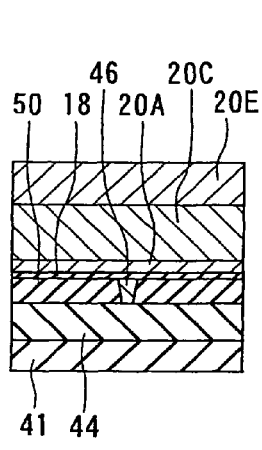
FIG. 43A  FIG. 43B

METHOD OF MANUFACTURING MAGNETIC HEAD, AND MAGNETIC HEAD SUB-STRUCTURE

This is a Division of application Ser. No. 11/022,820 filed Dec. 28, 2004, now U.S. Pat. No. 7,433,151. The disclosure of the prior application is hereby incorporated by reference herein in its entirety.

BACKGROUND OF THE INVENTION

1. Field of the Invention

The present invention relates to a method of manufacturing magnetic heads used for writing data on a recording medium and to a magnetic head substructure used for manufacturing magnetic heads.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction perpendicular to the surface of the recording medium. It is known that the perpendicular magnetic recording system is harder to be affected by thermal fluctuation of the recording medium and capable of implementing higher linear recording density, compared with the longitudinal magnetic recording system.

In each of the longitudinal magnetic recording system and the perpendicular magnetic recording system, magnetic heads typically used have a structure in which a reproducing (read) head having a magnetoresistive element (that may be hereinafter called an MR element) for reading and a recording (write) head having an induction-type electromagnetic transducer for writing are stacked on a substrate.

In each of the longitudinal and perpendicular magnetic recording systems, the write head comprises a coil for generating a magnetic field corresponding to data to be written on a recording medium, and a magnetic pole layer for allowing a magnetic flux corresponding to the field generated by the coil to pass therethrough and generating a write magnetic field for writing the data on the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

To achieve higher recording density, it is a reduction in track width, that is, a reduction in width of the end face of the pole layer taken in the medium facing surface, and an improvement in writing characteristics that is required for the write head. An improvement in writing characteristics is, for example, an improvement in overwrite property that is a parameter indicating an overwriting capability. The overwrite property is reduced if the track width is reduced. It is therefore required to achieve a better overwrite property as the track width is reduced. Here, the length of the track width defining portion taken in the direction orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, there arise problems, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in the Published U.S. Patent Application No. 2003/0151850A1, the Published Unexamined Japanese Patent Application 2003-203311, and the U.S. Pat. No. 6,504,675B1, for example. According to this technique, the end face of the track width defining portion located in the medium facing surface is made to have a shape in which the side located backward in the direction of travel of the recording medium (that is, the side located on the air-inflow-end side of the slider) is shorter than the opposite side. Typically, in the medium facing surface of a magnetic head, the end farther from the substrate is located forward in the direction of travel of the recording medium (that is, on the air-outflow-end side of the slider). Therefore, the above-mentioned shape of the end face of the track width defining portion located in the medium facing surface is such that the side closer to the substrate is shorter than the side farther from the substrate.

As a magnetic head for the perpendicular magnetic recording system, a magnetic head comprising a pole layer and a shield is known, as disclosed in the U.S. Pat. No. 4,656,546, for example. In the medium facing surface of this magnetic head, an end face of the shield is located forward of an end face of the pole layer along the direction of travel of the recording medium with a specific small space. Such a magnetic head will be hereinafter called a shield-type head. In the shield-type head, the shield prevents a magnetic flux from reaching the recording medium, the flux being generated from the end face of the pole layer and extending in directions except the direction perpendicular to the surface of the recording medium. The shield-type head achieves a further improvement in linear recording density.

The U.S. Pat. No. 4,672,493 discloses a magnetic head having a structure in which magnetic layers are provided forward and backward, respectively, in the direction of travel of the recording medium with respect to a middle magnetic layer to be the pole layer, and coils are disposed between the middle magnetic layer and the forward magnetic layer, and between the middle magnetic layer and the backward magnetic layer, respectively. This magnetic head is capable of increasing components perpendicular to the surface of the recording medium among components of the magnetic field generated from the medium-facing-surface-side end of the middle magnetic layer.

Consideration will now be given to a method of forming a pole layer in which the end face of the track width defining portion located in the medium facing surface has a shape in which the side closer to the substrate is shorter than the side farther from the substrate, as mentioned above. In prior art, frame plating has been often employed as a method of forming such a pole layer. According to the method of forming the pole layer by frame plating, an electrode film is first formed on a layer serving as a base of the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, portions of the electrode film except the portion below the pole layer are removed.

When frame plating is employed, it is difficult to form a groove having a small width in the photoresist layer by photolithography. Therefore, the problem is that it is difficult to reduce the track width when the pole layer is formed by frame plating. To solve this problem, it is possible that, after forming the pole layer by frame plating, both side portions of the track width defining portion are etched by dry etching such as ion beam etching so as to reduce the track width.

In the course of manufacturing magnetic heads, a plurality of magnetic head elements to be the magnetic heads are formed in a single substrate (wafer). The substrate in which the magnetic head elements are formed is cut such that the surface to be the medium facing surfaces appears. This surface is then polished to form the medium facing surfaces.

FIG. 44 illustrates an example of shape of the top surface of the pole layer when the track width is reduced by etching both side portions of the track width defining portion as described above. FIG. 44 illustrates a neighborhood of the boundary between the track width defining portion indicated with numeral 201 and the wide portion indicated with numeral 202. In FIG. 44, 'ABS' indicates a region in which the medium facing surface is to be formed, 'TW' indicates the track width, and 'NH' indicates the neck height as designed.

When the track width TW is reduced by etching the side portions of the track width defining portion 201, it is likely that the pole layer goes out of a desired shape. As a result, particularly when the neck height NH is small, it is likely that the track width defining portion 201 forms a shape in which the width varies depending on the location along the direction orthogonal to the medium facing surface (the vertical direction in FIG. 44), as shown in FIG. 44.

When the track width defining portion 201 has a shape as shown in FIG. 44, the neck height is strictly the length between the region ABS and the point at which the width of the track width defining portion 201 starts to be greater than the width thereof in the region ABS. However, if the neck height is thus defined, it is difficult to precisely determine the neck height when the track width defining portion 201 has the shape as shown in FIG. 44. Therefore, the neck height is defined as will be described below when the track width defining portion 201 has the shape as shown in FIG. 44. In the top surface of the pole layer, an imaginary line L1 passes through the intersection point of the region ABS and the side portion of the track width defining portion 201, and extends in the direction orthogonal to the region ABS. An imaginary line L2 extends from a straight line portion of the side portion of the wide portion 202 connected to the side portion of the portion 201 and extends in the direction in which the straight line portion extends. The intersection point of the imaginary lines L1 and L2 is defined as C. The distance between the region ABS and the point C is defined as the neck height. The neck height as thus defined is nearly equal to the neck height NH as designed.

When the track width defining portion 201 has the shape as shown in FIG. 44, it is impossible to obtain the track width TW in the course of manufacturing process of the magnetic heads unless the location of the region ABS in which the medium facing surface is to be formed is known. In prior art, however, it is impossible to obtain a correct location of the region ABS in the course of manufacturing process of the magnetic heads, and it is therefore impossible to obtain a correct track width TW. Consequently, in prior art, even if the track width TW is out of a desired value in the course of manufacturing process of the magnetic heads, it is impossible to recognize that until the head is completed, which results in a reduction in efficiency in manufacturing the magnetic heads.

OBJECT AND SUMMARY OF THE INVENTION

It is an object of the invention to provide a method of manufacturing magnetic heads and a magnetic head substructure for allowing the track width to be obtained with accuracy in the course of manufacturing process of the magnetic heads.

Each of magnetic heads manufactured by the manufacturing method of the invention comprises: a medium facing surface that faces toward a recording medium; a coil that generates a magnetic field corresponding to data to be written on the recording medium; and a pole layer that incorporates a track width defining portion having an end face located in the medium facing surface, the pole layer allowing a magnetic flux corresponding to the field generated by the coil to pass therethrough and generating a write magnetic field for writing the data on the recording medium.

The method of manufacturing the magnetic heads of the invention comprises the steps of: fabricating a magnetic head substructure by forming a plurality of sets of the pole layer and the coil in a substrate, wherein a plurality of rows of pre-head portions that will be the respective magnetic heads later are aligned in the substructure; and fabricating the magnetic heads by separating the pre-head portions from one another through cutting the substructure. The step of fabricating the substructure includes the step of forming a plurality of indicators each of which serves as a reference for indicating the location of a region in which the medium facing surfaces of the magnetic heads are to be formed.

According to the method of manufacturing the magnetic heads of the invention, a plurality of indicators are formed in the step of fabricating the substructure. Each of the indicators serves as a reference for indicating the location of a region in which the medium facing surfaces of the magnetic heads are to be formed. As a result, in the course of manufacturing process of the magnetic heads, it is possible to obtain the location of the region in which the medium facing surfaces are to be formed. It is thereby possible to obtain the track width with accuracy.

In each of the magnetic heads manufactured by the method of the invention, the end face of the track width defining portion located in the medium facing surface may have: a first side close to the substrate; a second side located opposite to the first side; a third side connecting an end of the first side to an end of the second side; and a fourth side connecting the other end of the first side to the other end of the second side. In addition, the second side may define the track width, and the end face of the track width defining portion may have a width that decreases as the distance from the first side decreases.

In the method of the invention, the indicators may be formed on both sides of the track width defining portion, the sides being opposed to each other in a direction of width of the defining portion, in the step of forming the indicators. In this case, in the substructure, each of the pole layers and the indicators may be conductive, and the indicators may be electrically connected to the respective pole layers.

In the method of the invention, the step of fabricating the substructure may further include the step of forming an encasing layer having grooves that accommodate the pole layers, and the pole layers may be disposed in the grooves of the encasing layer. In this case, in the step of forming the indicators, the indicators may be formed of a layer located at a height the same as the height at which the pole layers are located.

In the method of the invention, the step of fabricating the substructure may further include the step of forming a magnetic layer having portions that will be the pole layers, and the indicators may be made up of other portions of the magnetic layer. In this case, the step of fabricating the substructure may further include the step of forming an encasing layer having a groove that accommodates the magnetic layer, and the magnetic layer may be disposed in the groove of the encasing layer.

In the method of the invention, the step of fabricating the substructure may further include the step of forming a magnetic layer having portions that will be the pole layers, and the indicators may be made up of a layer other than the magnetic layer. In this case, the step of fabricating the substructure may further include the step of forming an encasing layer having a first groove that accommodates the magnetic layer and second grooves that accommodate the indicators, the magnetic layer may be formed in the first groove of the encasing layer, and the indicators may be formed in the second grooves.

In the method of the invention, the indicators may be formed of a layer located closer to the substrate than the pole layers in the step of forming the indicators.

In the method of the invention, the indicators may be formed of a layer having conductivity.

In the method of the invention, the step of fabricating the substructure may further include the step of forming an encasing layer having grooves that accommodate the pole layers and other grooves that form the indicators.

In the method of the invention, each of the indicators may have an end that is parallel to the region in which the medium facing surfaces are to be formed, and the location of the end may serve as a reference for indicating the location of the region. In this case, the distance between the location of the reference and the region may fall within a range of 0 to 1.0 µm inclusive.

In the method of the invention, each of the indicators may have two ends that are parallel to the region in which the medium facing surfaces are to be formed, and the location of the middle between the two ends may serve as a reference for indicating the location of the region. In this case, the distance between the location of the reference and the region may fall within a range of 0 to 1.0 µm inclusive.

In the method of the invention, in the substructure, the distance between the track width defining portion and the indicators taken in the direction of width of the defining portion may fall within a range of 0.1 to 5.0 µm inclusive.

In the method of the invention, the indicators may be located in a region that will not remain in the magnetic heads.

In the method of the invention, at least part of each of the indicators may be located in a region that will remain in the magnetic heads. In this case, the part of each of the indicators that remains in the magnetic heads may indicate the length of the track width defining portion taken in the direction orthogonal to the medium facing surface. The method of manufacturing the magnetic heads may further comprise the step of measuring the length of the track width defining portion taken in the direction orthogonal to the medium facing surface by measuring the length of the part of each of the indicators that remains in the magnetic heads taken in the direction orthogonal to the medium facing surface, the step being performed after the step of fabricating the magnetic heads.

In the method of the invention, the step of fabricating the magnetic heads may include the step of forming the medium facing surfaces by polishing a surface formed by cutting the substructure.

In the method of the invention, the magnetic heads may be those used for a perpendicular magnetic recording system.

A magnetic head substructure of the invention are used for manufacturing magnetic heads. Each of the magnetic heads comprises: a medium facing surface that faces toward a recording medium; a coil that generates a magnetic field corresponding to data to be written on the recording medium; and a pole layer that incorporates a track width defining portion having an end face located in the medium facing surface, the pole layer allowing a magnetic flux corresponding to the field generated by the coil to pass therethrough and generating a write magnetic field for writing the data on the recording medium.

The substructure of the invention comprises: a substrate; a plurality of sets of the pole layer and the coil formed in the substrate such that a plurality of rows of pre-head portions that will be the respective magnetic heads later are aligned; and a plurality of indicators each of which serves as a reference for indicating a region in which the medium facing surfaces of the magnetic heads are to be formed.

The substructure of the invention includes a plurality of indicators each of which serves as a reference for indicating the location of a region in which the medium facing surfaces of the magnetic heads are to be formed. As a result, in the course of manufacturing process of the magnetic heads, it is possible to obtain the location of the region in which the medium facing surfaces are to be formed. It is thereby possible to obtain the track width with accuracy.

In each of the magnetic heads manufactured through the use of the substructure of the invention, the end face of the track width defining portion located in the medium facing surface may have: a first side close to the substrate; a second side located opposite to the first side; a third side connecting an end of the first side to an end of the second side; and a fourth side connecting the other end of the first side to the other end of the second side. In addition, the second side may define the track width, and the end face of the track width defining portion may have a width that decreases as the distance from the first side decreases.

In the substructure of the invention, the indicators may be provided on both sides of the track width defining portion, the sides being opposed to each other in a direction of width of the defining portion. In this case, each of the pole layers and the indicators may be conductive, and the indicators may be electrically connected to the respective pole layers.

The substructure of the invention may further comprise an encasing layer having grooves that accommodate the pole layers. In this case, the indicators may be made of a layer located at a height the same as the height at which the pole layers are located.

The substructure of the invention may further comprise a magnetic layer having portions that will be the pole layers, and the indicators may be made up of other portions of the magnetic layer. In this case, the substructure may further comprise an encasing layer having a groove that accommodates the magnetic layer.

The substructure of the invention may further comprise a magnetic layer having portions that will be the pole layers, wherein the indicators are made up of a layer other than the magnetic layer. In this case, the substructure may further comprise an encasing layer having a first groove that accommodates the magnetic layer and second grooves that accommodate the indicators.

In the substructure of the invention, the indicators may be made of a layer located closer to the substrate than the pole layers.

In the substructure of the invention, the indicators may be made of a layer having conductivity.

The substructure of the invention may further comprise an encasing layer having grooves that accommodate the pole layers and other grooves that form the indicators.

In the substructure of the invention, each of the indicators may have an end that is parallel to the region in which the medium facing surfaces are to be formed, and the location of the end may serve as a reference for indicating the location of the region. In this case, the distance between the location of the reference and the region may fall within a range of 0 to 1.0 µm inclusive.

In the substructure of the invention, each of the indicators may have two ends that are parallel to the region in which the medium facing surfaces are to be formed, and the location of the middle between the two ends may serve as a reference for indicating the location of the region. In this case, the distance between the location of the reference and the region may fall within a range of 0 to 1.0 µm inclusive.

In the substructure of the invention, the distance between the track width defining portion and the indicators taken in the direction of width of the defining portion may fall within a range of 0.1 to 5.0 µm inclusive.

In the substructure of the invention, the indicators may be located in a region that will not remain in the magnetic heads.

In the substructure of the invention, at least part of each of the indicators may be located in a region that will remain in the magnetic heads. In this case, the part of each of the indicators that remains in the magnetic heads may indicate the length of the track width defining portion taken in the direction orthogonal to the medium facing surface.

In the substructure of the invention, the magnetic heads may be those used for the perpendicular magnetic recording system.

According to the method of manufacturing the magnetic heads of the invention, in the step of fabricating the substructure, a plurality of indicators are formed each of which serves as the reference for indicating the location of the region in which the medium facing surfaces of the magnetic heads are to be formed. As a result, according to the invention, it is possible to obtain the location of the region in which the medium facing surfaces are to be formed, in the course of manufacturing process of the magnetic heads. It is thereby possible to obtain the track width with accuracy.

The magnetic head substructure of the invention includes a plurality of indicators each of which serves as the reference for indicating the location of the region in which the medium facing surfaces of the magnetic heads are to be formed. As a result, according to the invention, it is possible to obtain the location of the region in which the medium facing surfaces are to be formed, in the course of manufacturing process of the magnetic heads. It is thereby possible to obtain the track width with accuracy.

In each of the magnetic heads manufactured by the method of the invention or manufactured through the use of the substructure of the invention, the end face of the track width defining portion located in the medium facing surface may have: a first side close to the substrate; a second side located opposite to the first side; a third side connecting an end of the first side to an end of the second side; and a fourth side connecting the other end of the first side to the other end of the second side. In addition, the second side may define the track width, and the end face of the track width defining portion may have a width that decreases as the distance from the first side decreases. In this case, it is possible to prevent the problems resulting from the skew.

In the method of the invention or the substructure of the invention, the indicators may be provided on both sides of the track width defining portion, the sides being opposed to each other in the direction of width of the defining portion. In this case, it is possible to obtain the location of the region in which the medium facing surfaces are to be formed with higher accuracy, using the two indicators provided on both sides of the track width defining portion as the reference.

In the method of the invention or the substructure of the invention, each of the pole layers and the two indicators provided on both sides of the track width defining portion opposed to each other in the direction of width of the defining portion may be conductive, and the indicators may be electrically connected to the respective pole layers. In this case, when the indicators are observed by an electron microscope, it is possible to prevent electric charges from accumulating on the indicators. It is thereby possible to obtain correct images of the indicators. It is thereby possible to obtain the location of the region in which the medium facing surfaces are to be formed with higher accuracy.

In the method of the invention or the substructure of the invention, the part of each of the indicators that remains in the magnetic heads may indicate the length of the track width defining portion taken in the direction orthogonal to the medium facing surface. In this case, after the magnetic heads are completed, it is possible to measure the length of the track width defining portion taken in the direction orthogonal to the medium facing surface by measuring the length of the part of each of the indicators that remains in the magnetic heads taken in the direction orthogonal to the medium facing surface.

Other and further objects, features and advantages of the invention will appear more fully from the following description.

BRIEF DESCRIPTION OF THE DRAWINGS

FIG. 35A and FIG. 35B are views for illustrating a step of a method of manufacturing a magnetic head of the sixth embodiment of the invention.

FIG. 36A and FIG. 36B are views for illustrating a step that follows the step shown in FIG. 35A and FIG. 35B.

FIG. 37A and FIG. 37B are views for illustrating a step that follows the step shown in FIG. 36A and FIG. 36B.

FIG. 38A and FIG. 38B are views for illustrating a step that follows the step shown in FIG. 37A and FIG. 37B.

FIG. 39A and FIG. 39B are views for illustrating a step that follows the step shown in FIG. 38A and FIG. 38B.

FIG. 40A and FIG. 40B are views for illustrating a step that follows the step shown in FIG. 39A and FIG. 39B.

FIG. 41A and FIG. 41B are views for illustrating a step that follows the step shown in FIG. 40A and FIG. 40B.

FIG. 42A and FIG. 42B are views for illustrating a step that follows the step shown in FIG. 41A and FIG. 41B.

FIG. 43A and FIG. 43B are views for illustrating a step that follows the step shown in FIG. 42A and FIG. 42B.

DETAILED DESCRIPTION OF THE PREFERRED EMBODIMENTS

First Embodiment

Figure 2:
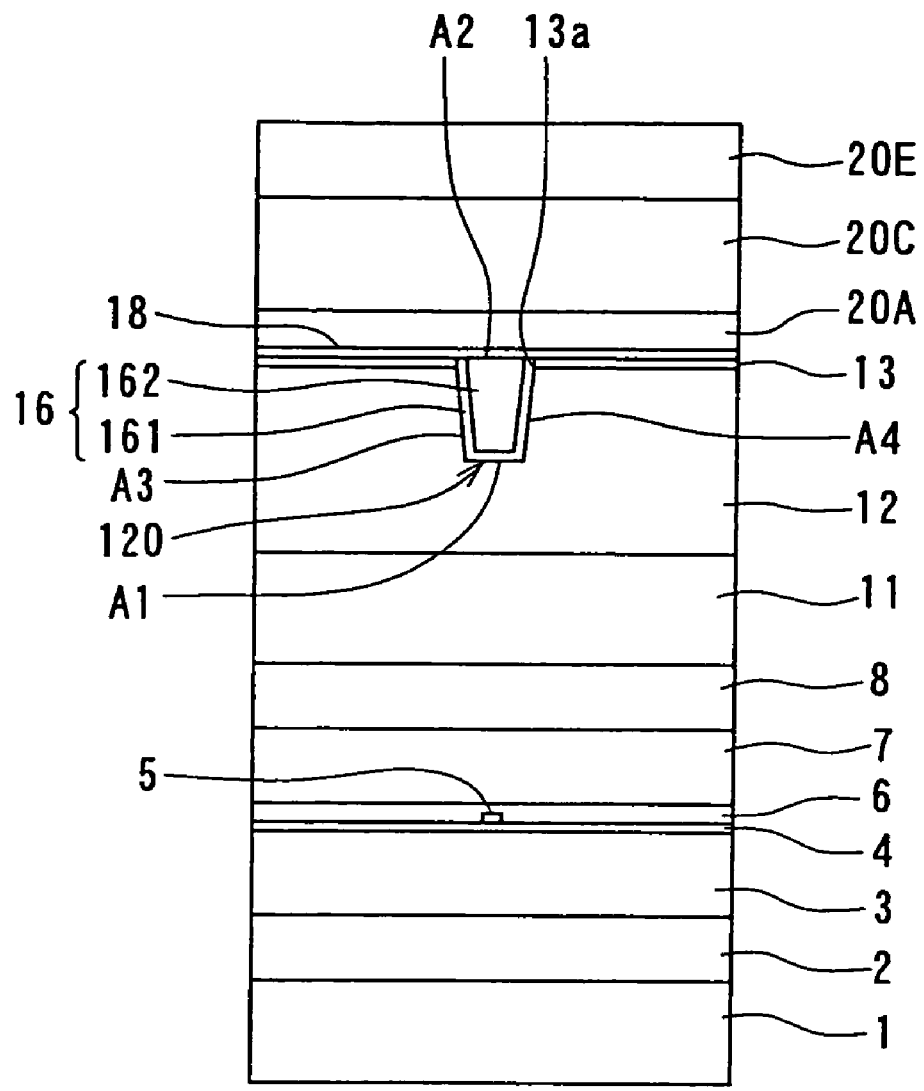
FIG. 2 is a front view of the medium facing surface of a magnetic head of the first embodiment of the invention.
Figure 3:
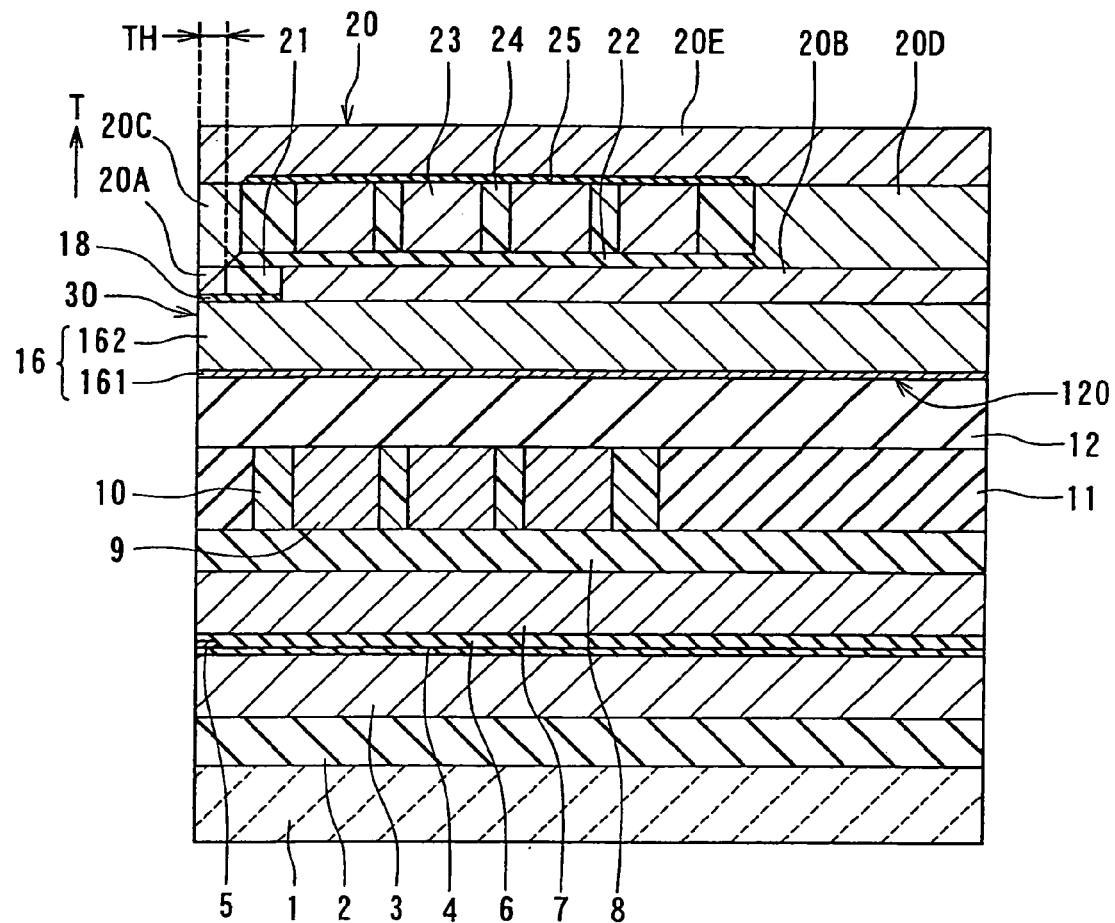
FIG. 3 is a cross-sectional view for illustrating the configuration of the magnetic head of the first embodiment of the invention.

Preferred embodiments of the invention will now be described in detail with reference to the accompanying drawings. Reference is now made to FIG. 2 and FIG. 3 to describe a manufacturing method and the configuration of a magnetic head manufactured through the use of a magnetic head substructure of a first embodiment of the invention. Here, a magnetic head for the perpendicular magnetic recording system will be described as an example of the magnetic head. FIG. 2 is a front view for illustrating the medium facing surface of the magnetic head of the embodiment. FIG. 3 is a cross-sectional view for illustrating the configuration of the magnetic head of the embodiment. FIG. 3 illustrates a cross section orthogonal to the medium facing surface and a surface of a substrate. The arrow indicated with T in FIG. 3 shows the direction of travel of a recording medium.

As shown in FIG. 2 and FIG. 3, the magnetic head of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6. The portion from the bottom shield layer 3 to the top shield layer 7 make up the read head.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: an insulating layer 8 made of an insulating material and disposed on the top shield layer 7; a coil 9 formed on the insulating layer 8; an insulating layer 10 made of an insulating material and disposed around the coil 9 and in the space between adjacent ones of the turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 8 and 11 are made of alumina, for example. The insulating layer 10 is made of photoresist, for example. The coil 9 is made of a conductive material such as copper.

The magnetic head further comprises an encasing layer 12 made of a nonmagnetic material and disposed on the flattened top surfaces of the coil 9 and the insulating layers 10 and 11. The encasing layer 12 has a groove 120 that opens in the top surface thereof and that accommodates the pole layer described later. Although the groove 120 does not penetrate the encasing layer 12 in FIG. 2 and FIG. 3, the groove 120 may penetrate the encasing layer 12. The encasing layer 12 may be made of any of alumina, silicon oxide ($SiO_x$), and silicon oxynitride (SiON), for example.

The magnetic head further comprises a polishing stopper layer 13 made of a nonmagnetic conductive material and disposed on the top surface of the encasing layer 12. The polishing stopper layer 13 has an opening 13a that penetrates, and the edge of the opening 13a is located directly above the edge of the groove 120 in the top surface of the encasing layer 12. The polishing stopper layer 13 may be made of any of Ta, Mo, W, Ti, Ru, Rh, Re, Pt, Pd, Ir, TiN, TiW and NiCr, for example.

The magnetic head further comprises the pole layer 16 disposed in the groove 120. The pole layer 16 incorporates: a first layer 161 located closer to the surface of the groove 120; and a second layer 162 located farther from the surface of the groove 120. The polishing stopper layer 13 and the pole layer 16 have flattened top surfaces.

Each of the first layer 161 and the second layer 162 is made of a magnetic material. The first layer 161 may be made of any of CoFeN, CoNiFe and NiFe, for example. The second layer 162 may be made of any of NiFe, CoNiFe and CoFe, for example.

The magnetic head further comprises a gap layer 18 disposed on the flattened top surfaces of the polishing stopper layer 13 and the pole layer 16. The gap layer 18 has an opening located at a distance from the medium facing surface 30. The gap layer 18 may be made of an insulating material such as alumina or a nonmagnetic metal material such as Ru, NiCu, Ta, W or NiB.

The magnetic head further comprises a shield layer 20. The shield layer 20 has: a first layer 20A disposed on the gap layer 18; a second layer 20C disposed on the first layer 20A; a yoke layer 20B disposed on a portion of the pole layer 16 where the opening of the gap layer 18 is formed; a coupling layer 20D disposed on the yoke layer 20B; and a third layer 20E disposed to couple the second layer 20C to the coupling layer 20D. The first layer 20A, the yoke layer 20B, the second layer 20C, the coupling layer 20D and the third layer 20E are each made of a magnetic material. These layers 20A to 20E may be made of any of CoFeN, CoNiFe and NiFe, for example.

The magnetic head further comprises a nonmagnetic layer 21 made of a nonmagnetic material and disposed around the yoke layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, Cu or Ni.

The magnetic head further comprises: an insulating layer 22 disposed on regions of the top surfaces of the yoke layer 20B and the nonmagnetic layer 21 in which a coil described later is disposed; the coil 23 disposed on the insulating layer 22; an insulating layer 24 disposed around the coil 23 and in the space between adjacent ones of the turns of the coil 23; and an insulating layer 25 disposed on the coil 23 and the insulating layer 24. The coil 23 is flat-whorl-shaped. A portion of the coil 23 passes between the second layer 20C and the coupling layer 20D. The coil 23 is made of a conductive material such as copper. The second layer 20C, the coupling layer 20D, the coil 23 and the insulating layer 24 have flattened top surfaces. The insulating layer 24 is made of photoresist, for example. The insulating layers 22 and 25 are made of alumina, for example.

The portion from the coil 9 to the third layer 20E of the shield layer 20 make up the write head. Although not shown, the magnetic head further comprises a protection layer for covering the shield layer 20.

As described so far, the magnetic head of the embodiment comprises the medium facing surface 30 that faces toward a recording medium, the read head, and the write head. The read head and the write head are stacked on the substrate 1. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the encasing layer 12, the polishing stopper layer 13, the pole layer 16, the gap layer 18, the shield layer 20, and the coil 23. The coils 9 and 23 generate a magnetic field corresponding to data to be written on the recording medium. The coil 9 is not a component requisite for the write head and may be omitted.

The pole layer 16 has an end face located in the medium facing surface 30. The pole layer 16 allows the magnetic flux corresponding to the field generated by the coil 23 to pass therethrough and generates a write magnetic field for writing the data on the medium by using the perpendicular magnetic recording system.

The shield layer 20 has an end located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end face of the shield layer 20 is disposed forward of the end face of the track width defining portion 16A along the direction T of travel of the recording medium with a specific space created by the thickness of the gap layer 18. At least part of the coil 23 is disposed between the pole layer 16 and the shield layer 20 and insulated from the pole layer 16 and the shield layer 20.

The shield layer 20 has: the first layer 20A disposed adjacent to the gap layer 18; the second layer 20C disposed on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The second layer 20C is disposed between the medium facing surface 30 and the at least part of the coil 23.

Figure 4:
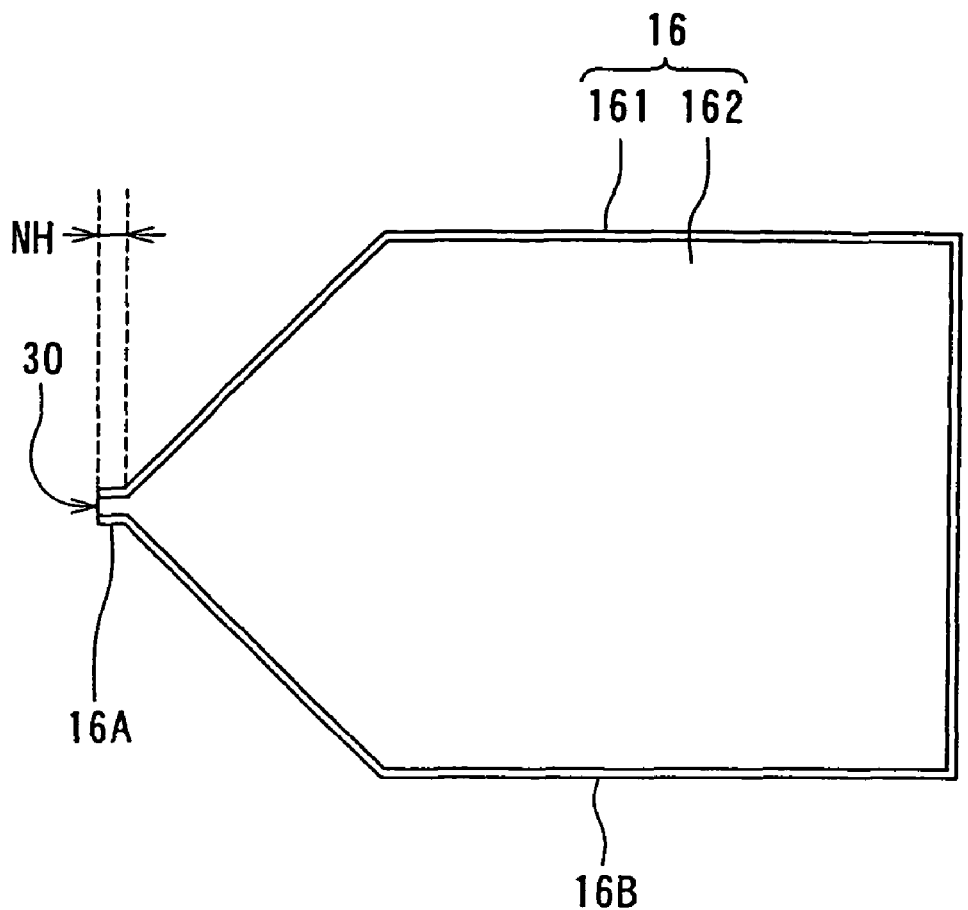
FIG. 4 is a top view of the pole layer of the magnetic head of the first embodiment of the invention.

FIG. 4 is a top view of the pole layer 16. As shown in FIG. 4, the pole layer 16 incorporates the track width defining portion 16A and a wide portion 16B. The track width defining portion 16A has an end located in the medium facing surface 30 and has a uniform width. The wide portion 16B is coupled to the other end of the track width defining portion 16A and has a width greater than the width of the track width defining portion 16A. The wide portion 16B is equal in width to the track width defining portion 16A at the interface with the track width defining portion 16A, and gradually increases in width as the distance from the medium facing surface 30 increases and then maintains a specific width to the end of the wide portion 16B. Here, the length of the track width defining portion 16A taken in the direction orthogonal to the medium facing surface 30 is called a neck height NH. The neck height NH falls within a range of 0.1 to 0.3 μm inclusive, for example.

As shown in FIG. 2, the end face of the track width defining portion 16A located in the medium facing surface 30 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the track width defining portion 16A located in the medium facing surface 30 decreases as the distance from the first side A1 decreases.

The length of the second side A2, that is, the track width, falls within a range of 0.08 to 0.12 μm inclusive, for example. The thickness of the pole layer 16 falls within a range of 0.20 to 0.30 μm inclusive, for example. Each of the third side A3 and the fourth side A4 forms an angle that falls within a range of 5 to 12 degrees inclusive, for example, with respect to the direction orthogonal to the top surface of the substrate 1. The thickness of the gap layer 18 falls within a range of 30 to 60 nm inclusive, for example.

The polishing stopper layer 13 is disposed on the top surface of the encasing layer 12. The polishing stopper layer 13 has the opening 13a that penetrates, and the edge of the opening 13a is located directly above the edge of the groove 120 in the top surface of the encasing layer 12. The polishing stopper layer 13 has a thickness that falls within a range of 20 to 60 nm inclusive, for example.

The pole layer 16 incorporates: the first layer 161 located closer to the surface of the groove 120; and the second layer 162 located farther from the surface of the groove 120. The first layer 161 has a thickness that falls within a range of 40 to 100 nm inclusive, for example.

The first layer 20A of the shield layer 20 has: a first end located in the medium facing surface 30; and a second end opposite to the first end. The second layer 20C of the shield layer 20 also has: a first end located in the medium facing surface 30; and a second end opposite to the first end. The second end of the first layer 20A defines the throat height TH. That is, as shown in FIG. 3, the throat height TH is the minimum distance between the first end and the second end of the portion of the first layer 20A facing toward the pole layer 16 with the gap layer 18 disposed in between. The throat height TH falls within a range of 0.1 to 0.3 μm inclusive, for example. The minimum distance between the first end and the second end of the portion of the second layer 20C facing toward the pole layer 16 with the gap layer 18 and the first layer 20A disposed in between falls within a range of 0.5 to 0.8 μm inclusive, for example. The first layer 20A and the yoke layer 20B have a thickness that falls within a range of 0.3 to 0.8 μm inclusive, for example. The second layer 20C and the coupling layer 20D have a thickness that falls within a range of 2.0 to 2.5 μm inclusive, for example. The third layer 20E has a thickness that falls within a range of 2.0 to 3.0 μm inclusive, for example. The coil 23 has a thickness that is equal to or smaller than the thickness of the second layer 20C and that falls within a range of 2.0 to 2.5 μm inclusive, for example.

In the drawings of the present patent application such as FIG. 3, the pole layer 16 is shown greater in thickness than the yoke layer 20B to illustrate details of the structure around the pole layer 16. However, the pole layer 16 actually has a thickness that is nearly equal to or smaller than the thickness of the yoke layer 20B, for example.

The magnetic head of the embodiment writes data on a recording medium by using the write head and reads data written on the recording medium by using the read head. In the write head, the coil 23 generates a magnetic field that corresponds to the data to be written on the medium. The pole layer 16 and the shield layer 20 form a magnetic path through which a magnetic flux corresponding to the magnetic field generated by the coil 23 passes. The pole layer 16 allows the flux corresponding to the field generated by the coil 23 to pass and generates a write magnetic field used for writing the data on the medium through the use of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield layer 20 is disposed forward of the end face of the track width defining portion 16A along the direction T of travel of the recording medium (that is, on the air-outflow-end side of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end face of the pole layer 16 located in the medium facing surface 30 and extending in directions except the direction orthogonal to the surface of the recording medium so as to prevent the flux from reaching the recording medium. It is thereby possible to prevent the direction of magnetization of the bit pattern already written on the medium from being changed due to the effect of the above-mentioned flux. According to the embodiment, an improvement in linear recording density is thus achieved.

According to the embodiment, as shown in FIG. 2, the end face of the track width defining portion 16A located in the medium facing surface 30 has a width that decreases as the distance from the first side A1 decreases. It is thereby possible to prevent the problems resulting from the skew.

Reference is now made to FIG. 5A to FIG. 16A, and FIG. 5B to FIG. 16B to describe a method of manufacturing the magnetic head of the embodiment and a magnetic head substructure of the embodiment. The method of manufacturing the magnetic head of the embodiment comprises the steps of: fabricating the magnetic head substructure in which a plurality of rows of pre-head portions to be the magnetic heads are aligned by forming components of a plurality of magnetic heads in a single substrate; and fabricating the magnetic heads by separating the pre-head portions through cutting the magnetic head substructure. One of the pre-head portions will now be described. Portions closer to the substrate 1 than the encasing layer 12 are omitted in FIG. 5A to FIG. 16A, and FIG. 5B to FIG. 16B. 'ABS' indicates a region in which the medium facing surface is to be formed.

According to the method of manufacturing the magnetic head of the embodiment, as shown in FIG. 3, the insulating layer 2, the bottom shield layer 3 and the bottom shield gap film 4 are first formed on the substrate 1 one by one. Next, the MR element 5 and a lead not shown that is connected to the MR element 5 are formed on the bottom shield gap film 4. Next, the MR element 5 and the lead are covered with the top shield gap film 6. Next, the top shield layer 7 and the insulating layer 8 are formed one by one on the top shield gap film 6. Next, the coil 9 and the insulating layers 10 and 11 are formed on the insulating layer 8. Next, the top surfaces of the coil 9 and the insulating layers 10 and 11 are flattened by chemical mechanical polishing (hereinafter referred to as CMP), for example.

Figure 5A:
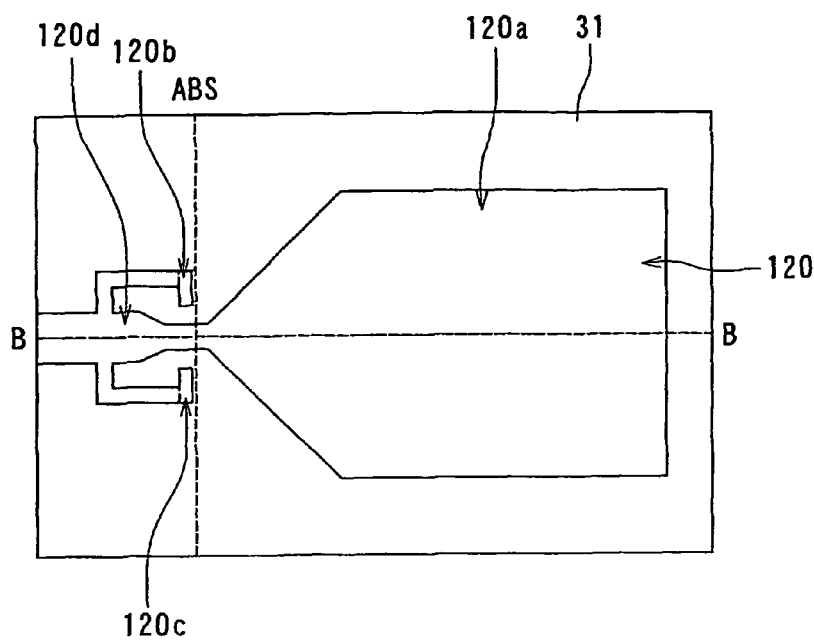
FIG. 5A and FIG. 5B are views for illustrating a step of a method of manufacturing the magnetic head of the first embodiment of the invention.
Figure 5B:
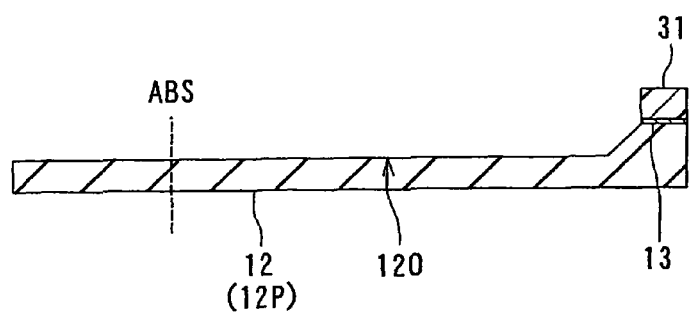
Figures 6A, 6B:
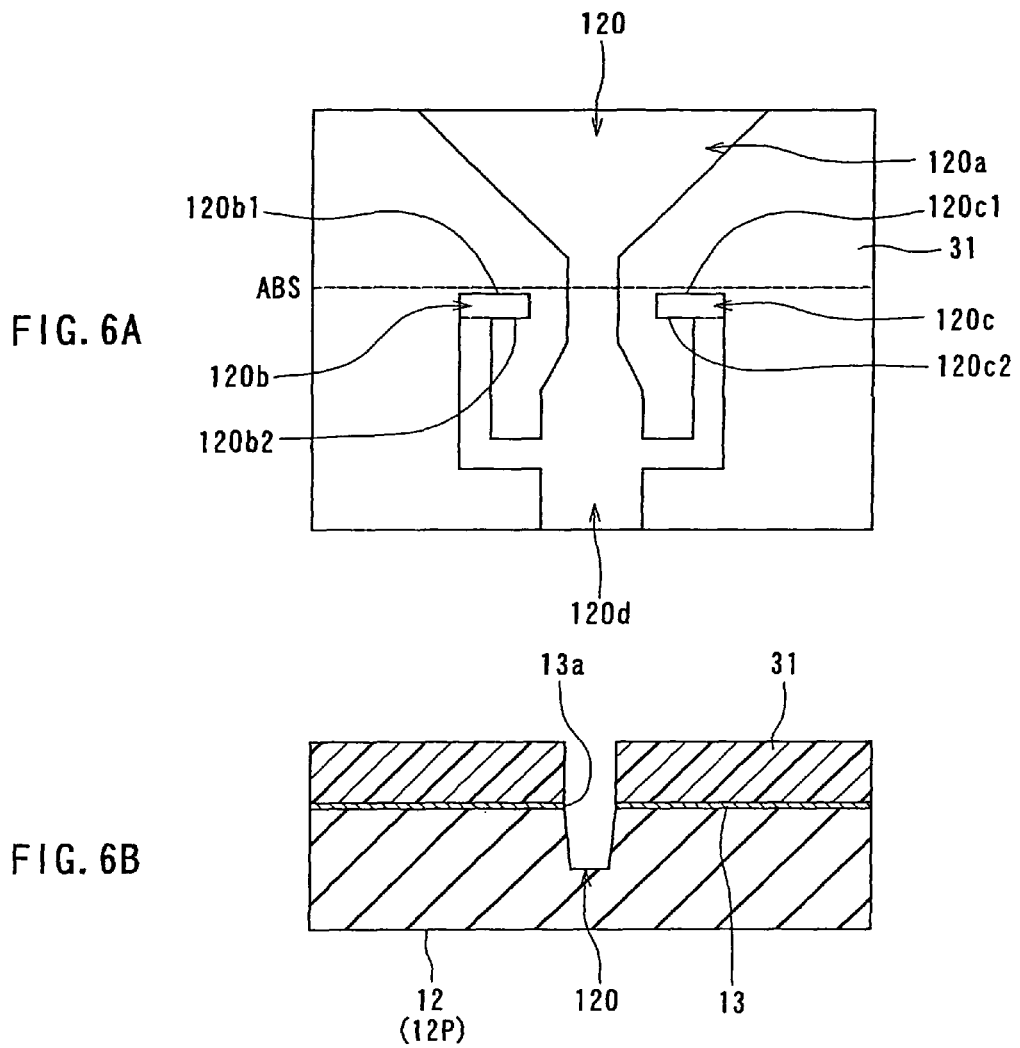
FIG. 6A and FIG. 6B are views for illustrating the main part of FIG. 5A and FIG. 5B.

FIG. 5A, FIG. 5B, FIG. 6A and FIG. 6B illustrate the following step. FIG. 5A shows the top surface of the layered structure obtained in the course of manufacturing process of the magnetic head. FIG. 5B shows a cross section of the layered structure orthogonal to the medium facing surface and the substrate. FIG. 5B is a cross section taken along line B-B of FIG. 5A. FIG. 6A is an enlarged view of neighborhood of the region ABS of FIG. 5A. FIG. 6B is a cross section corresponding to the region ABS of FIG. 6A. In the step, first, a nonmagnetic layer 12P is formed on the flattened top surfaces of the coil 9 and the insulating layers 10 and 11. The groove 120 will be formed later in the nonmagnetic layer 12P and the nonmagnetic layer 12P will be thereby formed into the encasing layer 12. Next, the polishing stopper layer 13 is formed by sputtering, for example, on the nonmagnetic layer 12P. Next, a photoresist layer having a thickness of 1.0 μm, for example, is formed on the polishing stopper layer 13. The photoresist layer is then patterned to form a mask 31 for making the groove 120 of the encasing layer 12. The mask 31 has an opening having a shape corresponding to the groove 120.

Next, the polishing stopper layer 13 is selectively etched, using the mask 31. The opening 13a that penetrates is thereby formed in the polishing stopper layer 13. The opening 13a has a shape corresponding to the plane geometry of a magnetic layer 160 to be formed later. A portion of the magnetic layer 160 will be formed into the pole layer 16. Furthermore, a portion of the nonmagnetic layer 12P exposed from the opening 13a of the polishing stopper layer 13 is selectively etched so as to form the groove 120 in the nonmagnetic layer 12P. The mask 31 is then removed. The nonmagnetic layer 12P is formed into the encasing layer 12 by forming the groove 120 therein. The polishing stopper layer 13 indicates the level at which polishing to be performed later is stopped. The edge of the opening 13a of the polishing stopper layer 13 is located directly above the edge of the groove 120 located in the top surface of the encasing layer 12.

The etching of each of the polishing stopper layer 13 and the nonmagnetic layer 12P is performed by reactive ion etching or ion beam etching, for example. The etching for forming the groove 120 in the nonmagnetic layer 12P is performed such that the walls of the groove 120 corresponding to both sides of the track width defining portion 16A of the pole layer 16 each form an angle that falls within a range of 5 to 12 degrees inclusive, for example, with respect to the direction orthogonal to the top surface of the substrate 1.

As shown in FIG. 5A and FIG. 6A, the groove 120 includes a portion 120a corresponding to the pole layer, indicator portions 120b and 120c, and a coupling portion 120d. The portion 120a corresponding to the pole layer is a portion in which the pole layer 16 will be placed later. The portion 120a is shown as a portion of the groove 120 on the right hand of the region ABS in FIG. 5A, and a portion of the groove 120 located higher than the region ABS in FIG. 6A. The indicator portions 120b and 120c correspond to the indicators of the invention, and each serve as a reference for indicating the location of the ABS. The shape of each of the indicator portions 120b and 120c in the top surface of the nonmagnetic layer 12P is rectangular. The coupling portion 120d is a portion of the groove 120 for coupling the portion 120a to the indicator portions 120b and 120c. The portion 120a corresponds to one of the 'grooves that accommodate the pole layers' of the invention. The indicator portions 120b and 120c correspond to the 'other grooves that form the indicators'.

Figure 1:
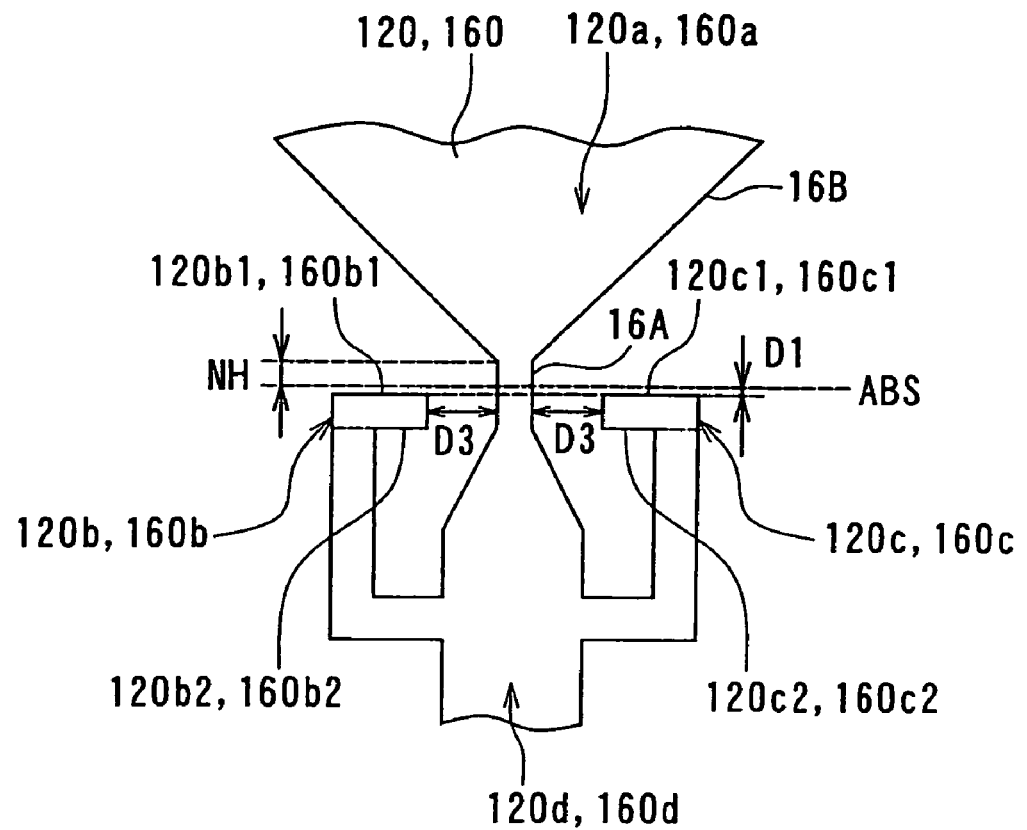
FIG. 1 illustrates indicator portions of a first embodiment of the invention.

Reference is now made to FIG. 1 to describe the indicator portions 120b and 120c in detail. FIG. 1 shows the indicator portions 120b and 120c and a neighborhood thereof. In FIG. 5A to FIG. 16A and FIG. 5B to FIG. 16B, the track width is shown greater, compared with FIG. 1, to illustrate details of the portion around the pole layer 16. As shown in FIG. 1, the indicator portion 120b has two ends 120b1 and 120b2 each of which is parallel to the region ABS. Similarly, the indicator portion 120c has two ends 120c1 and 120c2 each of which is parallel to the region ABS. The ends 120b1 and 120c1 are located closer to the region ABS than the ends 120b2 and 120c2. The distance between the region ABS and the end 120b1 is equal to the distance between the region ABS and the end 120c1. Similarly, the distance between the region ABS and the end 120b2 is equal to the distance between the region ABS and the end 120c2. In the embodiment, the location of the ends 120b1 and 120c1 serves as a reference for indicating the location of the region ABS. Therefore, the distance D1 between the region ABS and the ends 120b1 and 120c1 is designed to be of a specific value. Furthermore, the distance between the indicator portion 120b and the track width defining portion 16A taken in the direction of width thereof is equal to the distance between the indicator portion 120c and the track width defining portion 16A. This distance is defined as D3.

Next, the opening 13a of the polishing stopper layer 13 is observed, using an electron microscope. It is preferred to use a critical dimension measurement scanning electron microscope as the electron microscope. Since the edge of the opening 13a is located directly above the edge of the groove 120 located in the top surface of the encasing layer 12, the shape of the opening 13a coincides with the shape of the groove 120 taken in the top surface of the encasing layer 12. Therefore, it is possible to obtain the shape of the groove 120 taken in the top surface of the encasing layer 12 by observing the opening 13a.

By observing the opening 13a, the location of the region ABS is obtained in the following manner. As described above, the location of the ends 120b1 and 120c1 serves as the reference for indicating the location of the region ABS. Therefore, it is possible to obtain the location of the region ABS by observing the opening 13a and measuring the location of the ends 120b1 and 120c1. If the distance D1 between the region ABS and the ends 120b1, 120c1 is other than zero, the region ABS is placed in a location away from the ends 120b1 and 120c1 by the distance D1. If the distance D1 between the region ABS and the ends 120b1, 120c1 is zero, the location of the region ABS is the location of the ends 120b1 and 120c1.

As shown in FIG. 2, the track width is equal to the length of the second side A2 of the end face of the track width defining portion 16A located in the medium facing surface 30. The track width is equal to the width of the groove 120 taken in the top surface of the encasing layer 12 at the location of the region ABS. Therefore, it is possible to obtain the track width by measuring the width of the groove 120 in the top surface of the encasing layer 12 at the location of the region ABS.

The indicator portions 120b and 120c are located at a height the same as the portion 120a corresponding to the pole layer in a neighborhood of the region in which the track width defining portion 16A is located. Therefore, it is possible to determine the location of the region ABS and to obtain the track width through a single observation using an electron microscope.

The indicator portions 120b and 120c are disposed on both sides of the track width defining portion 16A to be formed later, the sides being opposed to each other in the direction of width of the defining portion 16A. In addition, the distance between the region ABS and the end 120b1 is equal to the distance between the region ABS and the end 120c1. Therefore, the region ABS is parallel to an imaginary straight line that is in contact with the ends 120b1 and 120c1. Based on the foregoing findings of the embodiment, it is possible to obtain the location of the region ABS with higher accuracy, referring to the two indicator portions 120b and 120c.

If the track width is as small as 0.08 to 0.12 μm, in particular, an image of high magnification is required to measure the track width by using an electron microscope. It is preferred that the distance D1 is a distance that can be recognized in an image of high magnification obtained by an electron microscope when the indicator portions 120b and 120c and the neighborhood thereof are observed by the electron microscope. This indicates that the distance D1 preferably falls within a range of 0 to 3.0 μm inclusive, and more preferably a range of 0 to 1.0 μm inclusive. Since it is possible to recognize the location of the region ABS with higher accuracy as the distance D1 is reduced, the distance D1 still more preferably falls within a range of 0 to 0.2 μm inclusive.

When the location of the region ABS is obtained from the location of the indicator portions 120b and 120c based on the image of high magnification obtained by the electron microscope as mentioned above, and the track width is measured based on the location of the region ABS, it is possible to recognize the location of the region ABS and the track width with higher accuracy as the distance D3 is reduced. This indicates that the distance D3 preferably falls within a range of 0.1 to 5.0 μm inclusive.

Figure 44:
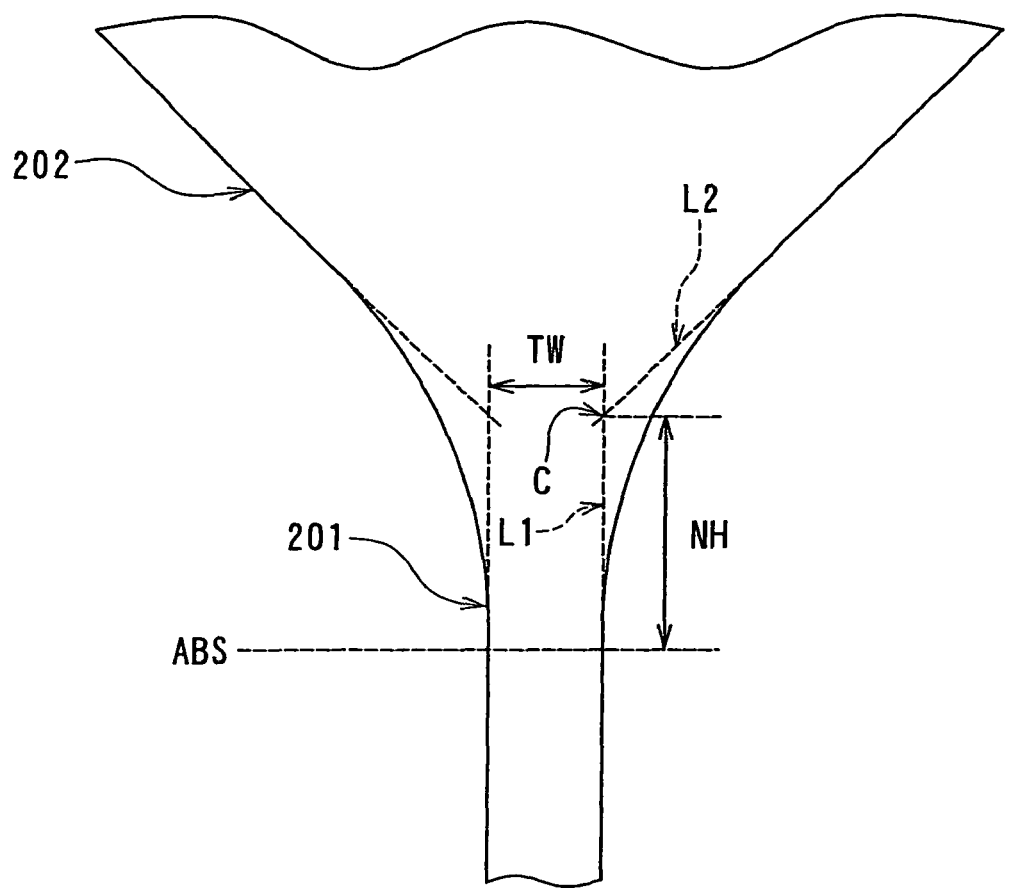
FIG. 44 is a view for illustrating an example of shape of a pole layer.

As shown in FIG. 44, when both sides of the track width defining portion are etched to reduce the track width, indicators near the track width defining portion disturb this etching. Therefore, in this case, it is difficult to dispose the indicators near the track width defining portion. According to the embodiment, in contrast, the pole layer 16 is disposed in the groove 120 of the encasing layer 12, and the track width is determined by the width of the groove 120 taken in the top surface of the encasing layer 12 at the location of the region ABS. Therefore, the embodiment does not include any step of etching the sides of the track width defining portion. It is therefore possible to dispose the indicator portions 120b and 120c near the track width defining portion 16A.

A case is now assumed wherein the polishing stopper layer 13 is not disposed on the top surface of the encasing layer 12 and the encasing layer 12 is made of an insulating material such as alumina. In this case, if an attempt is made to observe the groove 120 in the top surface of the encasing layer 12 by an electron microscope, electric charges accumulate on the top surface of the encasing layer 12 and it is impossible to obtain a correct image. According to the embodiment, in contrast, the polishing stopper layer 13 made of a conductive material is disposed on the top surface of the encasing layer 12. In addition, the edge of the opening 13a of the polishing stopper layer 13 is located directly above the edge of the groove 120 located in the top surface of the encasing layer 12. As a result, a correct image is obtained when the polishing stopper layer 13 is observed by an electron microscope, and it is thereby possible to measure the geometry of the opening 13a of the polishing stopper layer 13 with accuracy. It is thereby possible to measure the geometry of the groove 120 in the top surface of the encasing layer 12 with accuracy.

When the width of the groove 120 in the top surface of the encasing layer 12 at the location of the region ABS is measured by an electron microscope as described above, the width of the bottom of the groove 120 at the location of the region ABS may be measured at the same time. It is possible to obtain the angle formed by the wall of the groove 120 with respect to the direction orthogonal to the top surface of the substrate 1 by calculation if the depth of the groove 120 is obtained in addition to the width of the groove 120 in the top surface of the encasing layer 12 and the width of the bottom of the groove 120. Here, it is possible to obtain the depth of the groove 120 by preparing a sample for measuring the depth of the groove 120, cutting the sample so that the cross section shown in FIG. 6B appears, and observing the cross section by a scanning electron microscope, for example. If the nonmagnetic layer 12P is etched by reactive ion etching, the etching rate of the nonmagnetic layer 12P is nearly constant. Consequently, as long as the etching period is constant, the depth of the groove 120 is nearly uniform, too. Therefore, if the depth of the groove 120 is measured in advance by using the sample for measuring the depth, the depth of the groove 120 is obtained without measuring in the course of manufacturing process of the magnetic head.

Figure 7A:
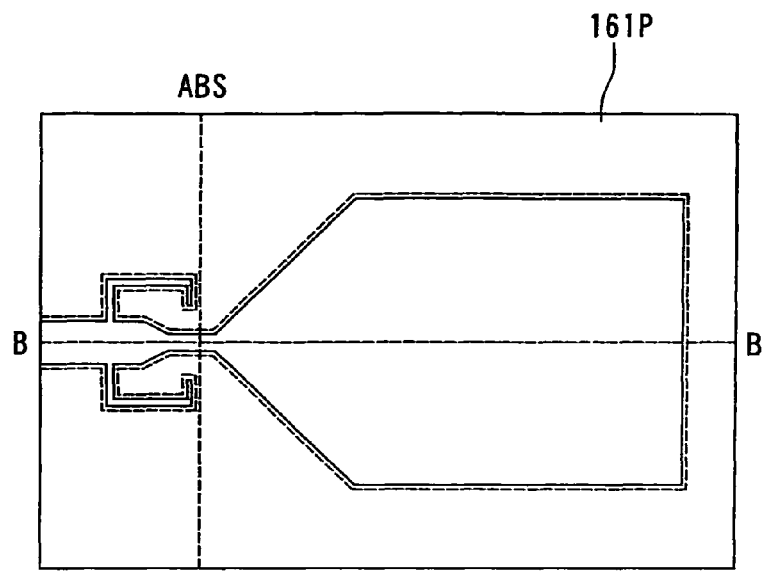
FIG. 7A and FIG. 7B are views for illustrating a step that follows the step shown in FIG. 5A and FIG. 5B.
Figure 7B:
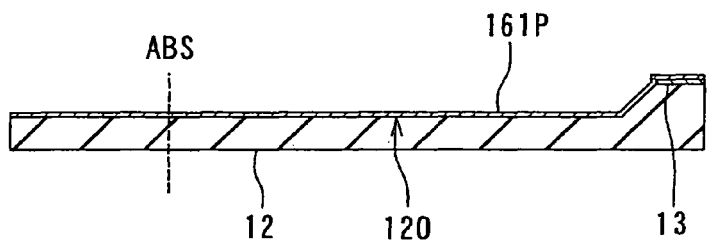
Figure 8A:
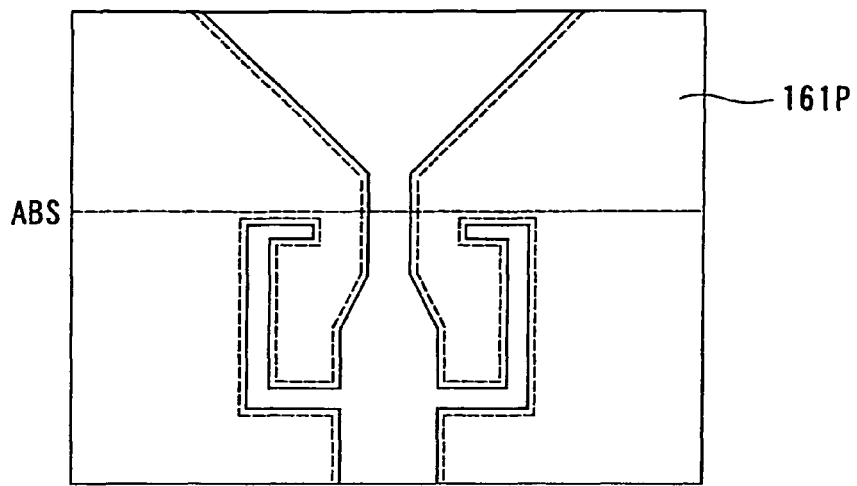
FIG. 8A and FIG. 8B are views for illustrating the main part of FIG. 7A and FIG. 7B.
Figure 8B:
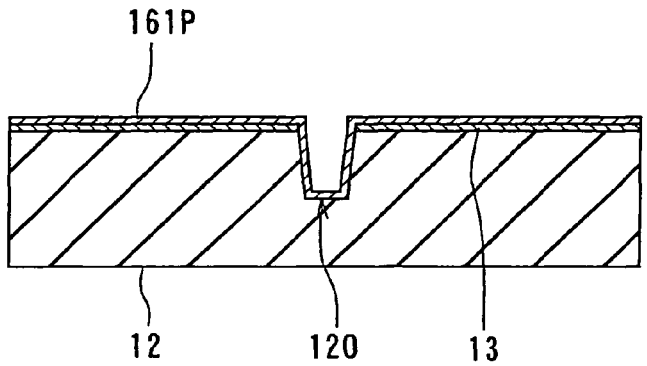

FIG. 7A, FIG. 7B, FIG. 8A and FIG. 8B illustrate the following step. FIG. 7A shows the top surface of the layered structure in the course of manufacturing process of the magnetic head. FIG. 7B shows a cross section of the layered structure orthogonal to the medium facing surface and the substrate. FIG. 7B is a cross section taken along line B-B of FIG. 7A. FIG. 8A is an enlarged view of neighborhood of the region ABS of FIG. 7A. FIG. 8B is a cross section corresponding to the region ABS of FIG. 8A. In the step, a magnetic layer 161P is formed in the groove 120 of the encasing layer 12 and on the polishing stopper layer 13. The magnetic layer 161P is formed by sputtering or ion beam deposition (hereinafter referred to as IBD), for example. If the magnetic layer 161P is formed by sputtering, it is preferred to employ collimation sputtering or long throw sputtering.

Figure 9A:
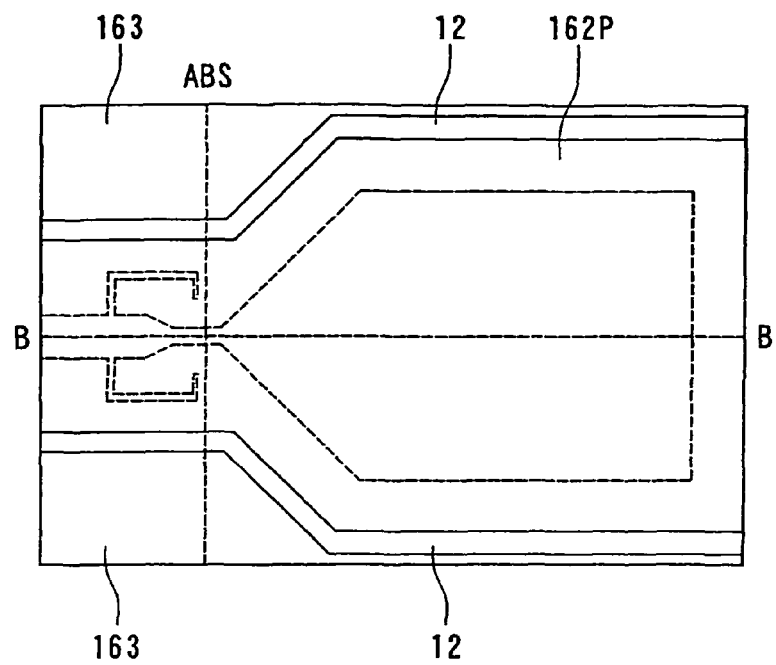
FIG. 9A and FIG. 9B are views for illustrating a step that follows the step shown in FIG. 7A and FIG. 7B.
Figure 9B:
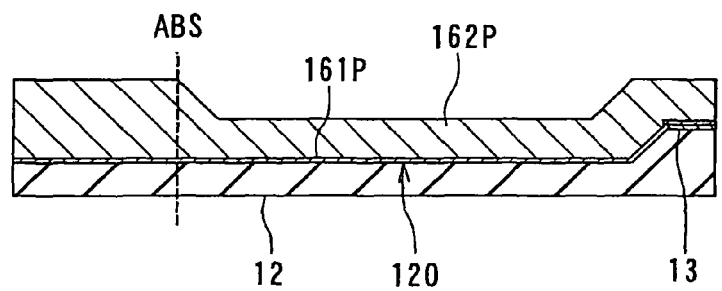
Figure 10A:
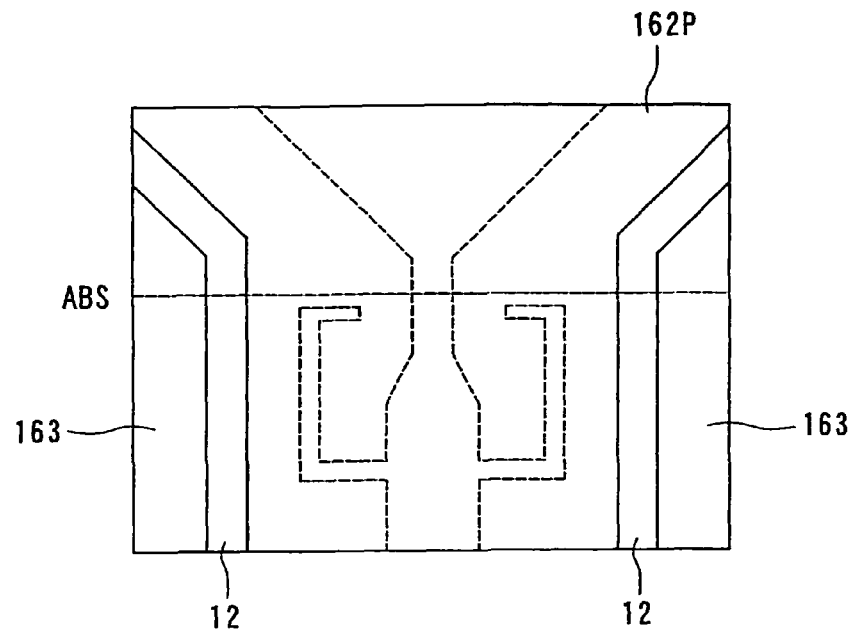
FIG. 10A and FIG. 10B are views for illustrating the main part of FIG. 9A and FIG. 9B.
Figure 10B:
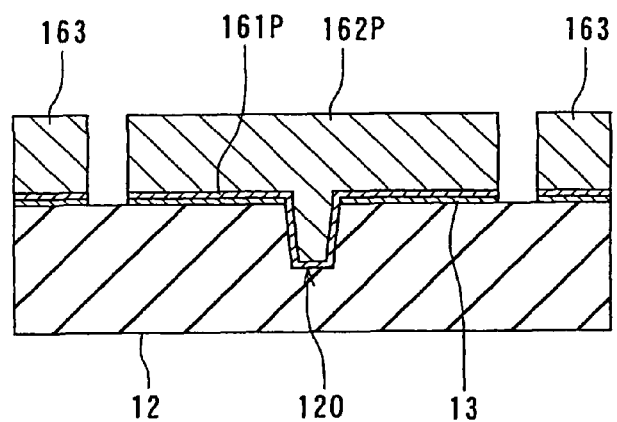

FIG. 9A, FIG. 9B, FIG. 10A and FIG. 10B illustrate the following step. FIG. 9A shows the top surface of the layered structure in the course of manufacturing process of the magnetic head. FIG. 9B illustrates a cross section of the layered structure orthogonal to the medium facing surface and the substrate. FIG. 9B is a cross section taken along line B-B of FIG. 9A. FIG. 10A is an enlarged view of neighborhood of the region ABS of FIG. 9A. FIG. 10B is a cross section corresponding to the region ABS of FIG. 10A. In the step, first, a magnetic layer 162P is formed on the magnetic layer 161P. The magnetic layer 162P is formed by frame plating, for example. In this case, the magnetic layer 161P is used as an electrode for plating. In FIG. 9A, FIG. 10A and FIG. 10B, numeral 163 indicates an unwanted plating layer formed outside the frame. Next, the layered structure made up of the magnetic layer 161P and the polishing stopper layer 13 except portions below the magnetic layer 162P and the plating layer 163 is removed by etching.

Figure 11A:
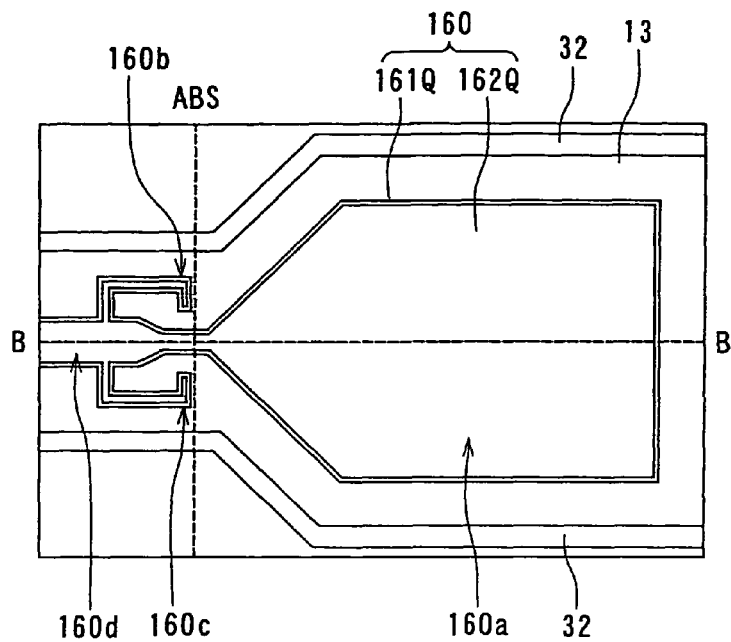
FIG. 11A and FIG. 11B are views for illustrating a step that follows the step shown in FIG. 9A and FIG. 9B.
Figure 11B:
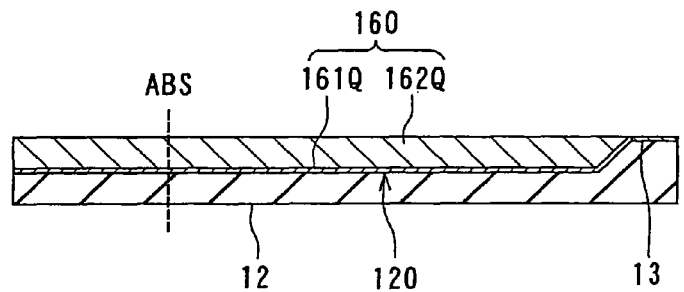
Figure 12A:
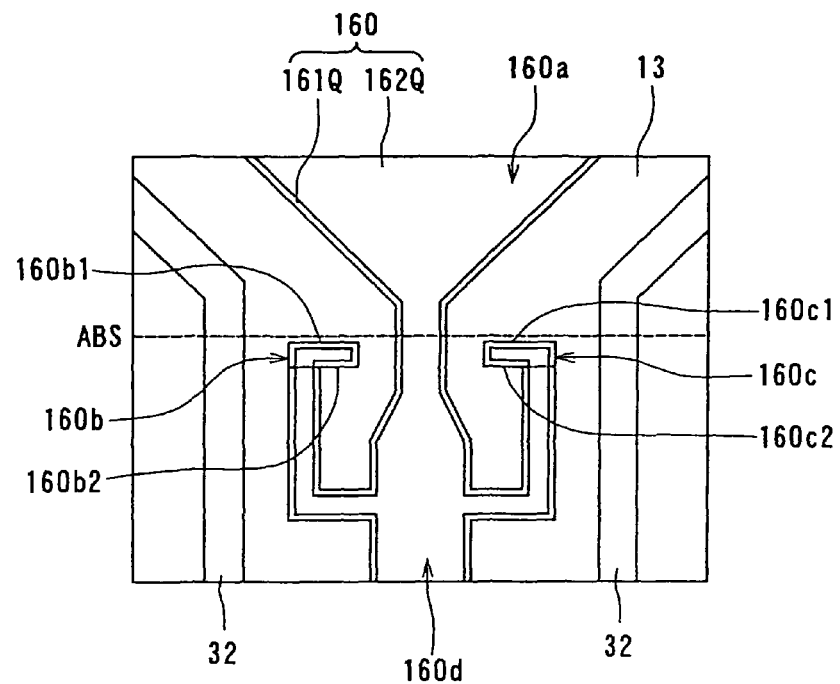
FIG. 12A and FIG. 12B are views for illustrating the main part of FIG. 11A and FIG. 11B.
Figure 12B:
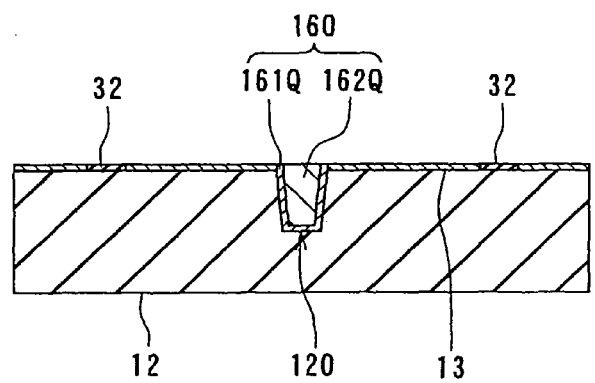

FIG. 11A, FIG. 11B, FIG. 12A and FIG. 12B illustrate the following step. FIG. 11A shows the top surface of the layered structure in the course of manufacturing process of the magnetic head. FIG. 11B illustrates a cross section of the layered structure orthogonal to the medium facing surface and the substrate. FIG. 11B is a cross section taken along line B-B of FIG. 11A. FIG. 12A is an enlarged view of neighborhood of the region ABS of FIG. 11A. FIG. 12B is a cross section corresponding to the region ABS of FIG. 12A. In the step, first, a coating layer 32 made of alumina, for example, and having a thickness of 1.0 to 1.5 µm, for example, is formed on the entire top surface of the layered structure. Next, the coating layer 32, the magnetic layer 162P and the magnetic layer 161P are polished by CMP, for example, until the polishing stopper layer 13 is exposed, and the top surfaces of the polishing stopper layer 13, the magnetic layer 161P and the magnetic layer 162P are thereby flattened. As a result, portions of the magnetic layers 161P and 162P disposed on the top surface of the polishing stopper layer 13 are removed. The remaining portions of the magnetic layers 161P and 162P are hereinafter called magnetic layers 161Q and 162Q, respectively. A combination of the magnetic layers 161Q and 162Q is called a magnetic layer 160.

If the coating layer 32, the magnetic layer 162P and the magnetic layer 161P are polished by CMP, such a slurry is used that polishing is stopped when the polishing stopper layer 13 is exposed, such as an alumina-base slurry. It is possible to control the thickness of the magnetic layer 160 that will be the pole layer 16 later with accuracy by stopping the polishing when the polishing stopper layer 13 is exposed as thus described.

As shown in FIG. 11A and FIG. 12A, the magnetic layer 160 incorporates a portion 160a corresponding to the pole layer, indicator portions 160b and 160c, and a coupling portion 160d. The portion 160a is a portion to be the pole layer 16 later, and this is a portion of the magnetic layer 160 shown on a right side of the region ABS in FIG. 11A and shown above the region ABS in FIG. 12A. The indicator portions 160b and 160c correspond to the indicators of the invention, and each serve as a reference for indicating the location of the region ABS. Each of the indicator portions 160b and 160c has a plane geometry that is rectangle-shaped. The coupling portion 160d is a portion for coupling the portion 160a and the indicator portions 160b, 160c of the magnetic layer 160 to each other.

As shown in FIG. 1, the plane geometries of the portion 160a, the indicator portions 160b and 160c, and the coupling portion 160d are the same as the geometries of the portion 120a, the indicator portions 120b and 120c, and the coupling portion 120d, respectively, in the top surface of the encasing layer 12. The portion 160a includes the track width defining portion 16A and the wide portion 16B. The indicator portion 160b has two ends 160b1 and 160b2 each of which is parallel to the region ABS. Similarly, the indicator portion 160c has two ends 160c1 and 160c2 each of which is parallel to the region ABS. The ends 160b1 and 160c1 are located closer to the region ABS than the ends 160b2 and 160c2. The distance between the region ABS and the end 160b1 is equal to the distance between the region ABS and the end 160c1. Similarly, the distance between the region ABS and the end 160b2 is equal to the distance between the region ABS and the end 160c2. In the embodiment, the location of the ends 160b1 and 160c1 serves as a reference for indicating the location of the region ABS, as the location of the ends 120b1 and 120c1. The distance between the region ABS and the ends 160b1, 160c1 is equal to the distance D1 between the region ABS and the ends 120b1, 120c1. The distance D1 is designed to be of a specific value. Furthermore, the distance between each of the indicator portions 160b, 160c and the track width defining portion 16A taken in the direction of width thereof is defined as D3. The preferred ranges of the distances D1 and D3 are described above.

The method of obtaining the location of the region ABS and the track width by observing the opening 13a of the polishing stopper layer 13 through the use of an electron microscope is described above. In a similar manner, it is possible to obtain the location of the region ABS and the track width by observing the magnetic layer 160 through the use of an electron microscope. That is, as described above, the location of the ends 160b1 and 160c1 serves as the reference for indicating the location of the region ABS. Therefore, it is possible to obtain the location of the region ABS by observing the magnetic layer 160 and measuring the location of the ends 160b1 and 160c1. It is further possible to obtain the track width by measuring the width of the magnetic layer 160 at the location of the region ABS. If the distance D1 between the region ABS and the ends 160b1, 160c1 is other than zero, the region ABS is placed in a location away from the ends 160b1 and 160c1 by the distance D1. If the distance D1 is zero, the location of the region ABS is the location of the ends 160b1 and 160c1. The magnetic layer 160 is conductive. Therefore, it is possible to obtain a correct image of the magnetic layer 160 by an electron microscope.

The indicator portions 160b and 160c are located at a height the same as the portion 160a corresponding to the pole layer in a neighborhood of the region in which the track width defining portion 16A is located. Therefore, it is possible to determine the location of the region ABS and to obtain the track width through a single observation using an electron microscope.

The indicator portions 160b and 160c are disposed on both sides of the track width defining portion 16A, the sides being opposed to each other in the direction of width of the defining portion 16A. In addition, the distance between the region ABS and the end 160b1 is equal to the distance between the region ABS and the end 160c1. Therefore, the region ABS is parallel to an imaginary straight line that is in contact with the ends 160b1 and 160c1. Based on the foregoing findings of the embodiment, it is possible to obtain the location of the region ABS with higher accuracy, referring to the two indicator portions 160b and 160c.

According to the embodiment, each of the pole layer 16 and the indicator portions 160b and 160c that are made up of portions of the magnetic layer 160 is conductive. In addition, the indicator portions 160b and 160c are electrically connected to the pole layer 16. Therefore, when the indicator portions 160b and 160c are observed by an electron microscope, it is possible to prevent electric charges from accumulating on the indicator portions 160b and 160c. In addition, the potential of the indicator portions 160b and 160c is the same as that of the pole layer 16, and it is thereby possible to obtain correct images of the indicator portions 160b and 160c together with the pole layer 16. It is thereby possible to obtain the location of the region ABS with higher accuracy.

Figure 13A:
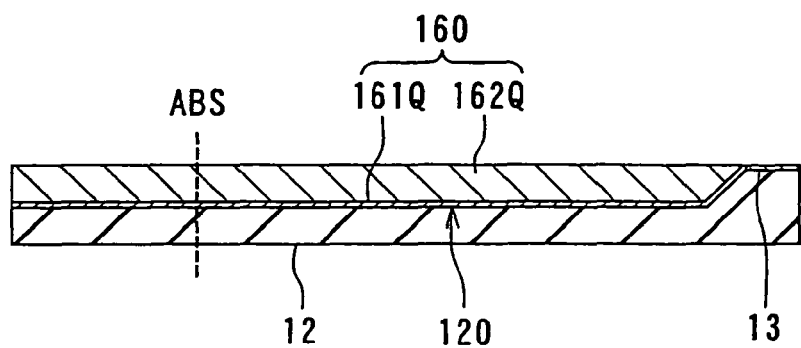
FIG. 13A and FIG. 13B are views for illustrating a step that follows the step shown in FIG. 11A and FIG. 11B.
Figure 13B:
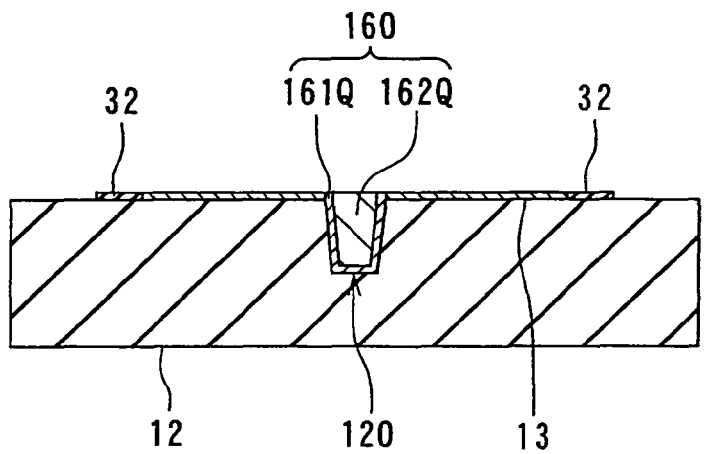

FIG. 13A and FIG. 13B illustrate the following step. FIG. 13A shows a cross section of the layered structure in the course of manufacturing process of the magnetic head, the cross section being orthogonal to the medium facing surface and the substrate. FIG. 13B is an enlarged view of cross section corresponding to the region ABS of FIG. 13A. In the step, a portion of the polishing stopper layer 13 located outside the coating layer 32 is removed by etching.

Figure 14A:
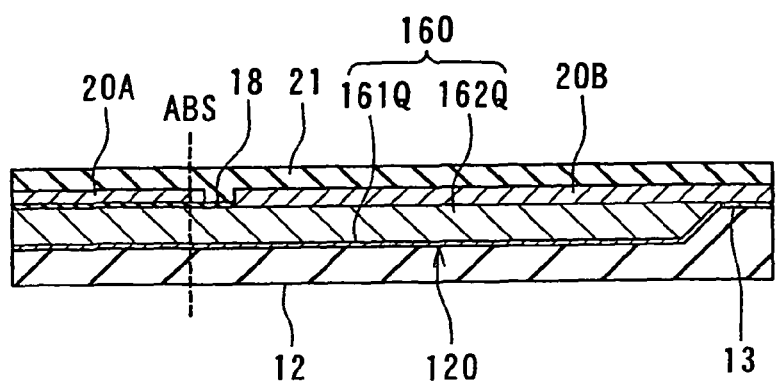
FIG. 14A and FIG. 14B are views for illustrating a step that follows the step shown in FIG. 13A and FIG. 13B.
Figure 14B:
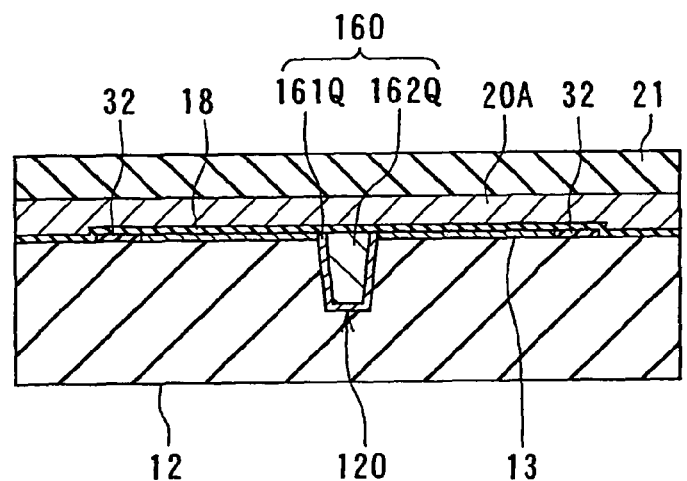

FIG. 14A and FIG. 14B illustrate the following step. FIG. 14A shows a cross section of the layered structure in the course of manufacturing process of the magnetic head, the cross section being orthogonal to the medium facing surface and the substrate. FIG. 14B is an enlarged view of cross section corresponding to the region ABS of FIG. 14A. In the step, first, the gap layer 18 is formed on the entire top surface of the layered structure. Next, a region of the gap layer 18 in which the yoke layer 20B is to be formed is selectively etched to form an opening in the gap layer 18. Next, the first layer 20A is formed on the gap layer 18, and the yoke layer 20B is formed on a portion of the magnetic layer 160 where the opening of the gap layer 18 is formed. The first layer 20A and the yoke layer 20B may be formed by frame plating or by making a magnetic layer through sputtering and then selectively etching the magnetic layer. A method of selectively etching the magnetic layer may be, for example, forming an alumina layer on the magnetic layer, forming a mask on the alumina layer by frame plating, and etching the alumina layer and the magnetic layer using the mask. Next, the nonmagnetic layer 21 is formed on the entire top surface of the layered structure.

Figure 15A:
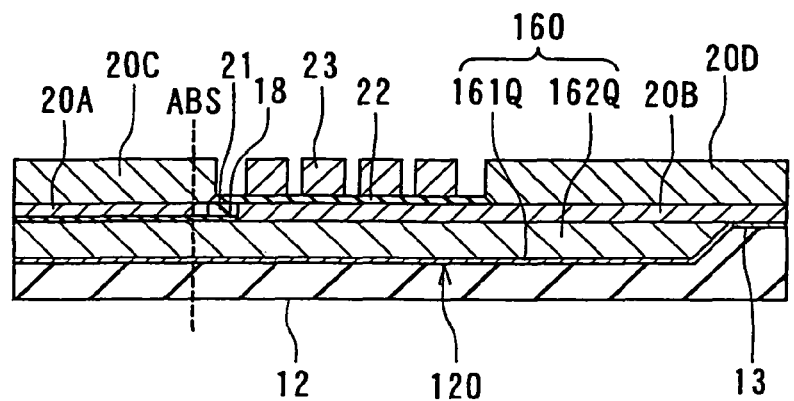
FIG. 15A and FIG. 15B are views for illustrating a step that follows the step shown in FIG. 14A and FIG. 14B.
Figure 15B:
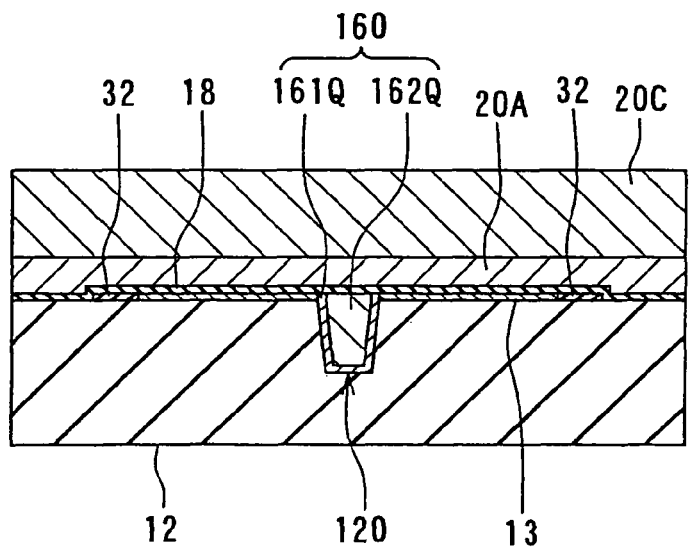

FIG. 15A and FIG. 15B illustrate the following step. FIG. 15A shows a cross section of the layered structure in the course of manufacturing process of the magnetic head, the cross section being orthogonal to the medium facing surface and the substrate. FIG. 15B is an enlarged view of cross section corresponding to the region ABS of FIG. 15A. In the step, first, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened. Next, the insulating layer 22 having a thickness that falls within a range of 0.2 to 0.3 μm inclusive, for example, is formed by a method such as sputtering on the entire top surface of the layered structure. Next, the insulating layer 22 except a portion on which the coil 23 and the insulating layer 24 will be disposed later is removed by etching. Next, the coil 23 is formed by frame plating, for example, on the insulating layer 22. Next, the second layer 20C and the coupling layer 20D are formed by frame plating, for example. Alternatively, the coil 23 may be formed after the second layer 20C and the coupling layer 20D are formed.

Figure 16A:
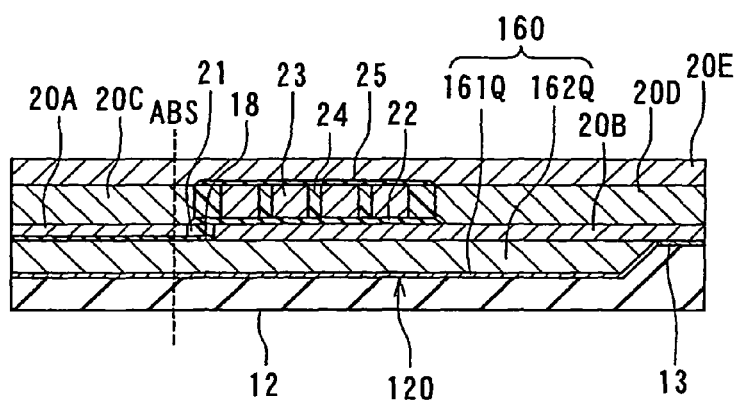
FIG. 16A and FIG. 16B are views for illustrating a step that follows the step shown in FIG. 15A and FIG. 15B.
Figure 16B:
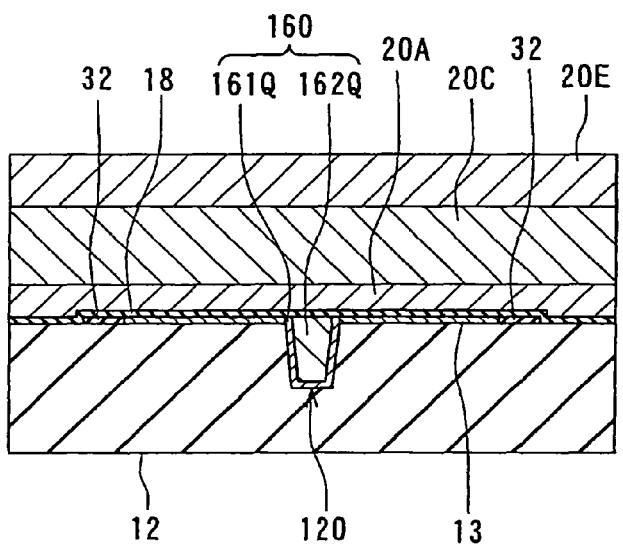

FIG. 16A and FIG. 16B illustrate the following step. FIG. 16A shows a cross section of the layered structure in the course of manufacturing process of the magnetic head, the cross section being orthogonal to the medium facing surface and the substrate. FIG. 16B is an enlarged view of cross section corresponding to the region ABS of FIG. 16A. In the step, first, the insulating layer 24 made of photoresist, for example, is selectively formed in the space between adjacent ones of the turns of the coil 23 and around the coil 23. Next, an insulating layer not shown having a thickness of 4 to 4.5 μm, for example, is formed on the entire top surface of the layered structure. Next, the insulating layer is polished by CMP, for example, so that the second layer 20C, the coupling layer 20D and the coil 23 are exposed, and the top surfaces of the second layer 20C, the coupling layer 20D, the coil 23 and the insulating layer 24 are thereby flattened. Next, the insulating layer 25 is formed on the coil 23 and the insulating layer 24. Next, the third layer 20E is formed by frame plating, for example, to complete the shield layer 20.

Next, although not shown, a protection layer is formed to cover the entire top surface of the layered structure. Wiring and terminals are then formed on the protection layer. In such a manner, components of a plurality of magnetic heads including a plurality of sets of pole layer 16 and coil 23 are formed in the single substrate 1. The magnetic head substructure is thus fabricated in which a plurality of rows of pre-head portions that will be magnetic heads later are aligned. The magnetic head substructure is cut in a neighborhood of the region ABS. A surface formed by cutting the magnetic head substructure is polished to form the medium facing surfaces 30. Furthermore, a plurality of pre-head portions are separated from one another by cutting the substructure, and a plurality of magnetic heads are thereby formed. When the pre-head portions are separated, the magnetic layers 161Q and 162Q become the first layer 161 and the second layer 162, respectively.

Figure 17:
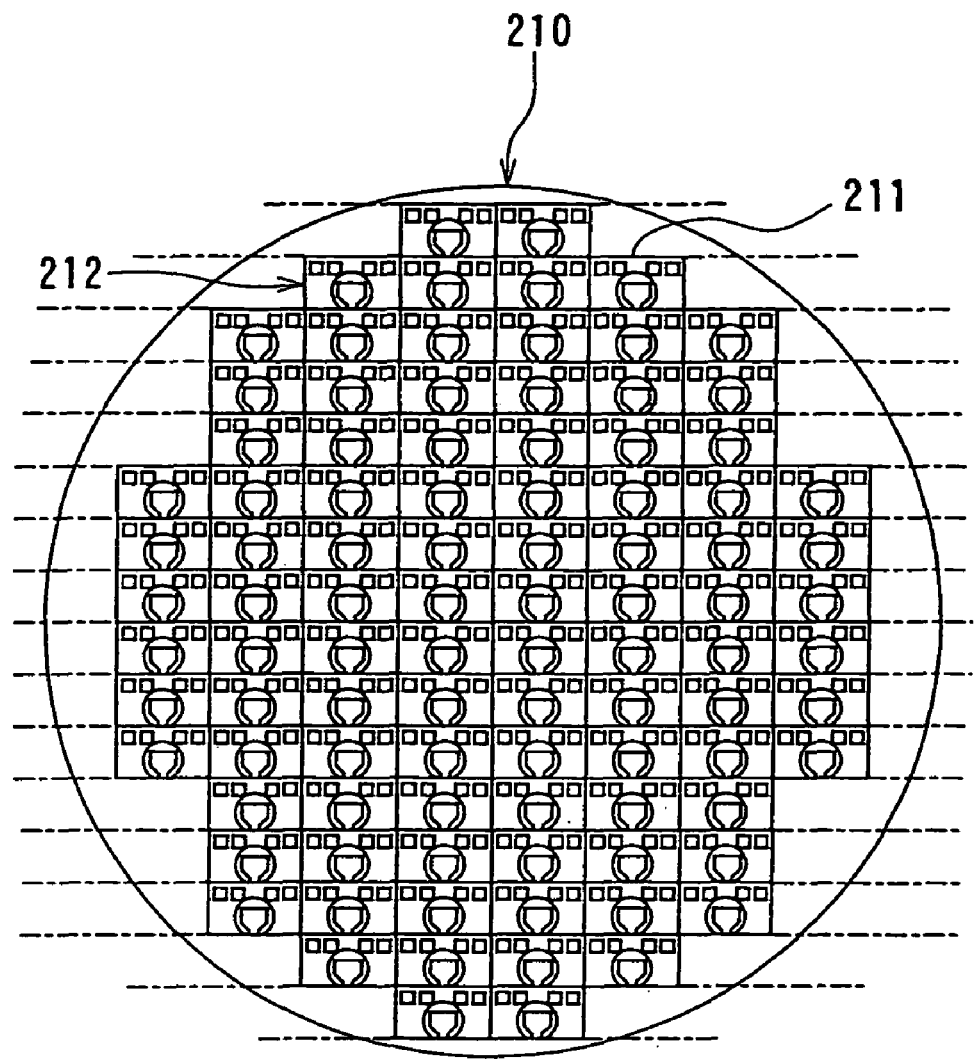
FIG. 17 is a top view of a magnetic head substructure of the first embodiment of the invention.
Figure 18:
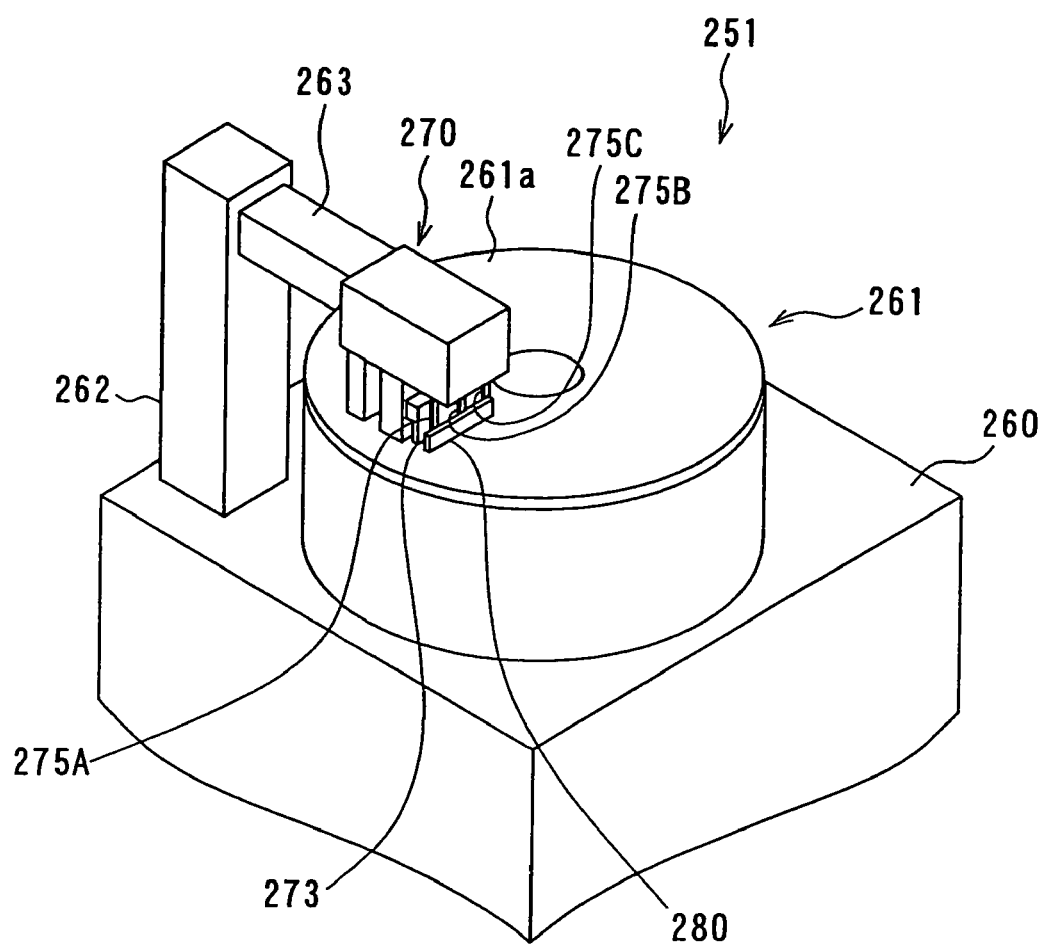
FIG. 18 is a perspective view for schematically illustrating the configuration of a lapping apparatus used in the method of manufacturing the magnetic head of the first embodiment of the invention.
Figure 19:
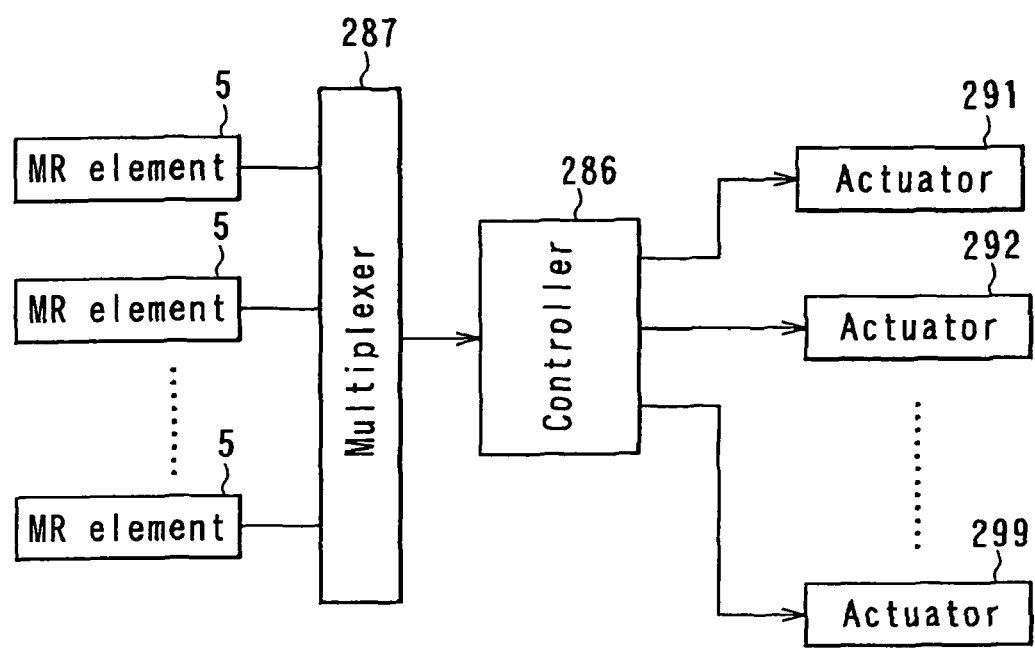
FIG. 19 is a block diagram illustrating an example of circuit configuration of the lapping apparatus of FIG. 18.

Reference is now made to FIG. 17 to FIG. 19 to describe a specific example of the step of fabricating a plurality of magnetic heads by separating the magnetic head substructure. FIG. 17 is a top view of the magnetic head substructure. As shown in FIG. 17, the magnetic head substructure 210 includes a plurality of rows of pre-head portions 211. In the step of fabricating the magnetic heads, first, the substructure 210 is cut in the positions indicated with dashed lines of FIG. 17 to form head aggregates 212 each of which includes a row of plurality of pre-head portions 211. Next, a surface (the lower surface in FIG. 17) formed in each head aggregate 212 by cutting the substructure 210 is polished (lapped) to form the medium facing surfaces 30 of the pre-head portions 211 that the head aggregate 212 includes.

Reference is now made to FIG. 18 and FIG. 19 to describe a method of forming the medium facing surfaces 30 by lapping the head aggregate 212. In this method, the head aggregate 212 is lapped so that the MR heights and the throat heights of the pre-head portions 211 are made equal while the resistances of the MR elements 5 that the head aggregate 212 includes are detected. The MR height is the length of each of the MR elements 5 taken in the direction orthogonal to the medium facing surface 30.

FIG. 18 is a perspective view illustrating a schematic configuration of a lapping apparatus for lapping the head aggregate 212. This lapping apparatus 251 comprises: a table 260; a rotating lapping table 261 provided on the table 260; a strut 262 provided on the table 260 on a side of the rotating lapping table 261; and a supporter 270 attached to the strut 262 through an arm 263. The rotating lapping table 261 has a lapping plate (surface plate) 261a to come to contact with the surface to be the medium facing surfaces 30 of the pre-head portions 211 that the head aggregate 212 includes.

The supporter 270 comprises a jig retainer 273 and three load application rods 275A, 275B and 275C placed in front of the jig retainer 273 at equal spacings. A jig 280 is to be fixed to the jig retainer 273. The jig 280 has three load application sections each of which is in the shape of a hole having an oblong cross section. Load application pins are provided at the lower ends of the load application rods 275A, 275B and 275C, respectively. The load application pins have respective heads to be inserted to the load application sections (holes) of the jig 280, the heads each having an oblong cross section. Each of the load application pins is driven by an actuator (not shown) in the vertical, horizontal (along the length of the jig 280) and rotational directions.

The jig 280 has a retainer for retaining the head aggregate 212. With this jig 280, the retainer and the head aggregate 212 are deformed by applying loads in various directions to the three load application sections. It is thereby possible that the surface to be the medium facing surfaces 30 of the pre-head portions 211 that the head aggregate 212 includes is lapped while the throat heights and MR heights of a plurality of pre-head portions 211 that the head aggregate 212 includes are controlled to be of target values.

FIG. 19 is a block diagram showing an example of circuit configuration of the lapping apparatus shown in FIG. 18. This lapping apparatus comprises: nine actuators 291 to 299 for applying loads in the three directions to the load application sections of the jig 280; a controller 286 for controlling the actuators 291 to 299 through monitoring the resistance values of a plurality of MR elements 5 in the head aggregate 212; and a multiplexer 287, connected to the MR elements 5 in the head aggregate 212 through a connector (not shown), for selectively connecting one of the MR elements 5 to the controller 286.

In this lapping apparatus, the controller 286 monitors the resistance values of the MR elements 5 in the head aggregate 212 through the multiplexer 287, and controls the actuators 291 to 299 so that the throat height and the MR height of each of the pre-head portions 211 in the head aggregate 212 fall within a tolerance.

Flying rails are formed by etching, for example, in the medium facing surfaces 30 formed by lapping as described above. The head aggregate 212 is then cut so that the pre-head portions 211 are separated from one another, and a plurality of magnetic heads are thereby formed.

The specific details of the step of fabricating the magnetic heads by separating the magnetic head substructure are not limited to the example described with reference to FIG. 17 to FIG. 19. For example, the magnetic heads may be fabricated in the following manner. First, the magnetic head substructure 210 is cut to fabricate a first head aggregate that includes a plurality of rows of pre-head portions 211. Next, a surface of the first head aggregate is lapped to form the medium facing surfaces 30 of a single row of pre-head portions 211. Next, the first head aggregate is cut so that the single row of pre-head portions 211 in which the medium facing surfaces 30 have been formed is separated to be a second head aggregate. Next, the second head aggregate is cut so that the pre-head portions 211 are separated from one another, and a plurality of magnetic heads are thereby fabricated.

According to the method of manufacturing the magnetic head and the magnetic head substructure of the embodiment, a plurality of indicators (120b, 120c, 160b and 160c) are formed in the substructure, wherein each of the indicators serves as a reference for indicating the location of the region ABS in which the medium facing surfaces 30 of the magnetic heads will be formed. As a result, it is possible in the course of manufacturing process of the magnetic heads to know the location of the region ABS in which the medium facing surfaces will be formed. It is thereby possible to obtain the track width with accuracy. Furthermore, it is thereby possible to improve the efficiency in manufacturing the magnetic heads.

According to the embodiment, the indicator portions 120b and 120c as portions of the groove 120 of the encasing layer 12 and the indicator portions 160b and 160c as portions of the magnetic layer 160 each function as the indicators. To determine the location of the region ABS and the track width in the course of manufacturing process of the magnetic heads, at least one of the indicator portions 120b, 120c and the indicator portions 160b, 160c may be observed.

In the example shown in FIG. 1, the indicator portions 120b, 120c, 160b and 160c are located in a region that will not remain in each magnetic head, that is, in a region lower than the region ABS. However, at least part of the ends of the indicator portions 120b, 120c, 160b and 160c may be located in a region that will remain in each magnetic head, that is, in a region higher than the region ABS of FIG. 1.

In the example shown in FIG. 1, the locations of the ends 120b1, 120c1, 160b1 and 160c1 are used as the reference for indicating the location of the region ABS. However, the locations of the ends 120b2, 120c2, 160b2 and 160c2 may be used as the reference for indicating the location of the region ABS.

According to the method of manufacturing the magnetic head and the magnetic head substructure of the embodiment, the polishing of the magnetic layers 161P and 162P is stopped when the polishing stopper layer 13 is exposed. The edge of the opening 13a of the polishing stopper layer 13 is located directly above the edge of the groove 120 located in the top surface of the encasing layer 12. Therefore, a difference in level is hardly created between the top surface of the polishing stopper layer 13 and the top surfaces of the magnetic layers 161P and 162P when the polishing of the magnetic layers 161P and 162P is stopped. As a result, according to the embodiment, it is possible to control the thickness of the pole layer 16 with accuracy. Furthermore, it is thereby possible to control the width of the top surface of the pole layer 16 with accuracy. As a result, it is possible to control the track width with accuracy. According to the embodiment, the side portions of the pole layer 16 are not etched. As a result, it is impossible that the neck height NH is made greater than a desired value and/or the pole layer 16 goes out of a desired shape. It is therefore possible to improve the overwrite property. Because of the foregoing features of the embodiment, it is possible to form the pole layer 16 with accuracy that has a small width and a shape capable of preventing the problems resulting from the skew.

In the embodiment, after the coating layer 32 and the magnetic layers 161P and 162P are polished until the polishing stopper layer 13 is exposed, the polishing stopper layer 13 may be selectively removed by reactive ion etching or ion beam etching, for example. Furthermore, the magnetic layers 161P and 162P may be slightly polished by CMP, for example, to flatten the top surfaces of the encasing layer 12 and the magnetic layers 161P and 162P. Alternatively, after the coating layer 32 and the magnetic layers 161P and 162P are polished until the polishing stopper layer 13 is exposed, ion beam etching may be performed to remove the polishing stopper layer 13 and to etch portions of the magnetic layers 161P and 162P, so that the top surfaces of the encasing layer 12 and the magnetic layers 161P and 162P are flattened.

Figure 20A:
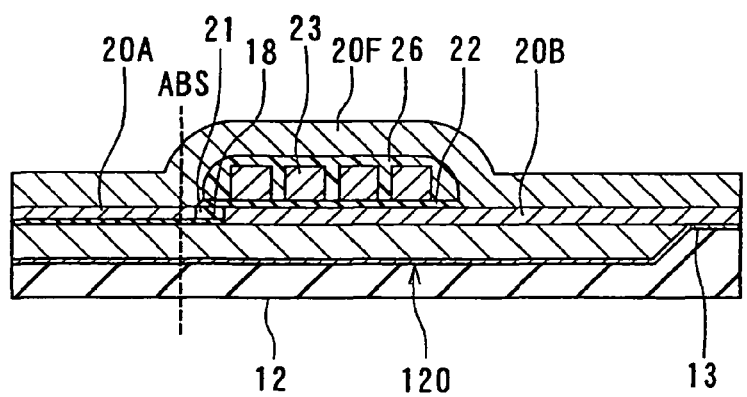
FIG. 20A and FIG. 20B are views for illustrating a modification example of the method of manufacturing the magnetic head of the first embodiment of the invention.
Figure 20B:
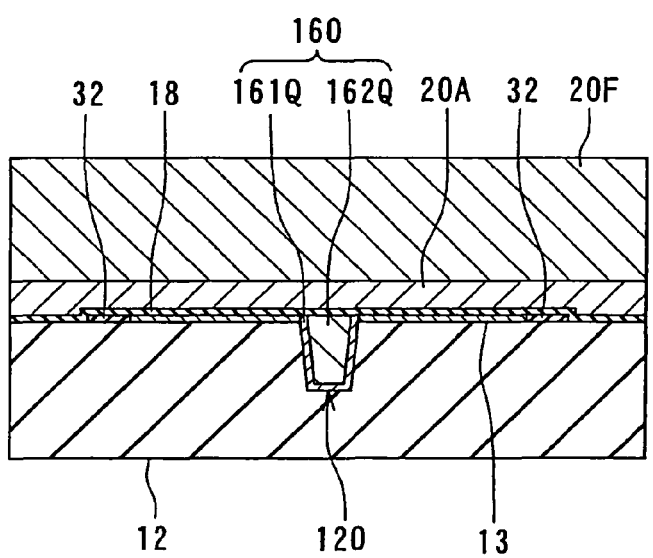

FIG. 20A and FIG. 20B illustrate a modification example of the method of manufacturing the magnetic head and the magnetic head substructure of the embodiment. FIG. 20A illustrates a cross section of the layered structure in the course of manufacturing process of the magnetic head, the cross section being orthogonal to the medium facing surface and the substrate. FIG. 20B is an enlarged view of a cross section corresponding to the region ABS of FIG. 20A. In FIG. 20A and FIG. 20B, the portion closer to the substrate 1 than the encasing layer 12 is omitted.

The magnetic head of the modification example comprises an insulating layer 26 covering at least part of the coil 23 in place of the insulating layers 24 and 25 of FIG. 3. The shield layer 20 of the modification example comprises a second layer 20F in place of the second layer 20C, the coupling layer 20D and the third layer 20E of FIG. 3. The second layer 20F has an end located in the medium facing surface 30, and is disposed to couple the first layer 20A to the yoke layer 20B. The second layer 20F includes a portion located on a side of the at least part of the coil 23 covered with the insulating layer 26, the side being opposite to the pole layer 16. The second layer 20F includes a portion located between the medium facing surface 30 and the coil 23. In this portion, the distance between the end located in the medium facing surface 30 and the other end increases as the distance from the first layer 20A increases. The second layer 20F is made of CoNiFe or NiFe, for example. The remainder of configuration of the magnetic head of the modification example is the same as that of the magnetic head shown in FIG. 2 and FIG. 3.

A method of manufacturing the magnetic head of the modification example includes the steps up to the step of forming the coil 23 that are the same as those of the method of manufacturing the magnetic head shown in FIG. 2 and FIG. 3. In the modification example, after the coil 23 is formed, the insulating layer 26 and the second layer 20F are formed one by one. The following steps of the method of manufacturing the magnetic head of the modification example are the same as those of the method of manufacturing the magnetic head shown in FIG. 2 and FIG. 3.

Second Embodiment

Figure 21:
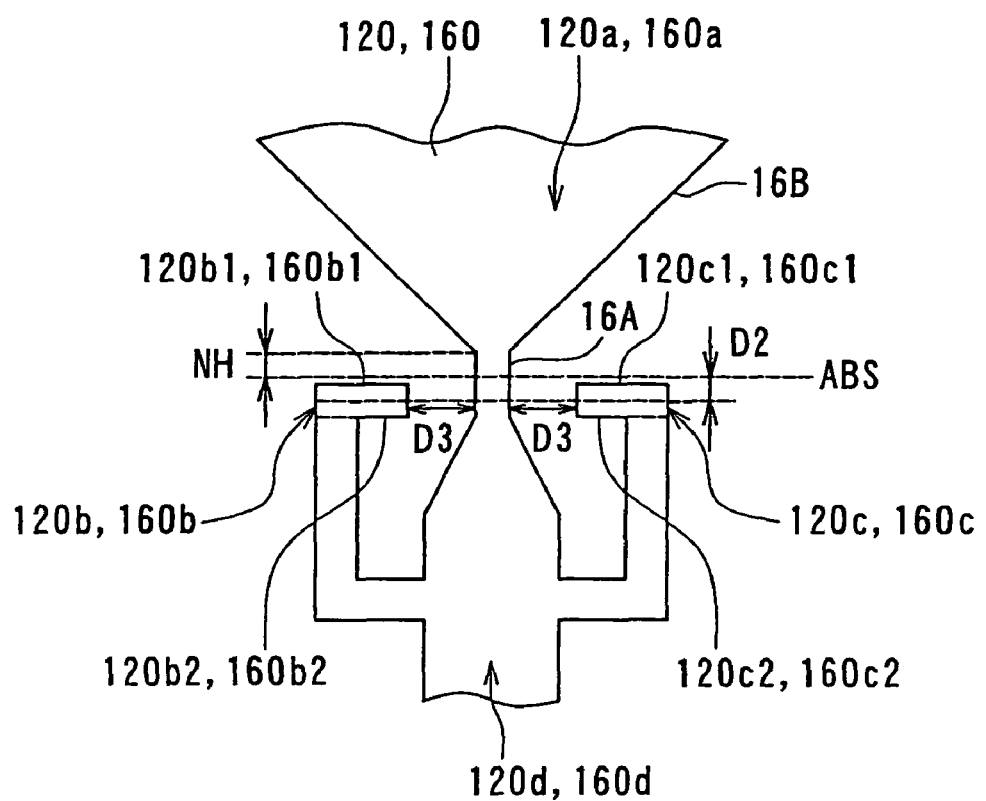
FIG. 21 illustrates indicator portions of a second embodiment of the invention.

A method of manufacturing a magnetic head and a magnetic head substructure of a second embodiment of the invention will now be described. FIG. 21 illustrates indicator portions and a neighborhood thereof of the embodiment. In the embodiment, the references for indicating the location of the region ABS are: the location of the middle between ends 120b1 and 120b2; the location of the middle between ends 120c1 and 120c2; the location of the middle between ends 160b1 and 160b2; and the location of the middle between ends 160c1 and 160c2. Therefore, the distance D2 between the region ABS and each of the above-mentioned locations of the middles is designed to be of a specific value. A preferred range of the distance D2 is the same as that of the distance D1 of the first embodiment.

In FIG. 21, the indicator portions 120b, 120c, 160b and 160c are located in a region that will not remain in the magnetic head, that is, in a region lower than the region ABS. However, at least part of the ends of the indicator portions 120b, 120c, 160b and 160c may be located in a region that will remain in the magnetic head, that is, in a region higher than the region ABS of FIG. 20A and FIG. 20B.

The shapes of the indicator portions 120b, 120c, 160b and 160c are determined by photolithography. As a result, there is a possibility that the sizes of the indicator portions 120b, 120c, 160b and 160c vary, depending on factors such as variations in amount of exposure of photolithography. However, even if the sizes of the indicator portions 120b, 120c, 160b and 160c vary as such, there hardly occur variations in the location of the middle between the ends 120b1 and 120b2, the location of the middle between the ends 120c1 and 120c2, the location of the middle between the ends 160b1 and 160b2, and the location of the middle between the ends 160c1 and 160c2. Therefore, according to the embodiment, it is possible to suppress variations in the locations as the references for indicating the location of the region ABS, and it is thereby possible to obtain the location of the region ABS with higher accuracy.

The remainder of configuration, operation and effects of the second embodiment are similar to those of the first embodiment including the modification example.

Third Embodiment

Figure 22:
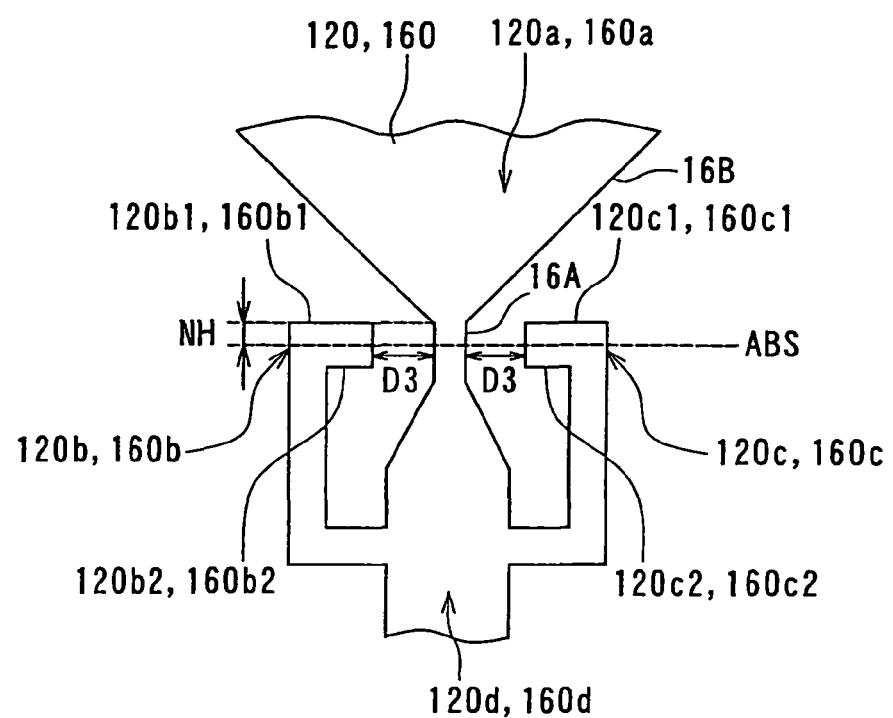
FIG. 22 illustrates an example of arrangement of indicator portions of a third embodiment of the invention.
Figure 23:
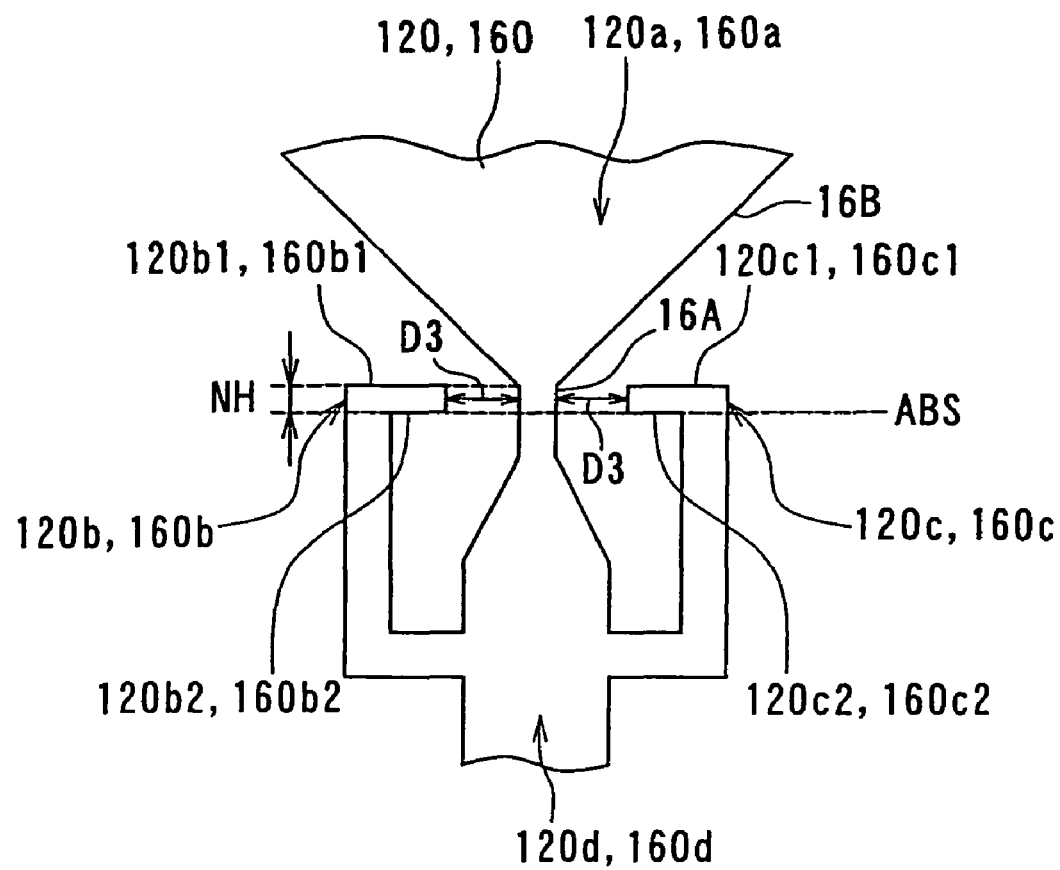
FIG. 23 illustrates another example of arrangement of the indicator portions of the third embodiment of the invention.

Reference is now made to FIG. 22 and FIG. 23 to describe a method of manufacturing a magnetic head and a magnetic head substructure of a third embodiment of the invention. FIG. 22 and FIG. 23 each illustrate indicator portions and a neighborhood thereof of the third embodiment. In the embodiment, at least part of each of the indicators is located in a region that will remain in the magnetic head. FIG. 22 illustrates an example in which part of each of the indicators is located in the region that will remain in the magnetic head. FIG. 23 illustrates an example in which the whole of each of the indicators is located in the region that will remain in the magnetic head.

In the example shown in FIG. 22, the middle between the ends 120b1 and 120b2, the middle between the ends 120c1 and 120c2, the middle between the ends 160b1 and 160b2, and the middle between the ends 160c1 and 160c2 are located in the region ABS. Therefore, the locations of these middles are the references for indicating the location of the region ABS. In the example shown in FIG. 22, the distance between the region ABS and each of the locations of above-mentioned middles is zero. However, this distance may be designed to be of a value other than zero. Alternatively, the locations of the ends 120b1, 120c1, 160b1 and 160c1 or the locations of the ends 120b2, 120c2, 160b2 and 160c2 may be used as the references for indicating the location of the region ABS.

In the example shown in FIG. 22, the indicator portions 120b, 120c, 160b and 160c have portions that will remain in the magnetic head, that is, the portions located in a region higher than the region ABS of FIG. 22. The length of these portions in the direction orthogonal to the region ABS is equal to the neck height NH. Therefore, the portions of the indicator portions 120b, 120c, 160b and 160c that will remain in the magnetic head indicate the neck height.

In the example shown in FIG. 23, the whole of each of the indicator portions 120b, 120c, 160b and 160c is located in the region that will remain in the magnetic head, that is, in the region higher than the region ABS of FIG. 23. In the example shown in FIG. 23, the ends 120b2, 120c2, 160b2 and 160c2 are located in the region ABS. Therefore, the locations of the ends 120b2, 120c2, 160b2 and 160c2 are the references for indicating the location of the region ABS. In the example shown in FIG. 23, the distance between the region ABS and each of the ends 120b2, 120c2, 160b2 and 160c2 is zero. Alternatively, the locations of the ends 120b1, 120c1, 160b1 and 160c1 may be used as the references for indicating the location of the region ABS. Another alternative is that the location of the middle between the ends 120b1 and 120b2, the location of the middle between the ends 120c1 and 120c2, the location of the middle between the ends 160b1 and 160b2, and the location of the middle between the ends 160c1 and 160c2 may be used as the references for indicating the location of the region ABS.

In the example shown in FIG. 23, the length of the indicator portions 120b, 120c, 160b and 160c taken in the direction orthogonal to the region ABS is equal to the neck height NH. Therefore, the indicator portions 120b, 120c, 160b and 160c indicate the neck height NH.

According to the embodiment, the neck height NH may be obtained in the following manner after the magnetic heads are completed. In this method, first, a specific number of magnetic heads are taken as samples for determining neck heights from a plurality of magnetic heads manufactured out of a single substrate 1. Next, in the samples, etching is performed on portions around the portions of the indicator portions 120b, 120c, 160b and 160c remaining in the magnetic heads. The length of each of these portions orthogonal to the medium facing surface 30 is then measured. This length is equal to the neck height NH. Therefore, the neck height NH of each of the samples is obtained by measuring this length. It is assumed that the neck heights NH of the magnetic heads that are other than the samples but manufactured out of the same substrate 1 as the samples are nearly equal to the neck heights NH of the samples. According to the embodiment, the neck height NH is obtained in such a manner after the magnetic heads are completed. It is thereby possible to confirm whether the neck height NH is of a desired value after the magnetic heads are completed.

The remainder of configuration, operation and effects of the third embodiment are similar to those of the first embodiment including the modification example.

Fourth Embodiment

Figure 24:
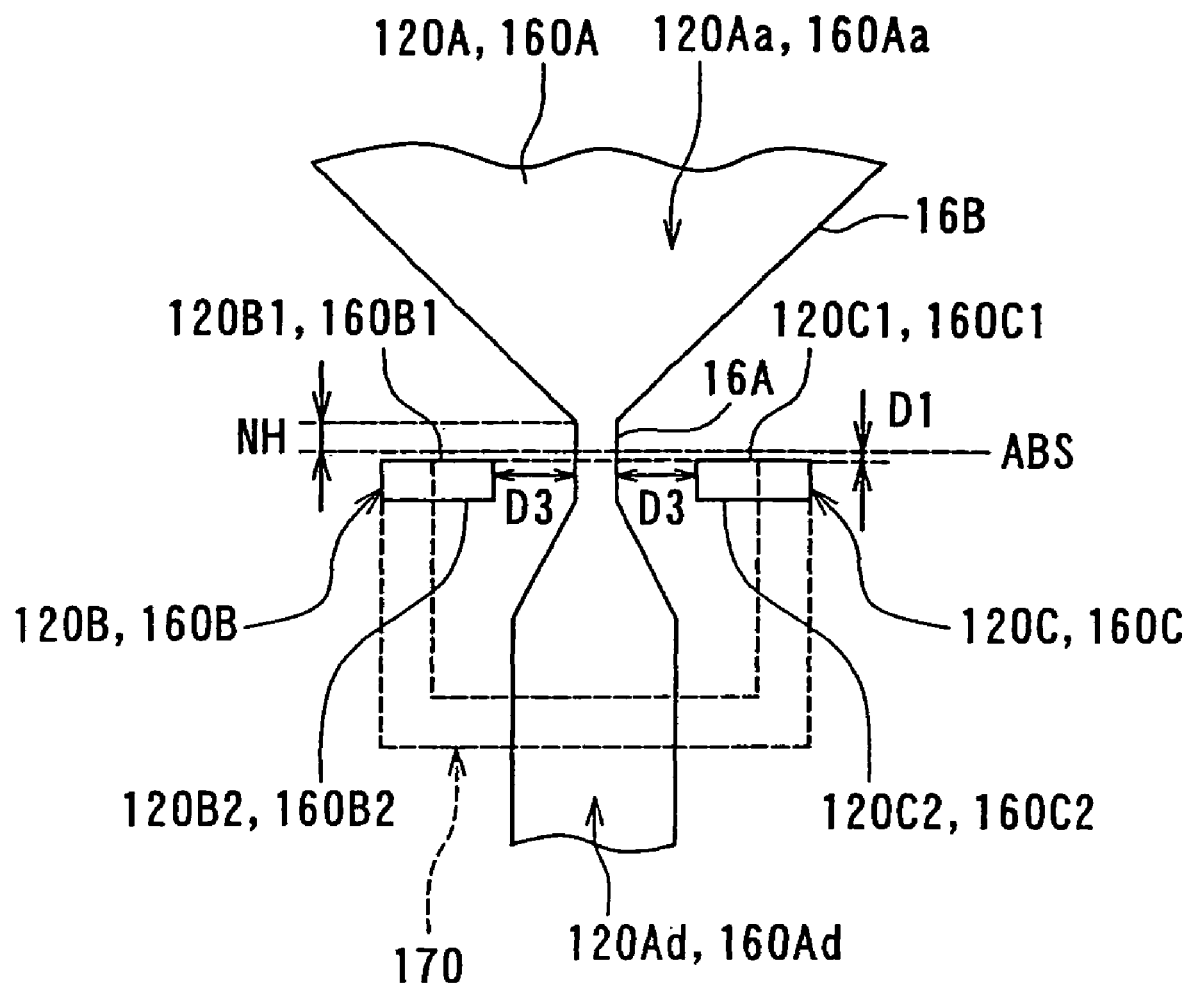
FIG. 24 illustrates indicator portions of a fourth embodiment of the invention.

Reference is now made to FIG. 24 to describe a method of manufacturing a magnetic head and a magnetic head substructure of a fourth embodiment of the invention. FIG. 24 illustrates indicators and a neighborhood thereof of the fourth embodiment. In the embodiment, grooves 120A, 120B and 120C that are separated from one another are formed in place of the groove 120 of the first embodiment. A method of forming the grooves 120A, 120B and 120C is the same as that of the groove 120. The groove 120A incorporates a portion 120Aa corresponding to the pole layer and an extended portion 120Ad. The portion 120Aa is a portion in which the pole layer 16 will be disposed later. The extended portion 120Ad is a portion connected to the portion 120Aa and located in a region that will not remain in the magnetic head, that is, the region lower than the region ABS of FIG. 24. The grooves 120B and 120C correspond to the indicators of the invention and each serve as the reference for indicating the location of the region ABS. The shape of each of the grooves 120B and 120C in the top surface of the nonmagnetic layer 12P is rectangular. The groove 120A corresponds to the 'first groove' of the invention. The portion 120Aa corresponds to the 'groove that accommodates the pole layer' of the invention. The grooves 120B and 120C correspond to the 'second grooves', and also correspond to the 'other grooves that form the indicators' of the invention.

The grooves 120B and 120C have shapes the same as those of the indicator portions 120b and 120c of the first embodiment, and are placed at the locations the same as those of the indicator portions 120b and 120c. The groove 120B has two ends 120B1 and 120B2 each of which is parallel to the region ABS. Similarly, the groove 120C has two ends 120C1 and 120C2 each of which is parallel to the region ABS. The ends 120B1 and 120C1 are located closer to the region ABS than the ends 120B2 and 120C2. The distance between the region ABS and the end 120B1 is equal to the distance between the region ABS and the end 120C1. Similarly, the distance between the region ABS and the end 120B2 is equal to the distance between the region ABS and the end 120C2. In the embodiment, the location of the ends 120B1 and 120C1 serves as a reference for indicating the location of the region ABS. Therefore, the distance D1 between the region ABS and the ends 120B1, 120C1 is designed to be of a specific value. Furthermore, the distance between the grooves 120B, 120C and the track width defining portion 16A taken in the direction of width thereof is defined as D3. The preferred ranges of the distances D1 and D3 are the same as those of the first embodiment.

In the embodiment, magnetic layers 160A, 160B and 160C that are separated from one another are formed in place of the magnetic layer 160 of the first embodiment. A method of forming the magnetic layers 160A, 160B and 160C is the same as that of the magnetic layer 160. The magnetic layer 160A incorporates a portion 160Aa corresponding to the pole layer and an extended portion 160Ad. The portion 160Aa is a portion that will be the pole layer 16 later. The extended portion 160Ad is a portion connected to the portion 160Aa and located in a region that will not remain in the magnetic head, that is, the region lower than the region ABS of FIG. 24. The magnetic layers 160B and 160C correspond to the indicators of the invention and each serve as the reference for indicating the location of the region ABS. Therefore, the indicators of the embodiment are made up of the magnetic layers 160B and 160C that are located at the height the same as the pole layer 16 (the magnetic layer 160).

The magnetic layers 160A, 160B and 160C have plane geometries the same as those of the grooves 120A, 120B and 120C in the top surface of the encasing layer 12. The magnetic layer 160B has two ends 160B1 and 160B2 each of which is parallel to the region ABS. Similarly, the magnetic layer 160C has two ends 160C1 and 160C2 each of which is parallel to the region ABS. The ends 160B1 and 160C1 are located closer to the region ABS than the ends 160B2 and 160C2. The distance between the region ABS and the end 160B1 is equal to the distance between the region ABS and the end 160C1. Similarly, the distance between the region ABS and the end 160B2 is equal to the distance between the region ABS and the end 160C2. In the embodiment, the location of the ends 160B1 and 160C1 serves as a reference for indicating the location of the region ABS, as the location of the ends 120B1 and 120C1. The distance between the region ABS and the ends 160B1, 160C1 is equal to the distance D1 between the region ABS and the ends 120B1, 120C1. The distance D1 is designed to be of a specific value. Furthermore, the distance between the magnetic layers 160B, 160C and the track width defining portion 16A taken in the direction of width thereof is defined as D3. The preferred ranges of the distances D1 and D3 are described above.

In the fourth embodiment, as in the first embodiment, it is possible to determine the location of the region ABS and the track width by observing at least one of the grooves 120B, 120C and the magnetic layers 160B, 160C by an electron microscope.

According to the embodiment, a connecting layer 170 made of a conductive material may be provided below the magnetic layers 160A, 160B and 160C that are conductive. The connecting layer 170 is in contact with the lower surfaces of the magnetic layers 160A, 160B and 160C, and electrically connects the magnetic layers 160A, 160B and 160C to one another. As a result, when the magnetic layers 160A, 160B and 160C are observed by an electron microscope, it is possible to prevent electric charges from accumulating on the magnetic layers 160B and 160C. In addition, the potential of the magnetic layers 160B and 160C is the same as that of the magnetic layer 160A, and it is thereby possible to obtain correct images of the magnetic layers 160B and 160C together with the magnetic layer 160A. It is thereby possible to obtain the location of the region ABS with higher accuracy.

The remainder of configuration, operation and effects of the fourth embodiment are similar to those of the first embodiment including the modification example.

In the fourth embodiment, as in the second embodiment, the location of the middle between the ends 120B1 and 120B2, the location of the middle between the ends 120C1 and 120C2, the location of the middle between the ends 160B1 and 160B2, and the location of the middle between the ends 160C1 and 160C2 may be used as the references for indicating the location of the region ABS. Alternatively, the locations of the ends 120B2, 120C2, 160B2 and 160C2 may be used as the references for indicating the location of the region ABS. As in the third embodiment, at least part of each of the indicators (the grooves 120B and 120C and the magnetic layers 160B and 160C) may be placed in a region that will remain in the magnetic head. Furthermore, the part of each of the indicators remaining in the magnetic head may indicate the neck height NH.

Fifth Embodiment

Reference is now made to FIG. 25A to FIG. 33A and FIG. 25B to FIG. 33B to describe a method of manufacturing a magnetic head and a magnetic head substructure of a fifth embodiment of the invention. The method of manufacturing the magnetic head of the fifth embodiment includes the steps up to the step of forming the groove 120 in the nonmagnetic layer 12P that are the same as those of the first embodiment. In the fifth embodiment, however, a lower polishing stopper layer 33 is formed on the nonmagnetic layer 12P in place of the polishing stopper layer 13 of the first embodiment. The material, thickness and forming method of the lower polishing stopper layer 33 are the same as those of the polishing stopper layer 13. The groove 120 is formed so that the nonmagnetic layer 12P is formed into the encasing layer 12. Next, as in the first embodiment, the location of the region ABS and the track width may be obtained by observing the opening of the lower polishing stopper layer 33 through the use of an electron microscope after the mask 31 is removed.

In the following step of the fifth embodiment, the pole layer 16 is formed in the groove 120 with a spacer layer 34 and an upper polishing stopper layer 35 disposed between the pole layer 16 and the groove 120. Therefore, the track width is of a value obtained by subtracting twice the thickness of the spacer layer 34 and twice the thickness of the upper polishing stopper layer 35 from the width of the groove 120 taken in the top surface of the encasing layer 12 at the location of the region ABS. It is possible to control the thicknesses of the spacer layer 34 and the upper polishing stopper layer 35 with accuracy. Therefore, it is possible to obtain the track width by measuring the above-mentioned width of the groove 120.

Figure 25A:
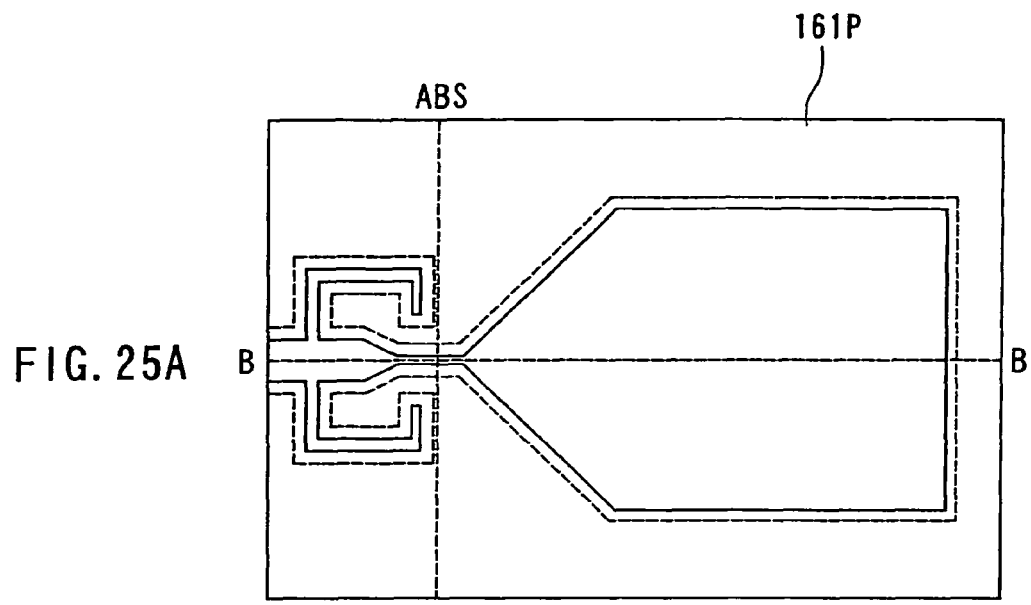
FIG. 25A and FIG. 25B are views for illustrating a step of a method of manufacturing a magnetic head of a fifth embodiment of the invention.
Figure 25B:
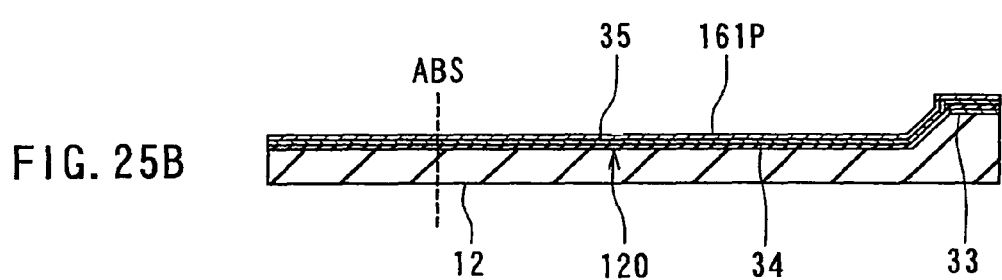
Figure 26A:
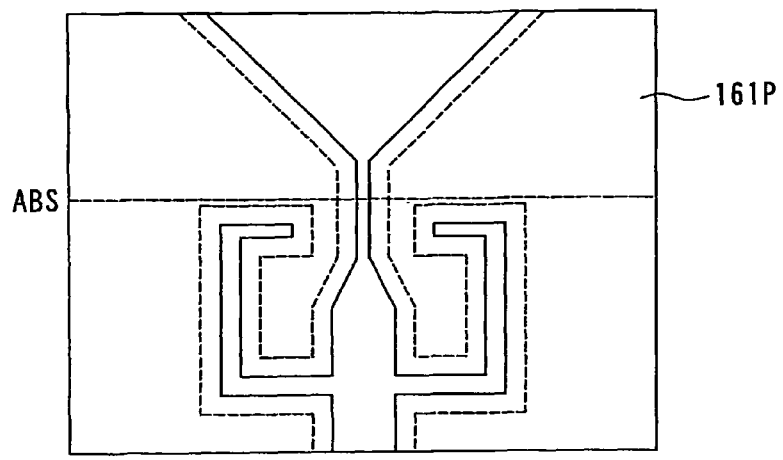
FIG. 26A and FIG. 26B are views for illustrating the main part of FIG. 25A and FIG. 25B.
Figure 26B:
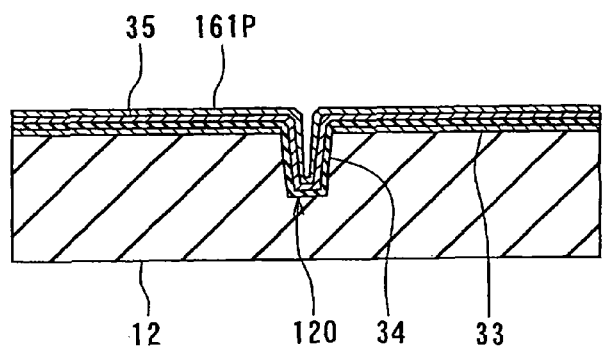

FIG. 25A, FIG. 25B, FIG. 26A and FIG. 26B illustrate the following step. FIG. 25A shows the top surface of the layered structure in the course of manufacturing process of the magnetic head. FIG. 25B illustrates a cross section of the layered structure orthogonal to the medium facing surface and the substrate. FIG. 25B is a cross section taken along line B-B of FIG. 25A. FIG. 26A is an enlarged view of neighborhood of the region ABS of FIG. 25A. FIG. 26B is a cross section corresponding to the region ABS of FIG. 26A. In the step, first, the spacer layer 34 made of a nonmagnetic material is formed in the groove 120 of the encasing layer 12 and on the lower polishing stopper layer 33. The thickness of the spacer layer 34 falls within a range of 20 to 50 nm inclusive, for example.

The spacer layer 34 may be made of an insulating material or a semiconductor material, for example. The insulating material as the material of the spacer layer 34 may be any of alumina, silicon oxide ($SiO_x$), and silicon oxynitride (SiON). The semiconductor material as the material of the spacer layer 34 may be polycrystalline silicon or amorphous silicon.

The spacer layer 34 may be formed by sputtering or CVD, for example. It is possible to control the thickness of the spacer layer 34 with precision. If the spacer layer 34 is formed by CVD, it is preferred to employ a method called 'atomic layer CVD' (ALCVD) in which formation of a single atomic layer is repeated. In this case, it is possible to control the thickness of the spacer layer 34 with higher precision. If the spacer layer 34 is formed using a semiconductor material, it is preferred to form the spacer layer 34 by ALCVD at a low temperature (around 200° C.) or by low-pressure CVD at a low temperature. The semiconductor material as the material of the spacer layer 34 is preferably undoped polycrystalline silicon or amorphous silicon.

Next, the upper polishing stopper layer 35 made of a nonmagnetic material is formed on the spacer layer 34. The upper polishing stopper layer 35 is formed by sputtering or IBD, for example. If the upper polishing stopper layer 35 is formed by sputtering, it is preferred to employ collimation sputtering or long throw sputtering. The material of the upper polishing stopper layer 35 may be the same as that of the polishing stopper layer 13 of the first embodiment. The thickness of the upper polishing stopper layer 35 falls within a range of 20 to 60 nm, for example.

Next, the magnetic layer 161P is formed on the upper polishing stopper layer 35. The thickness of the magnetic layer 161P falls within a range of 40 to 60 nm, for example. The material and forming method of the magnetic layer 161P are the same as those of the first embodiment.

Figure 27A:
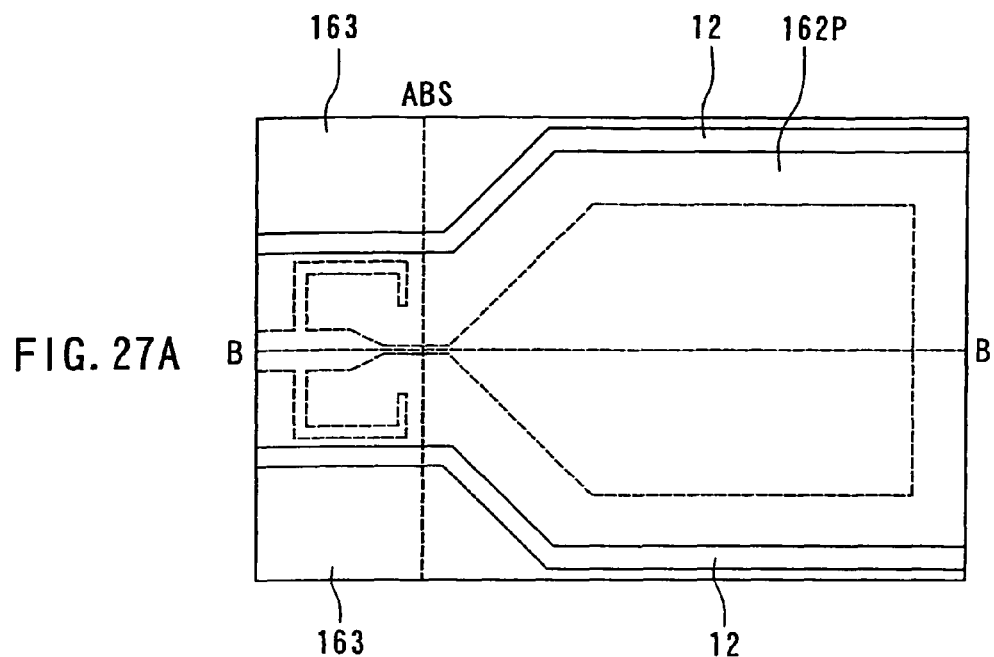
FIG. 27A and FIG. 27B are views for illustrating a step that follows the step shown in FIG. 25A and FIG. 25B.
Figure 27B:
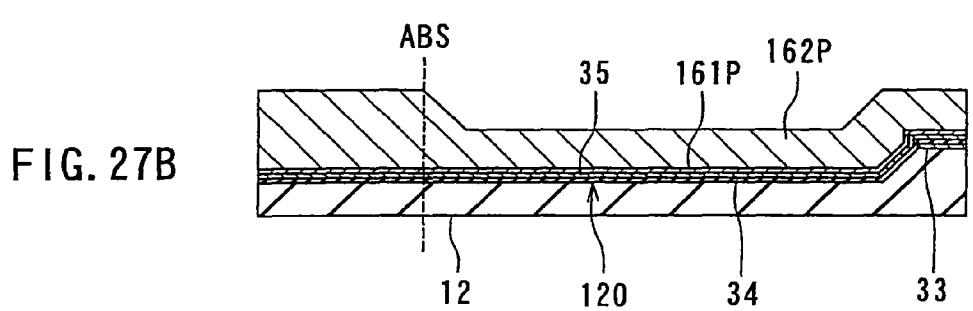
Figure 28A:
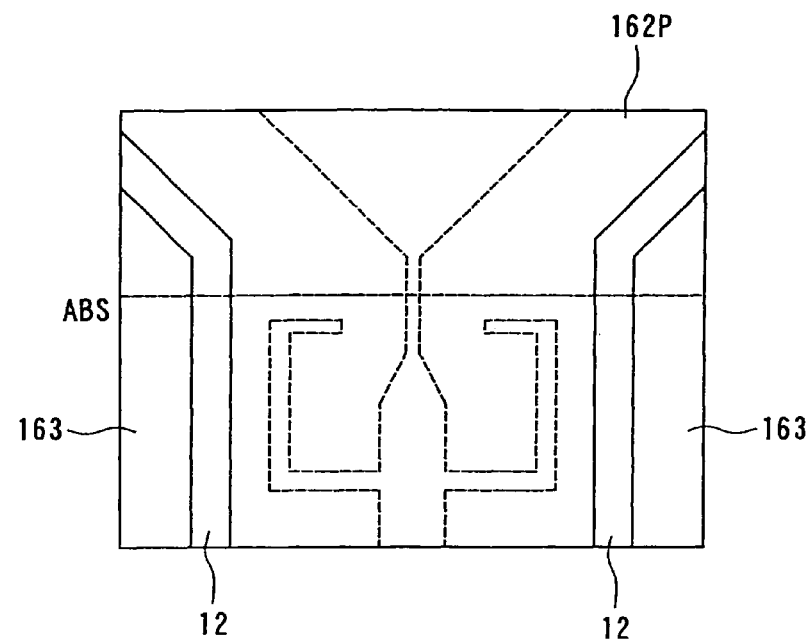
FIG. 28A and FIG. 28B are views for illustrating the main part of FIG. 27A and FIG. 27B.
Figure 28B:
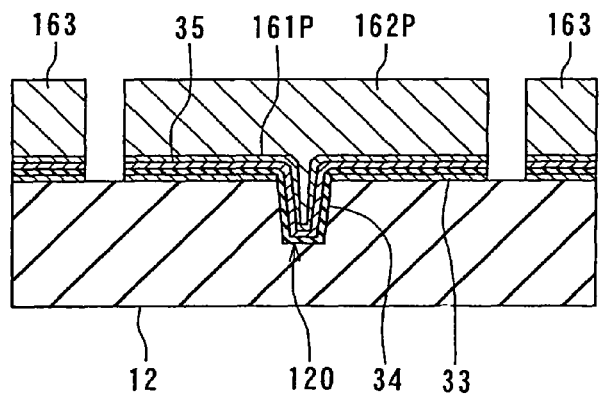

FIG. 27A, FIG. 27B, FIG. 28A and FIG. 28B illustrate the following step. FIG. 27A shows the top surface of the layered structure in the course of manufacturing process of the magnetic head. FIG. 27B illustrates a cross section of the layered structure orthogonal to the medium facing surface and the substrate. FIG. 27B is a cross section taken along line B-B of FIG. 27A. FIG. 28A is an enlarged view of neighborhood of the region ABS of FIG. 27A. FIG. 28B is a cross section corresponding to the region ABS of FIG. 28A. In the step, first, the magnetic layer 162P is formed on the magnetic layer 161P. The magnetic layer 162P is formed by frame plating, for example. In this case, the magnetic layer 161P is used as an electrode for plating. If the upper polishing stopper layer 35 is made of a conductive material, the upper polishing stopper layer 35 is used as an electrode for plating, too. In FIG. 27A, FIG. 28A and FIG. 28B, numeral 163 indicates an unwanted plating layer formed outside the frame. Next, the layered structure made up of the magnetic layer 161P, the upper polishing stopper layer 35, the spacer layer 34 and the lower polishing stopper layer 33 except portions below the magnetic layer 162P and the plating layer 163 are removed by etching.

Figure 29A:
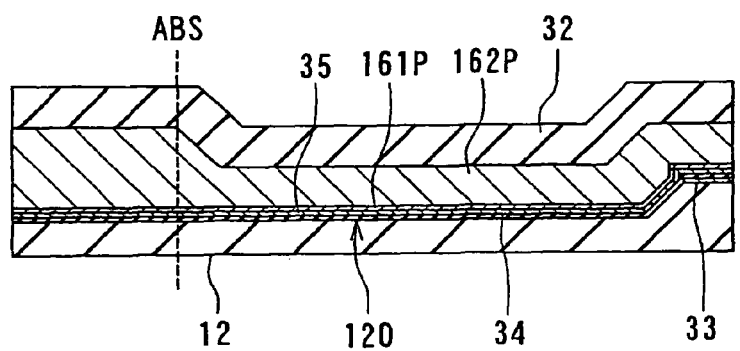
FIG. 29A and FIG. 29B are views for illustrating a step that follows the step shown in FIG. 27A and FIG. 27B.
Figure 29B:
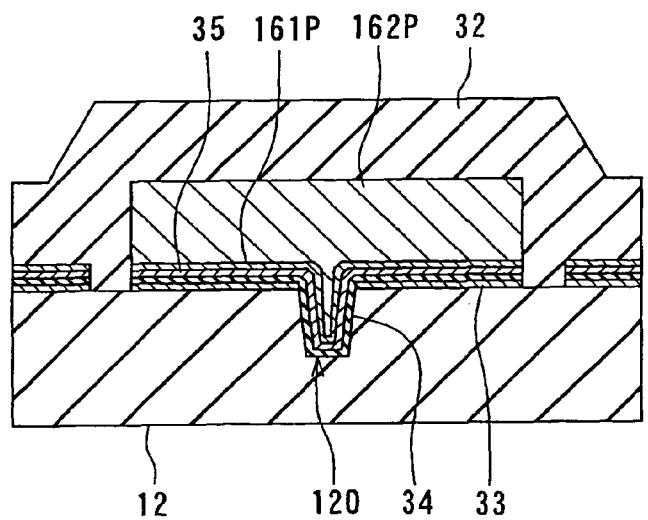

FIG. 29A and FIG. 29B illustrate the following step. FIG. 29A shows a cross section of the layered structure in the course of manufacturing process of the magnetic head, the cross section being orthogonal to the medium facing surface and the substrate. FIG. 29B is an enlarged view of cross section corresponding to the region ABS of FIG. 29A. In the step, first, the plating layer 163 is selectively removed. Next, the coating layer 32 made of alumina, for example, and having a thickness of 1.0 to 1.5 µm, for example, is formed on the entire top surface of the layered structure.

Figure 30A:
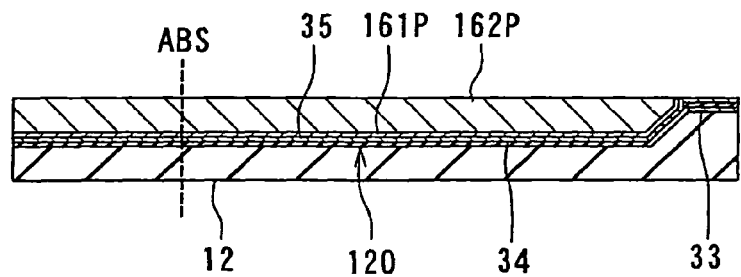
FIG. 30A and FIG. 30B are views for illustrating a step that follows the step shown in FIG. 29A and FIG. 29B.
Figure 30B:
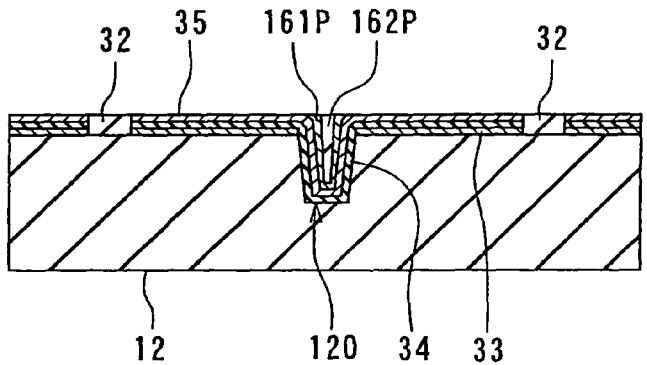

FIG. 30A and FIG. 30B illustrate the following step. FIG. 30A shows a cross section of the layered structure in the course of manufacturing process of the magnetic head, the cross section being orthogonal to the medium facing surface and the substrate. FIG. 30B is an enlarged view of cross section corresponding to the region ABS of FIG. 30A. In the step, the coating layer 32, the magnetic layer 162P and the magnetic layer 161P are polished by CMP, for example, until the upper polishing stopper layer 35 is exposed, and the top surfaces of the upper polishing stopper layer 35, the magnetic layer 161P and the magnetic layer 162P are thereby flattened. If the coating layer 32, the magnetic layer 162P and the magnetic layer 161P are polished by CMP, such a slurry is used that polishing is stopped when the upper polishing stopper layer 35 is exposed, such as an alumina-base slurry.

Figure 31A:
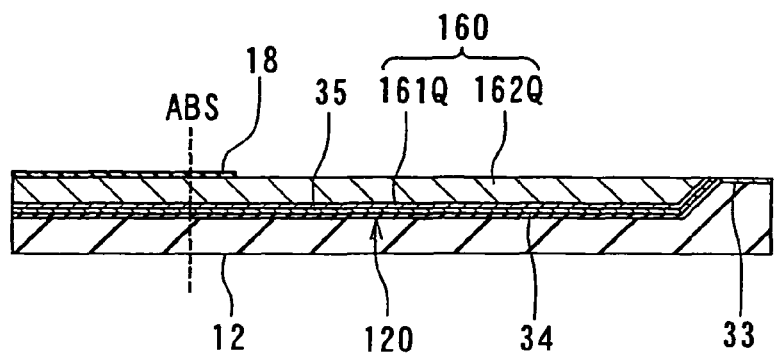
FIG. 31A and FIG. 31B are views for illustrating a step that follows the step shown in FIG. 30A and FIG. 30B.
Figure 31B:
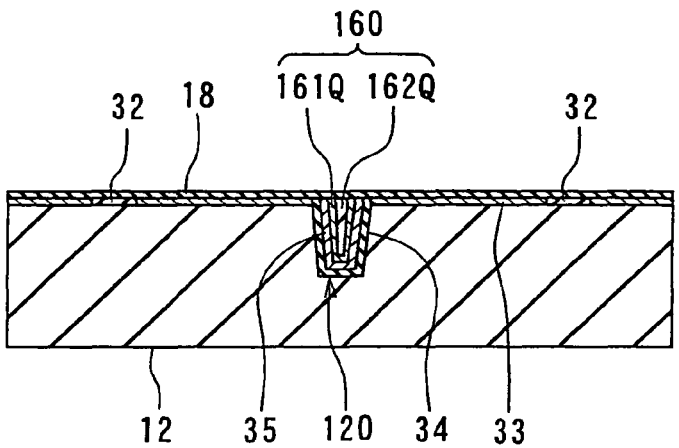

FIG. 31A and FIG. 31B illustrate the following step. FIG. 31A shows a cross section of the layered structure in the course of manufacturing process of the magnetic head, the cross section being orthogonal to the medium facing surface and the substrate. FIG. 31B is an enlarged view of the cross section corresponding to the region ABS of FIG. 31A. In the step, first, reactive ion etching or ion beam etching is performed to selectively remove a portion of the upper polishing stopper layer 35 exposed from the top surface of the layered structure. Next, the spacer layer 34, the upper polishing stopper layer 35, the magnetic layer 161P and the magnetic layer 162P are polished by CMP, for example, until the lower polishing stopper layer 33 is exposed, and the top surfaces of the lower polishing stopper layer 33, the spacer layer 34, the upper polishing stopper layer 35, the magnetic layer 161P and the magnetic layer 162P are thereby flattened. As a result, portions of the magnetic layers 161P and 162P disposed on the top surface of the lower polishing stopper layer 33 are removed. The remaining portions of the magnetic layers 161P and 162P are hereinafter called magnetic layers 161Q and 162Q, respectively. A combination of the magnetic layers 161Q and 162Q is called the magnetic layer 160.

If the spacer layer 34, the upper polishing stopper layer 35, the magnetic layer 161P and the magnetic layer 162P are polished by CMP, such a slurry is used that polishing is stopped when the lower polishing stopper layer 33 is exposed, such as an alumina-base slurry. It is possible to control the thickness of the magnetic layer 160 that will be the pole layer 16 later with accuracy by stopping the polishing when the lower polishing stopper layer 33 is exposed as thus described.

Next, as in the first embodiment, the location of the region ABS and the track width may be obtained by observing the magnetic layer 160 through the use of an electron microscope.

Next, the gap layer 18 is formed on the entire top surface of the layered structure. A portion of the gap layer 18 in which the yoke layer 20B is to be formed is selectively etched to form an opening in the gap layer 18.

Figure 32A:
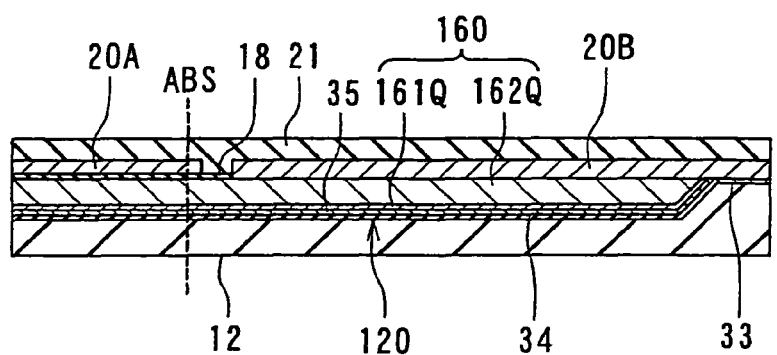
FIG. 32A and FIG. 32B are views for illustrating a step that follows the step shown in FIG. 31A and FIG. 31B.
Figure 32B:
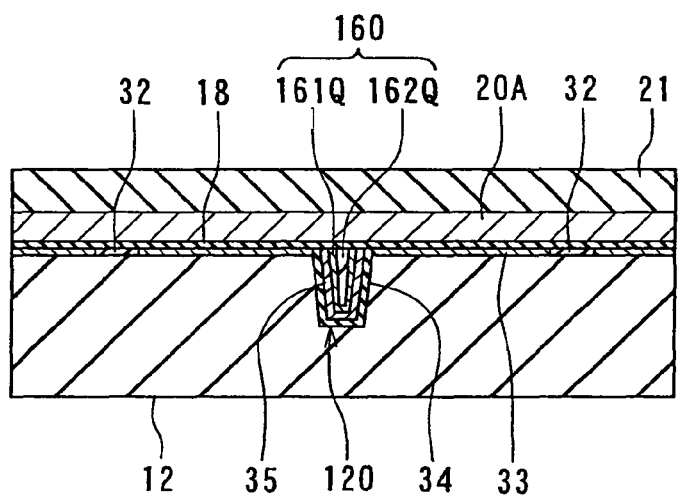

FIG. 32A and FIG. 32B illustrate the following step. FIG. 32A shows a cross section of the layered structure in the course of manufacturing process of the magnetic head, the cross section being orthogonal to the medium facing surface and the substrate. FIG. 32B is an enlarged view of the cross section corresponding to the region ABS of FIG. 32A. In the step, first, the first layer 20A is formed on the gap layer 18, and the yoke layer 20B is formed on a portion of the magnetic layer 160 where the opening of the gap layer 18 is formed. Next, the nonmagnetic layer 21 is formed on the entire top surface of the layered structure.

Figure 33A:
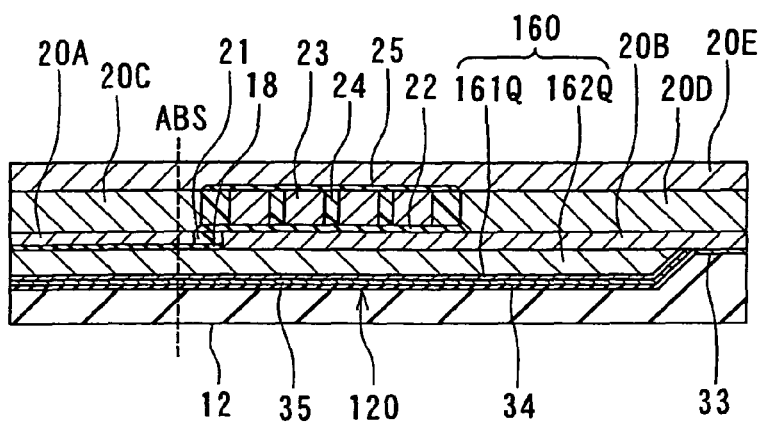
FIG. 33A and FIG. 33B are views for illustrating a step that follows the step shown in FIG. 32A and FIG. 32B.
Figure 33B:
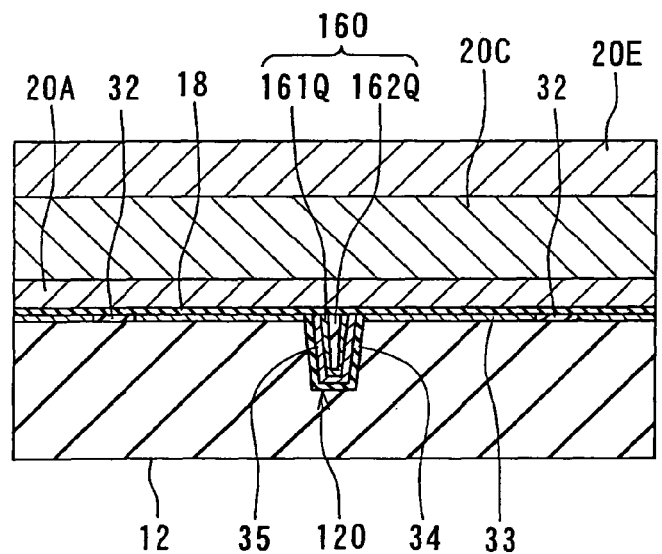

FIG. 33A and FIG. 33B illustrate the following step. FIG. 33A shows a cross section of the layered structure in the course of manufacturing process of the magnetic head, the cross section being orthogonal to the medium facing surface and the substrate. FIG. 33B is an enlarged view of the cross section corresponding to the region ABS of FIG. 33A. The following steps are the same as those of the first embodiment. That is, in the step, first, the nonmagnetic layer 21 is polished by CMP, for example, so that the first layer 20A and the yoke layer 20B are exposed, and the top surfaces of the first layer 20A, the yoke layer 20B and the nonmagnetic layer 21 are thereby flattened. Next, the insulating layer 22 is formed by a method such as sputtering on the entire top surface of the layered structure. Next, the insulating layer 22 except a portion on which the coil 23 and the insulating layer 24 will be disposed later is removed by etching. Next, the coil 23 is formed on the insulating layer 22 by frame plating, for example. Next, the second layer 20C and the coupling layer 20D are formed by frame plating, for example. Alternatively, the coil 23 may be formed after the second layer 20C and the coupling layer 20D are formed. Next, the insulating layer 24 is selectively formed in the space between adjacent turns of the coil 23 and around the coil 23. Next, an insulating layer not shown is formed on the entire top surface of the layered structure. Next, the insulating layer not shown is polished by CMP, for example, so that the second layer 20C, the coupling layer 20D and the coil 23 are exposed, and the top surfaces of the second layer 20C, the coupling layer 20D, the coil 23 and the insulating layer 24 are thereby flattened. Next, the insulating layer 25 is formed on the coil 23 and the insulating layer 24. Next, the third layer 20E is formed by frame plating, for example, to complete the shield layer 20.

Next, although not shown, a protection layer is formed to cover the entire top surface of the layered structure. Wiring and terminals are then formed on the protection layer. In such a manner, components of a plurality of magnetic heads are formed in the single substrate 1. The magnetic head substructure is thus formed in which a plurality of rows of pre-head portions that will be the magnetic heads later are aligned. The magnetic head substructure is cut in a neighborhood of the region ABS. A surface formed by cutting the magnetic head substructure is polished to form the medium facing surfaces 30. Furthermore, a plurality of pre-head portions are separated from one another by cutting the substructure, and a plurality of magnetic heads are thereby formed. When the pre-head portions are separated, the magnetic layers 161Q and 162Q become the first layer 161 and the second layer 162, respectively.

In the magnetic head of the embodiment, the pole layer 16 is disposed in the groove 120 of the encasing layer 12 with the spacer layer 34 and the upper polishing stopper layer 35 disposed between the pole layer 16 and the groove 120. It is thereby possible to further reduce the width of the top surface of the track width defining portion 16A for defining the track width.

As shown in FIG. 30A, FIG. 30B, FIG. 31A and FIG. 31B, the method of manufacturing the magnetic head of the embodiment includes: the first polishing step of polishing the coating layer 32 and the magnetic layers 161P and 162P until the upper polishing stopper layer 35 is exposed; the step of removing the upper polishing stopper layer 35 after the first polishing step; and the second polishing step of polishing the spacer layer 34 and the magnetic layers 161P and 162P until the lower polishing stopper layer 33 is exposed after the upper polishing stopper layer 35 is removed.

According to the embodiment, even if there is a great variation in the thickness of the magnetic layer 162P, it is possible through the first polishing step that the top surfaces of the magnetic layers 161P and 162P are located at a level almost the same as the level at which the top surface of the upper polishing stopper layer 35 is located. However, since the amount of polishing of the first polishing step is great, a small difference in level may be created between the top surface of the stopper layer 35 and the top surfaces of the magnetic layers 161P and 162P when the first polishing step is completed. However, according to the fifth embodiment, the second polishing step with a small amount of polishing is performed after the stopper layer 35 is removed, and it is thereby possible to flatten the top surfaces of the lower polishing stopper layer 33, the magnetic layer 161P and the magnetic layer 162P, such that a difference in level is hardly created between the top surface of the stopper layer 33 and the top surfaces of the magnetic layers 161P and 162P. As a result, according to the embodiment, it is possible to control the thickness of the pole layer 16 made up of the first layer 161 and the second layer 162 with high accuracy. It is therefore possible to control the track width with high accuracy.

According to the fifth embodiment, if the upper polishing stopper layer 35 is made of a conductive material, the stopper layer 35 and the magnetic layer 161P function as electrodes for plating when the magnetic layer 162P is formed by plating. Therefore, even if the magnetic layer 161P is thin, it is possible to feed a sufficient current to the stopper layer 35 and the magnetic layer 161P as the electrodes. It is thereby possible to form the magnetic layer 162P that is uniform in the groove 120. As a result, according to the embodiment, it is possible to form the pole layer 16 that is uniform with accuracy even if the groove 120 has a small width.

In the fifth embodiment, the first layer 161 of the pole layer 16 may be omitted if the upper polishing stopper layer 35 is made of a conductive material. If the first layer 161 is omitted, a magnetic layer to be the pole layer 16 is formed by plating, for example, on the stopper layer 35.

The remainder of configuration, operation and effects of the fifth embodiment are similar to those of the first embodiment including the modification example.

In the embodiment, after the spacer layer 34 and the magnetic layers 161P and 162P are polished until the lower polishing stopper layer 33 is exposed, the polishing stopper layer 33 may be selectively removed by reactive ion etching or ion beam etching, for example. Furthermore, the spacer layer 34 and the magnetic layers 161P and 162P may be slightly polished by CMP, for example, to flatten the top surfaces of the encasing layer 12, the spacer layer 34 and the magnetic layers 161P and 162P. Alternatively, after the spacer layer 34 and the magnetic layers 161P and 162P are polished until the polishing stopper layer 33 is exposed, ion beam etching may be performed to remove the polishing stopper layer 33 and to etch portions of the spacer layer 34 and the magnetic layers 161P and 162P, so that the top surfaces of the encasing layer 12, the spacer layer 34 and the magnetic layers 161P and 162P are flattened.

Sixth Embodiment

A method of manufacturing a magnetic head and a magnetic head substructure of a sixth embodiment of the invention will now be described. Reference is now made to FIG. 35A to FIG. 43A and FIG. 35B to FIG. 43B to describe the method of manufacturing the magnetic head of the embodiment. FIG. 35A to FIG. 43A illustrate a cross section of the layered structure in the course of manufacturing process of the magnetic head, the cross section being orthogonal to the medium facing surface and the substrate. FIG. 35B to FIG. 43B illustrate a cross section corresponding to the region ABS of FIG. 35A to FIG. 43A. In FIG. 35A to FIG. 43A and FIG. 35B to FIG. 43B, the coil 9, the insulating layers 10 and 11, and the portion closer to the substrate 1 than the coil 9 and the insulating layers 10 and 11 are omitted.

The method of manufacturing the magnetic head of the sixth embodiment includes the steps up to the step of forming the coil 9 and the insulating layers 10 and 11 on the insulating layer 8 and flattening the top surfaces of the coil 9 and the insulating layers 10 and 11 that are the same as those of the first embodiment.

FIG. 35A and FIG. 35B illustrate the following step. In the step, first, an insulating layer 41 made of an insulating material such as alumina is formed on the flattened top surfaces of the coil 9 and the insulating layers 10 and 11. Next, a yoke layer 42 made of a magnetic material and a conductive layer 43 made of a conductive material each of which has a thickness of 1 μm, for example, are formed on the insulating layer 41 by a method such as frame plating. The yoke layer 42 may be made of CoNiFe, for example. The conductive layer 43 may be made of a material the same as that of the yoke layer 42 and formed at the same time as the yoke layer 42. The shapes and arrangement of the yoke layer 42 and the conductive layer 43 will be described in detail later. Next, an insulating layer 44 made of alumina, for example, and having a thickness of 2 μm, for example, is formed on the entire top surface of the layered structure by a method such as sputtering.

Next, as shown in FIG. 36A and FIG. 36B, the insulating layer 44 is polished by CMP, for example, so that the yoke layer 42 and the conductive layer 43 are exposed, and the top surfaces of the yoke layer 42, the conductive layer 43 and the insulating layer 44 are thereby flattened.

FIG. 37A and FIG. 37B illustrate the following step. In the step, first, a layer 46P to be patterned that is made of a magnetic material is formed by sputtering, for example, on the flattened top surfaces of the yoke layer 42, the conductive layer 43 and the insulating layer 44. The layer 46P is made of CoFeN, for example. The layer 46P has a thickness that falls within a range of 0.2 to 0.4 μm inclusive, for example.

Next, an alumina layer 47 having a thickness of 1.2 μm, for example, is formed by sputtering, for example, on the layer 46P. Next, an etching mask 48 made of CoFe or CoNiFe, for example, and having a thickness of 0.3 to 0.6 μm, for example, is formed by frame plating on the alumina layer 47. The mask 48 has a plane geometry corresponding to that of the pole layer to be formed.

FIG. 38A and FIG. 38B illustrate the following step. In the step, first, the alumina layer 47 is selectively etched, using the mask 48. Etching of the alumina layer 47 is performed by reactive ion etching, for example. Next, the layer 46P is selectively etched, using the portion of the alumina layer 47 remaining after the etching as a mask. Through this etching, the layer 46P is patterned to be a magnetic layer 46Q that will be the pole layer later. The magnetic layer 46Q includes a portion 46AQ to be etched that will be formed into the track width defining portion by etching both side surfaces of the portion 46AQ to form sloped surfaces. The etching of the layer 46P is performed by reactive ion etching or ion beam etching, for example.

FIG. 39A and FIG. 39B illustrate the following step. In the step, both side surfaces of the portion 46AQ are etched by ion beam etching to make the side surfaces of the portion 46AQ sloped, so that the width of the bottom surface of the portion 46AQ is smaller than the width of the top surface of the portion 46AQ. To be specific, each of the side surfaces of the portion 46AQ is made to form an angle that falls within a range of 5 to 12 degrees inclusive, for example, with respect to the direction orthogonal to the top surface of the substrate 1. This etching is performed such that the direction in which ion beams move forms an angle of 40 to 50 degrees, for example, with respect to the direction orthogonal to the top surface of the substrate 1. The magnetic layer 46Q in which the side surfaces of the portion 46AQ have been etched is defined as a magnetic layer 46.

Figure 34:
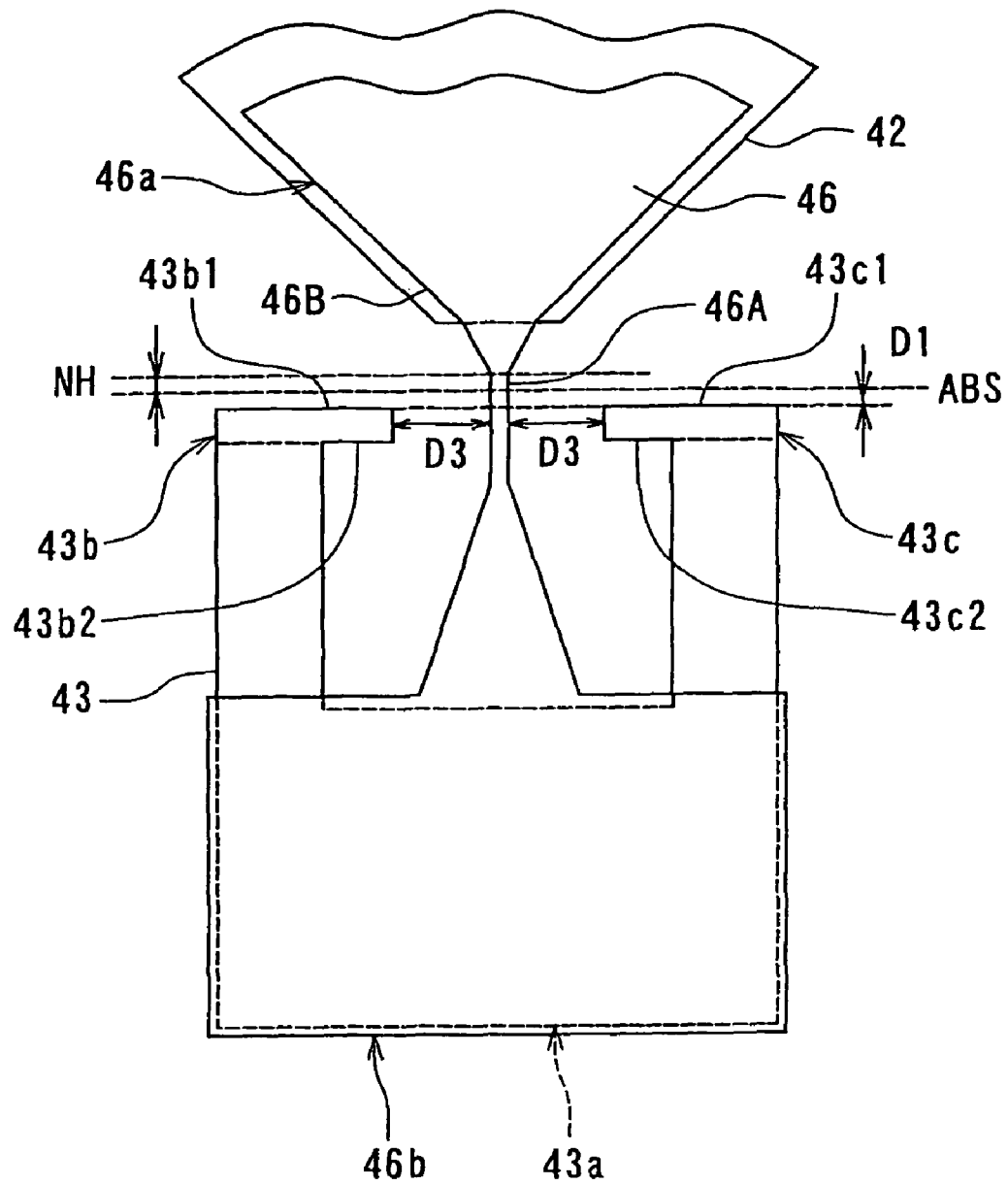
FIG. 34 illustrates indicator portions of a sixth embodiment of the invention.

Reference is now made to FIG. 34 to describe the shapes and arrangement of the yoke layer 42, the conductive layer 43 and the magnetic layer 46. FIG. 34 is a top view of the yoke layer 42, the conductive layer 43 and the magnetic layer 46 in the neighborhood of the region ABS. The magnetic layer 46 incorporates a portion 46a corresponding to the pole layer and an extended portion 46b. The portion 46a is a portion that will be the pole layer of the magnetic head later and that is located in a region higher than the region ABS of FIG. 34. The extended portion 46b is a portion connected to the portion 46a and located in a region that will not remain in the magnetic head, that is, the region lower than the region ABS of FIG. 34. The portion 46a incorporates a track width defining portion 46A and a wide portion 46B.

The yoke layer 42 is disposed below the portion 46a of the magnetic layer 46, and touches the portion 46a. An end of the yoke layer 42 closer to the region ABS is located at a distance from the region ABS.

The conductive layer 43 incorporates a connecting portion 43a and indicator portions 43b and 43c. The indicator portions 43b and 43c correspond to the indicators of the invention and each serve as the reference for indicating the location of the region ABS. Each of the indicator portions 43b and 43c is rectangle-shaped. The connecting portion 43a connects the indicator portions 43b and 43c to each other. Part of the connecting portion 43a is disposed below the extended portion 46b of the magnetic layer 46, and touches the extended portion 46b.

The indicator portion 43b has two ends 43b1 and 43b2 each of which is parallel to the region ABS. Similarly, the indicator portion 43c has two ends 43c1 and 43c2 each of which is parallel to the region ABS. The ends 43b1 and 43c1 are located closer to the region ABS than the ends 43b2 and 43c2. The distance between the region ABS and the end 43b1 is equal to the distance between the region ABS and the end 43c1. Similarly, the distance between the region ABS and the end 43b2 is equal to the distance between the region ABS and the end 43c2. In the embodiment, the location of the ends 43b1 and 43c1 serves as a reference for indicating the location of the region ABS. Therefore, the distance D1 between the region ABS and the ends 43b1, 43c1 is designed to be of a specific value. Furthermore, the distance between the indicator portions 43b, 43c and the track width defining portion 46A taken in the direction of width thereof is defined as D3. The preferred ranges of the distances D1 and D3 are the same as those of the first embodiment.

According to the embodiment, the top surfaces of the indicator portions 43b, 43c are exposed when both side surfaces of the portion 46AQ of the magnetic layer 46Q are etched and the magnetic layer 46Q is thereby formed into the magnetic layer 46. Therefore, it is possible to obtain the location of the region ABS by observing the top surfaces of the indicator portions 43b, 43c through the use of an electron microscope. Furthermore, it is possible to obtain the track width by measuring the width of the top surface of the magnetic layer 46 at the location of the region ABS.

According to the embodiment, the magnetic layer 46 and the indicator portions 43b and 43c are conductive. In addition, the indicator portions 43b and 43c are electrically connected to the magnetic layer 46. Therefore, when the indicator portions 43b and 43c are observed by an electron microscope, it is possible to prevent electric charges from accumulating on the indicator portions 43b and 43c. In addition, the potential of the indicator portions 43b and 43c is the same as that of the magnetic layer 46, and it is thereby possible to obtain correct images of the indicator portions 43b and 43c together with the magnetic layer 46. It is thereby possible to obtain the location of the region ABS with higher accuracy.

FIG. 40A and FIG. 40B illustrate the following step. In the step, first, a nonmagnetic layer 50 having a thickness equal to the thickness of the magnetic layer 46 is formed on the entire top surface of the layered structure. Next, a polishing stopper layer 51 having a thickness of 10 to 20 nm, for example, is formed on the nonmagnetic layer 50 except a region near the magnetic layer 46. The polishing stopper layer 51 is made of a material the same as the material of the polishing stopper layer 13 of the first embodiment. Next, an insulating film 52 made of alumina, for example, and having a thickness of 0.3 to 0.8 μm, for example, is formed on the entire top surface of the layered structure.

FIG. 41A and FIG. 41B illustrate the following step. In the step, first, the insulating film 52 and the nonmagnetic layer 50 are polished by CMP, for example. This polishing is stopped when the stopper layer 51 is exposed. Next, the stopper layer 51 is removed by reactive ion etching or wet etching, for example. The top surface of the nonmagnetic layer 50 is thereby exposed. Next, the top surfaces of the nonmagnetic layer 50 and the insulating film 52 are slightly polished by CMP, for example, to expose the top surface of the magnetic layer 46 and to flatten the top surfaces of the magnetic layer 46 and the nonmagnetic layer 50. The thickness of the pole layer that will be made up of the portion 46a of the magnetic layer 46 later is thereby controlled to be of a desired value.

FIG. 42A and FIG. 42B illustrate the following step. In the step, first, the gap layer 18 is formed on the entire top surface of the layered structure. Next, a portion of the gap layer 18 away from the region ABS is selectively etched to form an opening in the gap layer 18. Next, the first layer 20A is formed on the gap layer 18, and a coupling layer 20G is formed on a portion of the magnetic layer 46 where the opening of the gap layer 18 is formed. The first layer 20A and the coupling layer 20G may be formed by frame plating or by making a magnetic layer through sputtering and selectively etching the magnetic layer. Next, the nonmagnetic layer 53 is formed on the entire top surface of the layered structure. Next, the nonmagnetic layer 53 is polished by CMP, for example, so that the first layer 20A and the coupling layer 20G are exposed, and the top surfaces of the first layer 20A, the coupling layer 20G and the nonmagnetic layer 53 are flattened.

FIG. 43A and FIG. 43B illustrate the following step. In the step, first, the coil 23 is formed by frame plating, for example, on the nonmagnetic layer 53. Next, the second layer 20C is formed on the first layer 20A and the coupling layer 20D is formed on the coupling layer 20G by frame plating, for example. Alternatively, the coil 23 may be formed after the second layer 20C and the coupling layer 20D are formed. Next, the insulating layer 24 made of photoresist, for example, is selectively formed to cover the coil 23. Next, an insulating film not shown made of alumina, for example, and having a thickness of 2.5 μm, for example, is formed on the entire top surface of the layered structure. Next, the insulating film not shown and the insulating layer 24 are polished by CMP, for example, so that the second layer 20C, the coupling layer 20D and the coil 23 are exposed, and the top surfaces of the second layer 20C, the coupling layer 20D, the coil 23 and the insulating layer 24 are thereby flattened. Next, the insulating layer 25 made of alumina, for example, and having a thickness of 0.2 μm, for example, is formed on the coil 23 and the insulating layer 24.

Next, the third layer 20E is formed by frame plating, for example, to complete the shield layer 20 made up of the first layer 20A, the second layer 20C, the coupling layers 20G, 20D, and the third layer 20E.

Next, although not shown, a protection layer is formed to cover the entire top surface of the layered structure. Wiring and terminals are then formed on the protection layer. In such a manner, components of a plurality of magnetic heads are formed in the single substrate 1. The magnetic head substructure is thus formed in which a plurality of rows of pre-head portions that will be the magnetic heads later are aligned. The magnetic head substructure is cut in a neighborhood of the region ABS. A surface formed by cutting the magnetic head substructure is polished to form the medium facing surfaces 30. Furthermore, a plurality of pre-head portions are separated from one another by cutting the substructure, and a plurality of magnetic heads are thereby formed. When the pre-head portions are separated, the portion 46a of the magnetic layer 46 becomes the pole layer. In the sixth embodiment, the shape of the end face of the track width defining portion located in the medium facing surface 30 is the same as that of the first embodiment.

In the sixth embodiment, the layer 46P is patterned by etching and thereby formed into the magnetic layer 46Q. Furthermore, the magnetic layer 46Q is etched and thereby formed into the magnetic layer 46. The pole layer is made up of the magnetic layer 46. According to the embodiment, the conductive layer 43 including the indicator portions 43b and 43c is located closer to the substrate 1 than the magnetic layer

46. In other words, the indicators are made up of the conductive layer 43 located closer to the substrate 1 than the pole layer. Therefore, the conductive layer 43 for making the indicators will not disturb etching of the layer 46P and the magnetic layer 46Q.

The remainder of configuration, operation and effects of the sixth embodiment, except those resulting from differences in structure and forming method of the pole layer, are similar to those of the first embodiment including the modification example.

In the sixth embodiment, as in the second embodiment, the location of the middle between the ends 43b1 and 43b2, and the location of the middle between the ends 43c1 and 43c2 may be used as the references for indicating the location of the region ABS. Alternatively, the locations of the ends 43b2 and 43c2 may be used as the references for indicating the location of the region ABS. As in the third embodiment, at least part of the indicator portions 43b and 43c may be placed in a region that will remain in the magnetic head. Furthermore, the part of the indicator portions 43b and 43c remaining in the magnetic head may be designed to indicate the neck height NH.

The present invention is not limited to the foregoing embodiments but may be practiced in still other ways. For example, a coil wound around the pole layer in a helical manner may be provided in any of the embodiments in place of the flat-whorl-shaped coils 9 and 23.

In the foregoing embodiments, the magnetic head is disclosed, having such a configuration that the read head is formed on the base body and the write head is stacked on the read head. Alternatively, the read head may be stacked on the write head.

The invention is applicable not only to magnetic heads for the perpendicular magnetic recording system but also to magnetic heads for the longitudinal magnetic recording system.

Obviously many modifications and variations of the present invention are possible in the light of the above teachings. It is therefore to be understood that within the scope of the appended claims the invention may be practiced otherwise than as specifically described.

What is claimed is:

1. A method of manufacturing magnetic heads, each of the magnetic heads comprising:
    a medium facing surface that faces toward a recording medium;
    a coil that generates a magnetic field corresponding to data to be written on the recording medium; and
    a pole layer that incorporates a track width defining portion having an end face located in the medium facing surface, the pole layer allowing a magnetic flux corresponding to the magnetic field generated by the coil to pass therethrough and generating a write magnetic field for writing the data on the recording medium, the method comprising the steps of:
    fabricating a substructure for the magnetic heads by forming a plurality of sets of the pole layer and the coil in a substrate, wherein a plurality of rows of pre-head portions that will be the respective magnetic heads later are aligned in the substructure; and
    fabricating the magnetic heads by separating the pre-head portions from one another through cutting the substructure, wherein
    the step of fabricating the substructure includes the step of forming a plurality of magnetic layers, each of the plurality of magnetic layers including a pole-layer corresponding portion, an indicator, and a coupling portion, the pole-layer corresponding portion being intended to later become the pole layer, the indicator serving as a reference for indicating a location of a region in which the medium facing surface is to be formed for a corresponding one of the magnetic heads, the coupling portion coupling the pole-layer corresponding portion and the indicator to each other, and
    in the region in which the medium facing surface is to be formed, the indicator is in non-contact with the pole-layer corresponding portion.

2. The method according to claim 1, wherein:
    the end face of the track width defining portion located in the medium facing surface has: a first side closest to the substrate; a second side located opposite to the first side; a third side connecting an end of the first side to an end of the second side; and a fourth side connecting the other end of the first side to the other end of the second side;
    the second side defines a track width; and
    the end face of the track width defining portion has a width that decreases as a distance from the first side decreases.

3. The method according to claim 1, wherein the indicator is formed on each of two sides of the track width defining portion that are opposite to each other in a direction of width of the track width defining portion.

4. The method according to claim 1, wherein the step of fabricating the substructure further includes the step of forming an encasing layer having a plurality of grooves that accommodate the plurality of magnetic layers; and the plurality of magnetic layers are disposed in the plurality of grooves of the encasing layer.

5. The method according to claim 1, wherein the indicator has an end that is parallel to the region in which the medium facing surface is to be formed, and a location of the end serves as the reference for indicating the location of the region.

6. The method according to claim 5, wherein a distance between the location of the end serving as the reference and the region in which the medium facing surface is to be formed falls within a range of 0 to 1.0 µm inclusive.

7. The method according to claim 1, wherein the indicator has two ends that are parallel to the region in which the medium facing surface is to be formed, and a location of a middle between the two ends serves as the reference for indicating the location of the region.

8. The method according to claim 7, wherein a distance between the location of the middle serving as the reference and the region in which the medium facing surface is to be formed falls within a range of 0 to 1.0 µm inclusive.

9. The method according to claim 1, wherein, in the substructure, a distance between the track width defining portion and the indicator taken in a direction of width of the track width defining portion falls within a range of 0.1 to 5.0 µm inclusive.

10. The method according to claim 1, wherein the indicator is located in a region that will not remain in the corresponding one of the magnetic heads.

11. The method according to claim 1, wherein at least part of the indicator is located in a region that will remain in the corresponding one of the magnetic heads.

12. The method according to claim 11, wherein the part of the indicator that remains in the corresponding one of the magnetic heads indicates a length of the track width defining portion taken in a direction orthogonal to the medium facing surface.

13. The method according to claim 12, further comprising the step of measuring the length of the track width defining portion taken in the direction orthogonal to the medium facing surface by measuring a length of the part of the indicator that remains in the corresponding one of the magnetic heads taken in the direction orthogonal to the medium facing surface, the step of measuring being performed after the step of fabricating the magnetic heads.

14. The method according to claim 1, wherein the step of fabricating the magnetic heads includes the step of forming the medium facing surface of each of the magnetic heads by polishing a surface formed by cutting the substructure.

15. The method according to claim 1, wherein the magnetic heads are those used for a perpendicular magnetic recording system.

* * * * *